US010830967B2

(12) United States Patent
Pimentel et al.

(10) Patent No.: US 10,830,967 B2
(45) Date of Patent: Nov. 10, 2020

(54) CONNECTOR FOR TELECOMMUNICATION ENCLOSURES

(71) Applicant: Corning Research & Development Corporation, Corning, NY (US)

(72) Inventors: Nelson Goncalves Pimentel, Neuss (DE); Christine B. Bund, Wuppertal (DE); Johann G. Hajok, Bochum (DE)

(73) Assignee: Corning Research & Development Corporation, Corning, NY (US)

( * ) Notice: Subject to any disclaimer, the term of this patent is extended or adjusted under 35 U.S.C. 154(b) by 174 days.

(21) Appl. No.: 15/946,152

(22) Filed: Apr. 5, 2018

(65) Prior Publication Data
US 2018/0224610 A1 Aug. 9, 2018

Related U.S. Application Data

(63) Continuation of application No. 14/898,984, filed as application No. PCT/US2014/044844 on Jun. 30, 2014, now abandoned.
(Continued)

(51) Int. Cl.
*G02B 6/38* (2006.01)
*G02B 6/44* (2006.01)
*H01R 13/627* (2006.01)

(52) U.S. Cl.
CPC ......... *G02B 6/3893* (2013.01); *G02B 6/3825* (2013.01); *G02B 6/3887* (2013.01);
(Continued)

(58) Field of Classification Search
CPC .. G02B 6/3825; G02B 6/3887; G02B 6/3897; G02B 6/3891; G02B 6/3849
See application file for complete search history.

(56) References Cited

U.S. PATENT DOCUMENTS 5,542,014 A   7/1996  Hultermans
5,542,015 A * 7/1996  Hultermans ......... G02B 6/3893
                                                  385/60
(Continued)

FOREIGN PATENT DOCUMENTS

EP   0307518   3/1989
EP   0816883   1/1998
(Continued)

OTHER PUBLICATIONS

Heyman, "Access & Fastening Solutions", Product Catalog, 2012, pp. 12-15.
(Continued)

*Primary Examiner* — Sung H Pak
*Assistant Examiner* — Hoang Q Tran
(74) *Attorney, Agent, or Firm* — Michael E. Carroll, Jr.

(57) ABSTRACT

An optical fiber connector for external connection to a telecommunications enclosure is described herein. The optical fiber connector has an assembly base having a first end and a second end, an optical connection portion disposed partially within the first end of the assembly base and a strain relief assembly disposed on the second end of the assembly base. The assembly base includes a body portion and a release portion which defines a release mechanism that causes the release portion to move relative to the body portion. The release portion includes at least one cam that is configured to release or disengage the at least one latch element when the release portion moves with respect to the body portion so that the optical fiber connector can be removed from the port of the telecommunication enclosure.

17 Claims, 36 Drawing Sheets

Related U.S. Application Data

(60) Provisional application No. 61/846,816, filed on Jul. 16, 2013.

(52) U.S. Cl.
CPC ......... *G02B 6/3897* (2013.01); *G02B 6/4471* (2013.01); *G02B 6/3849* (2013.01); *G02B 6/3891* (2013.01); *H01R 13/6273* (2013.01)

(56) References Cited

U.S. PATENT DOCUMENTS

| | | | |
|---|---|---|---|
| 5,778,122 | A | 7/1998 | Giebel et al. |
| 5,915,056 | A | 6/1999 | Bradley et al. |
| 6,445,867 | B1 | 9/2002 | Gilliland et al. |
| 6,487,344 | B1 | 11/2002 | Naudin et al. |
| 6,579,014 | B2 | 6/2003 | Melton et al. |
| 6,648,520 | B2 | 11/2003 | McDonald et al. |
| 7,090,406 | B2 | 8/2006 | Melton et al. |
| 7,113,679 | B2 | 9/2006 | Melton et al. |
| 8,272,790 | B2 | 9/2012 | Belsan et al. |
| 8,313,250 | B2 | 11/2012 | Drouard |
| 2005/0281510 | A1 | 12/2005 | Vo et al. |
| 2007/0077010 | A1 | 4/2007 | Melton et al. |
| 2007/0082552 | A1 | 4/2007 | Feldner |
| 2008/0175541 | A1 | 7/2008 | Lu et al. |
| 2009/0148101 | A1 | 6/2009 | Lu et al. |
| 2009/0148104 | A1 | 6/2009 | Lu et al. |
| 2010/0239210 | A1 | 9/2010 | Wakileh et al. |
| 2010/0254659 | A1 | 10/2010 | Anderson et al. |
| 2011/0044588 | A1 | 2/2011 | Larson et al. |
| 2011/0123157 | A1 | 5/2011 | Belsan et al. |
| 2011/0129185 | A1 | 6/2011 | Lewallen et al. |
| 2012/0170896 | A1 | 7/2012 | Skluzacek et al. |
| 2012/0257859 | A1 | 10/2012 | Nhep |

FOREIGN PATENT DOCUMENTS

| | | |
|---|---|---|
| EP | 1430339 | 6/2004 |
| EP | 1566674 | 8/2005 |
| EP | 1944886 | 7/2008 |
| WO | WO 2003-050579 | 6/2003 |
| WO | WO 2009-076536 | 6/2009 |
| WO | WO 2009-126411 | 10/2009 |
| WO | WO 2009-131993 | 10/2009 |
| WO | WO 2010-123670 | 10/2010 |
| WO | WO 2011-097473 | 8/2011 |
| WO | WO 2012-041840 | 4/2012 |
| WO | WO 2013-106183 | 7/2013 |
| WO | WO 2015-009435 | 1/2015 |
| WO | WO 2015-050605 | 4/2015 |

OTHER PUBLICATIONS

International Search Report for PCT International Application No. PCT/US2014/044844, dated Mar. 17, 2015, 3 pgs.

\* cited by examiner

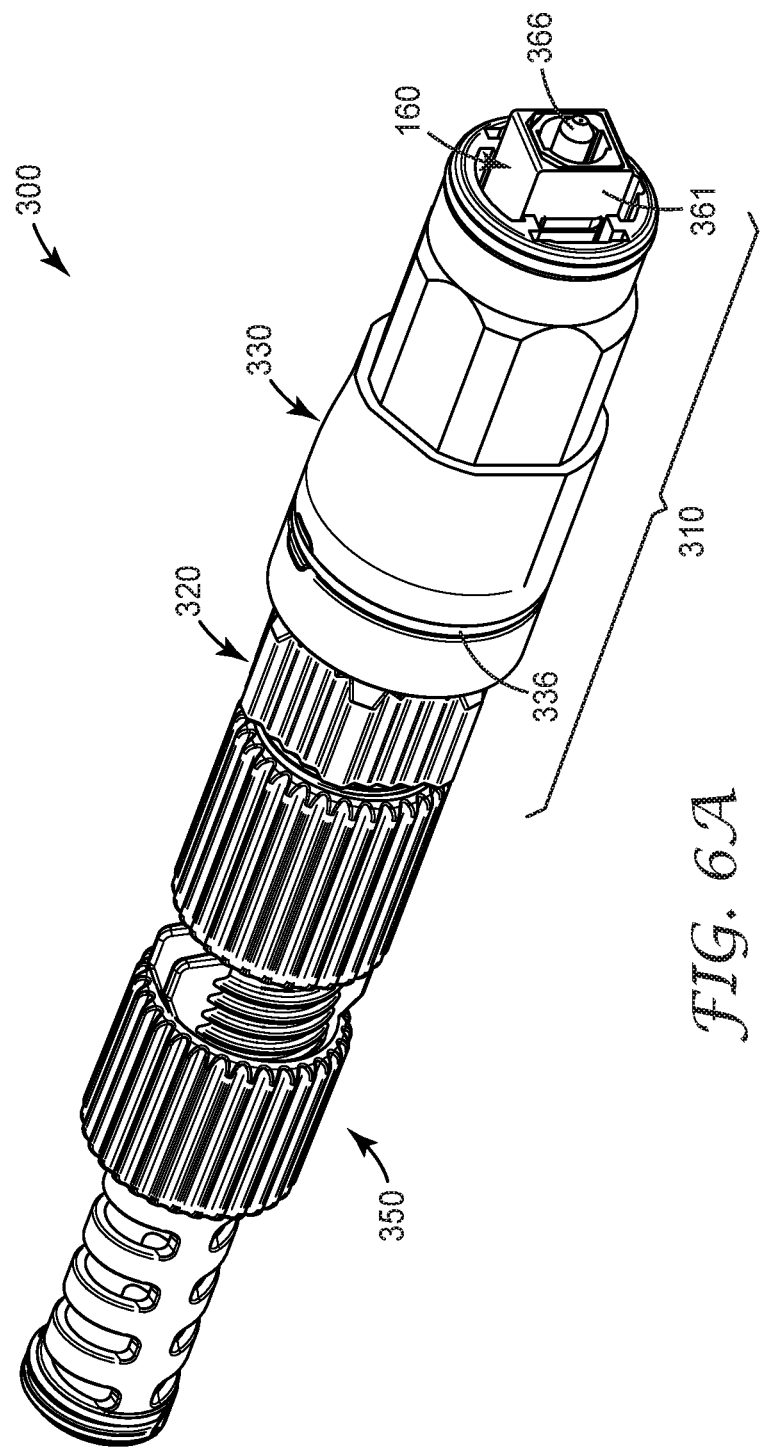

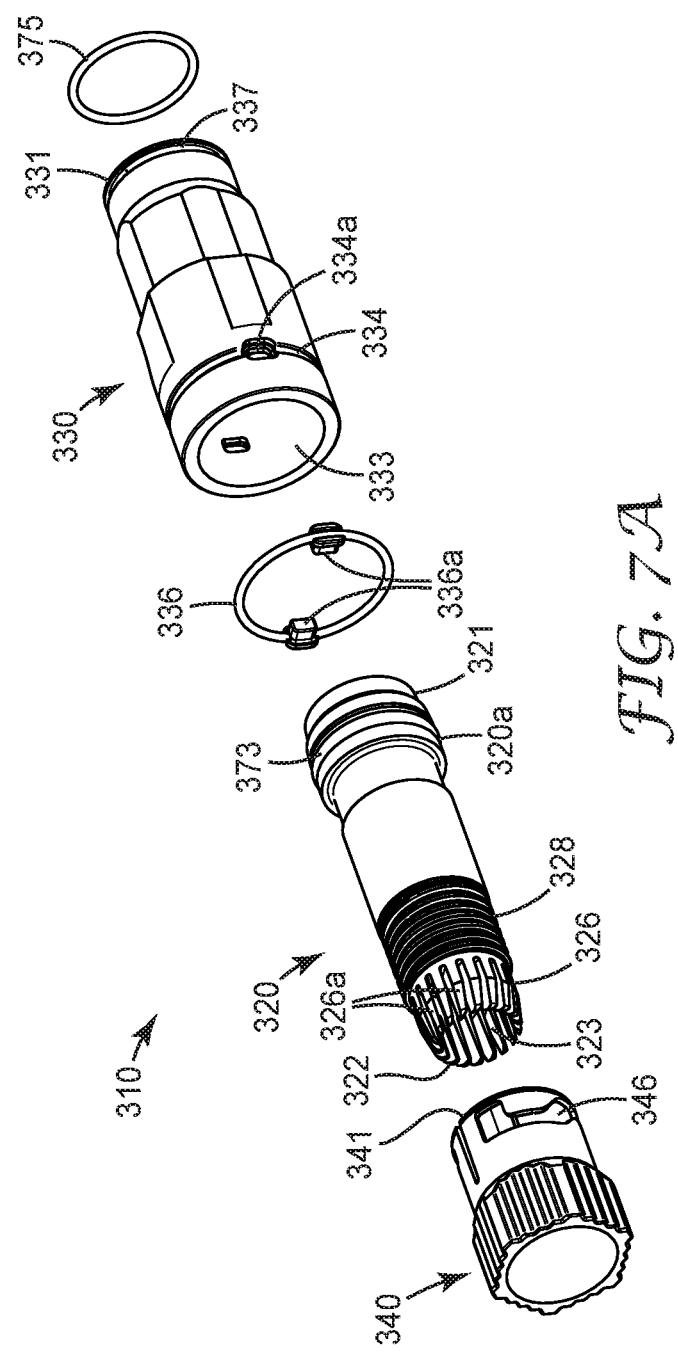

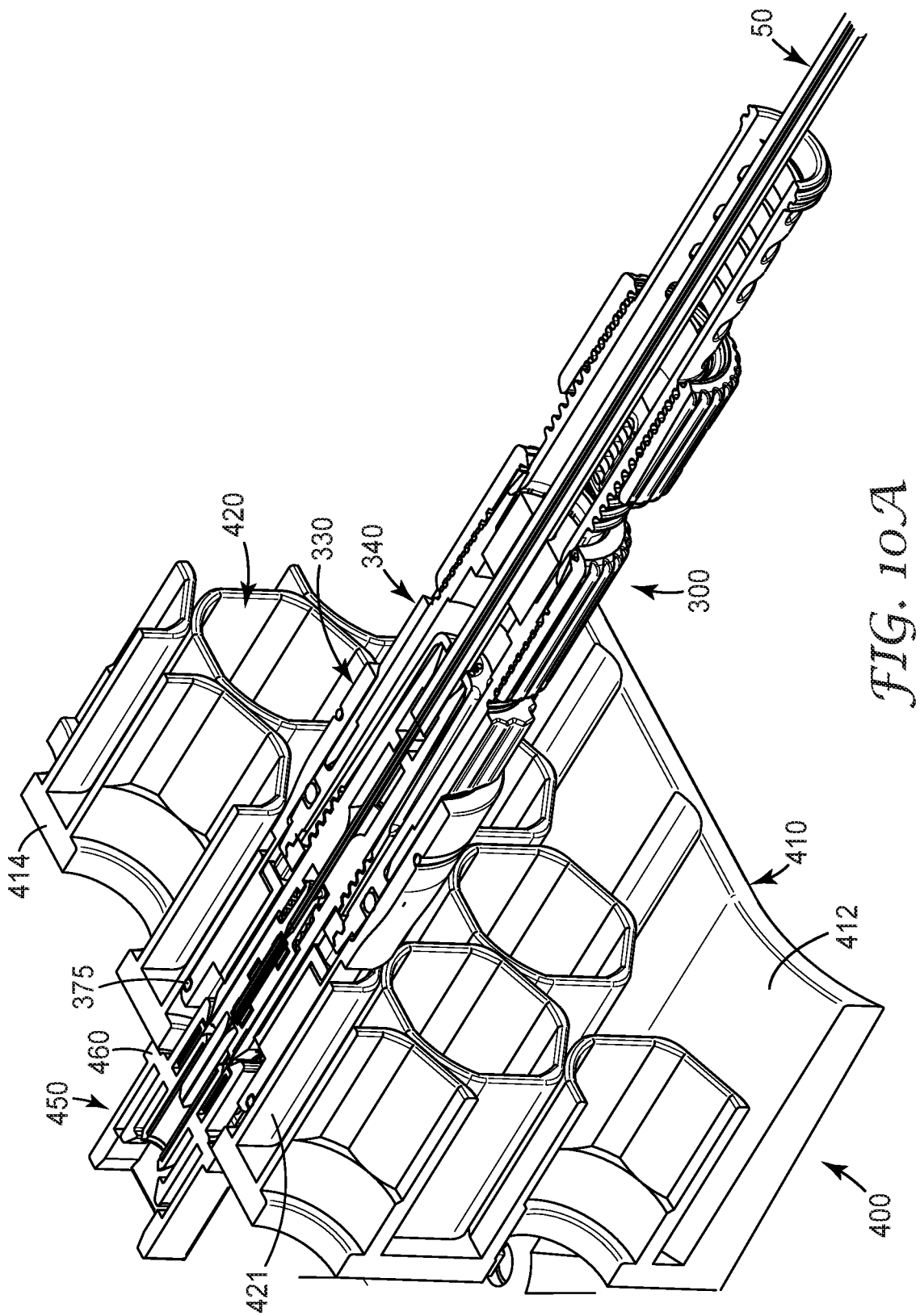

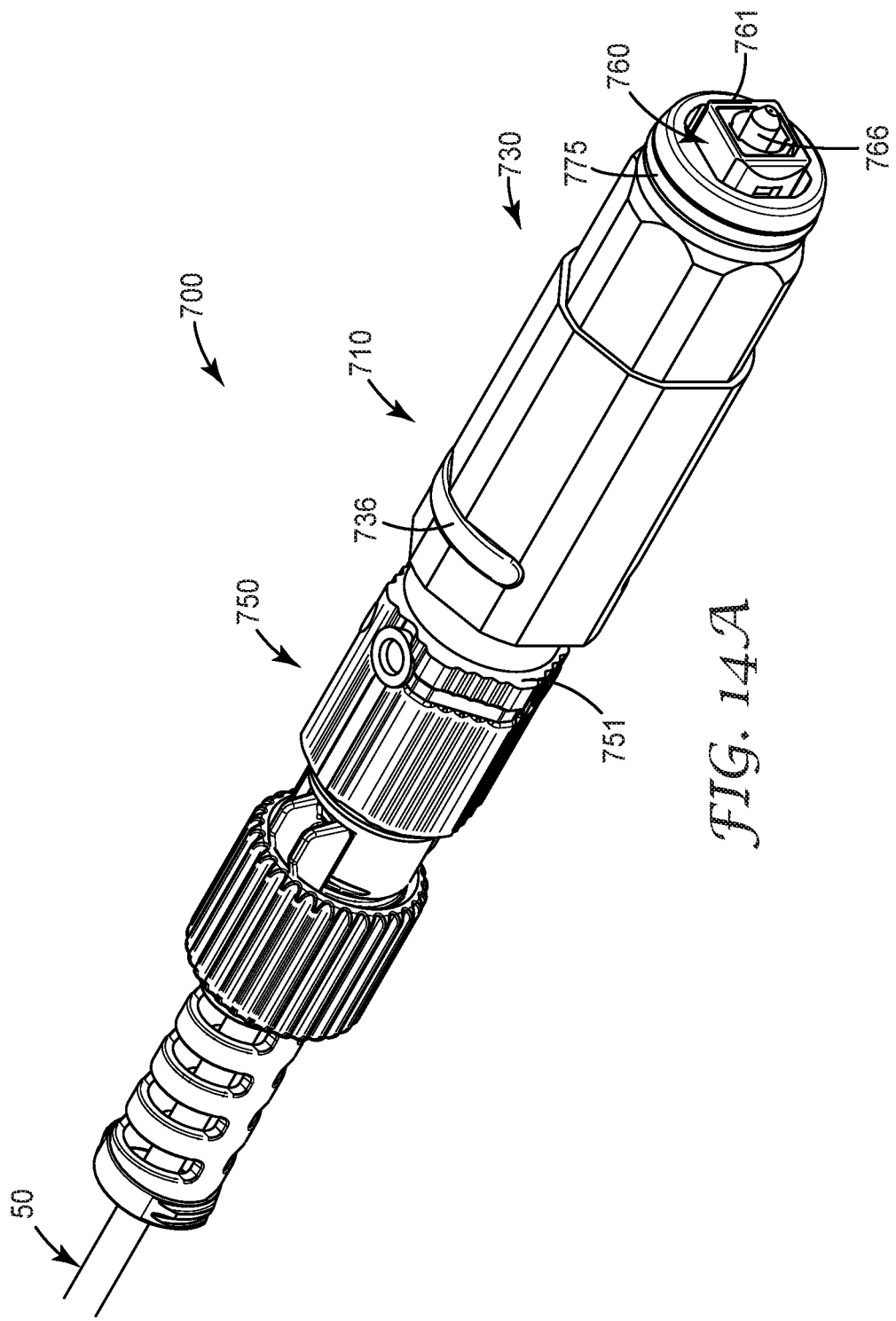

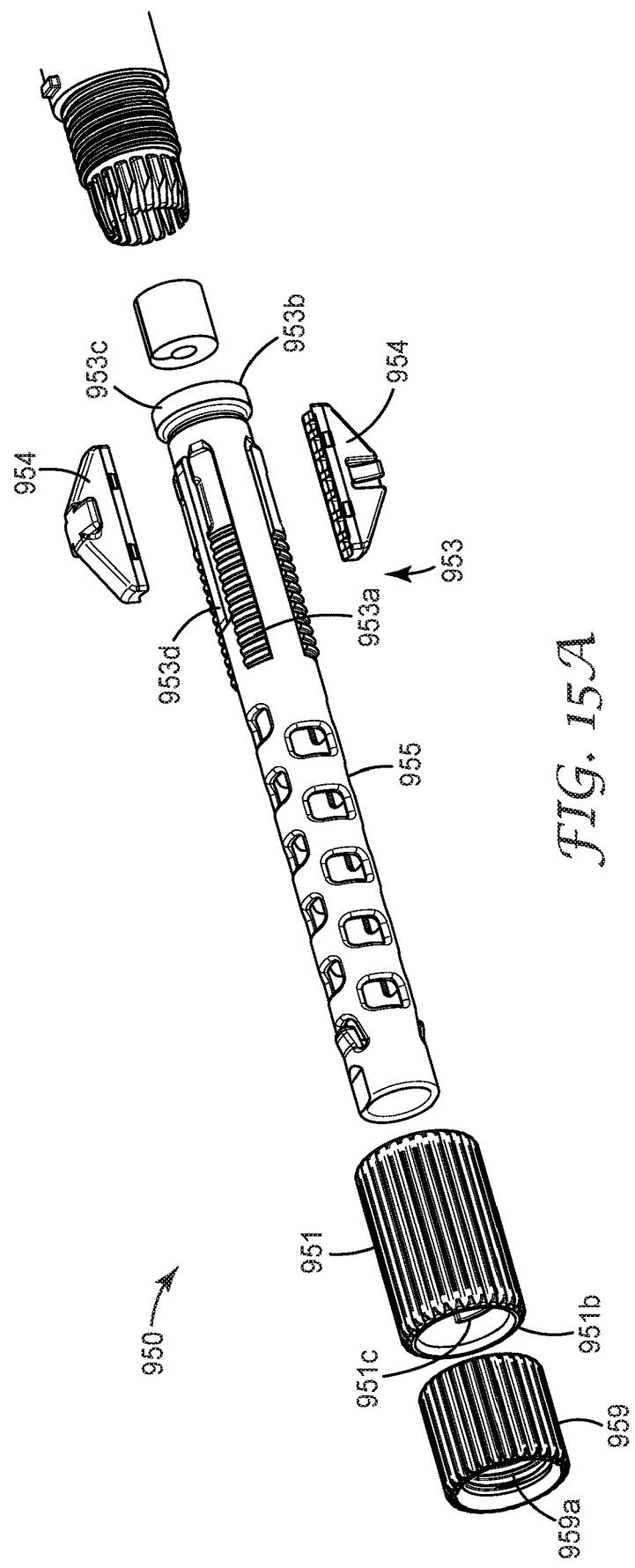

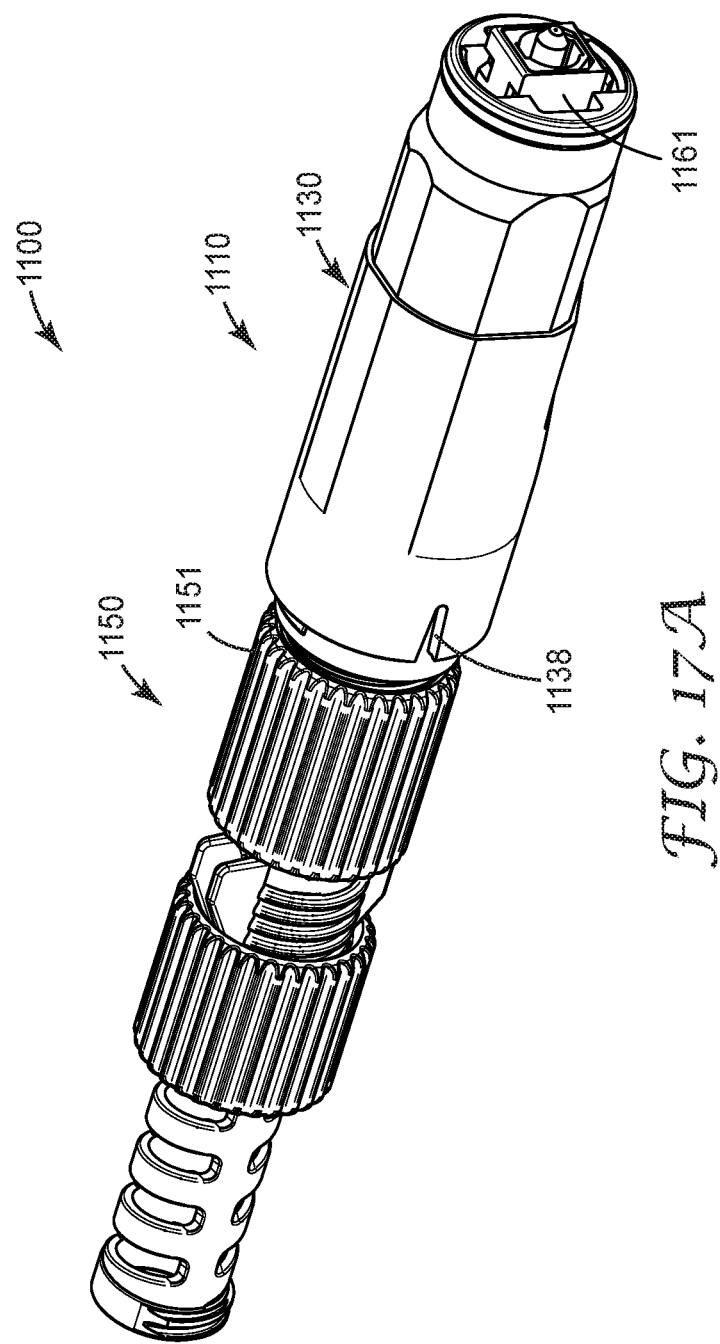

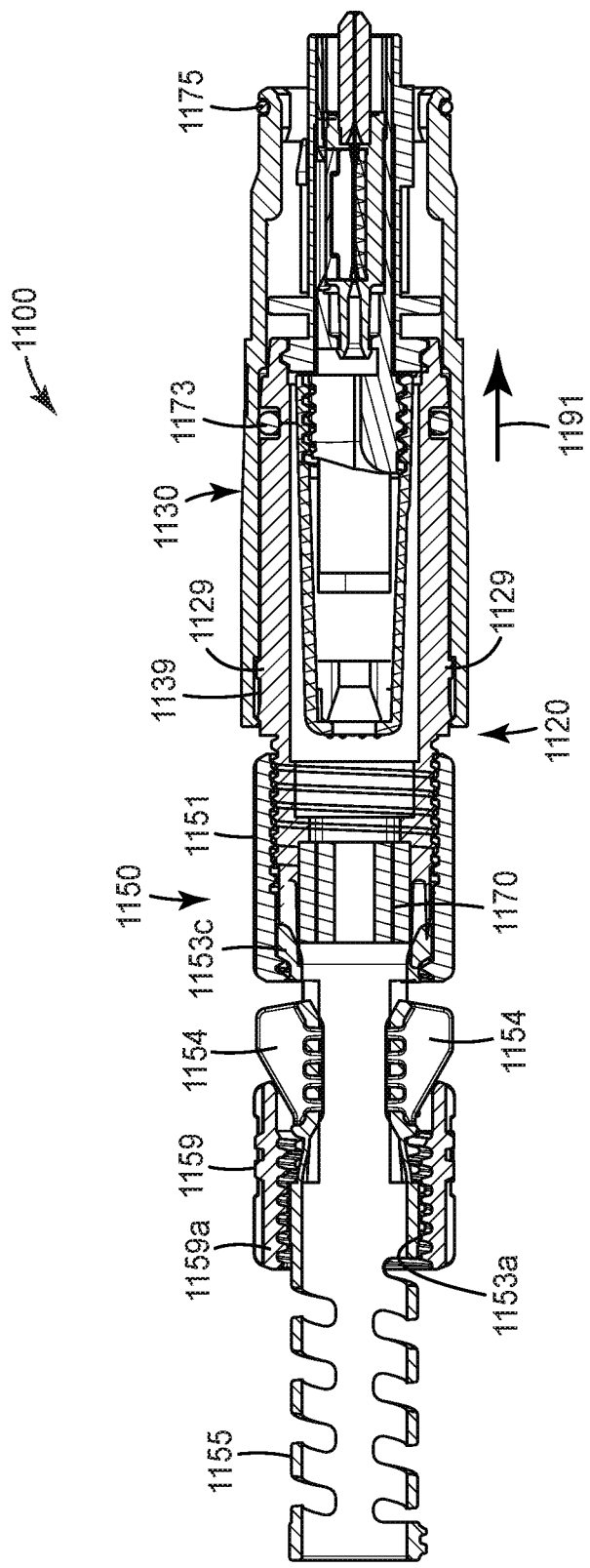

CONNECTOR FOR TELECOMMUNICATION ENCLOSURES

FIELD OF THE INVENTION

The present invention relates to optical fiber connector for telecommunication enclosures. Specifically, the exemplary optical fiber connector can be plugged into optical connector adapter through a port of the telecommunication enclosure.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premises, business, or a private residence.

As telecommunication cables are routed across data networks, it is necessary to periodically open the cable so that one or more telecommunication lines therein may be spliced or otherwise connected to other cables or "branches" and to be distributed across the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

Fiber terminals are one type of telecommunication enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to an optical network terminal (ONT), located at the end user, using a drop cable. Typically, an optical connector attached to the terminal end of an optical fiber of the cable is preferred to allow quick, reliable field installation.

There are two basic methods of introducing an optical fiber into a telecommunication or enclosure. In the first method, the cable passes through an inlet device fitted into a port of the telecommunication enclosure. The optical connection interface is made within the enclosure by either an optical connector or an optical splice. Conventional watertight optical inlet devices are described in U.S. Pat. Nos. 6,487,344 and 8,313,250, which can be inserted into a port so that a telecommunication cable can pass through the wall and into the interior of a telecommunication enclosure.

The second method is to provide a weatherproof optical connection interface in or near a wall of the telecommunication enclosure using a sealed hardened connector that is factory mounted on the terminal end of an optical fiber cable and mating receptacle mounted within a port or in the wall of the telecommunication enclosure, such as described in U.S. Pat. Nos. 6,648,520; 7,090,406; and 6,579,014. Generally, the receptacle in this conventional connector/receptacle system is attached directly to the wall of the enclosure so that the external connection point extends from the port and is exposed to the outdoor environment. In addition, this connector/receptacle system requires environmental sealing between the receptacle and the port of a telecommunication enclosure and between the connector and the receptacle.

A field mountable sealed connector having a connection interface disposed within an interior portion of a telecommunication enclosure is described in Patent Cooperation Treaty Publication No. WO 2013/106183.

Due to the rugged handling of drop cables which utilize these hardened connectors, a need exists for enhanced pull strength without having to rely on a threaded connection between the hardened connector and its mating receptacle. The size of the mating receptacle limits the port density that can be achieved with conventional ruggedized optical fiber connectors. Thus, there is an increased desire for a higher port density in a telecommunication enclosure than can be achieved with conventional ruggedized connectors. In addition, there is a need to provide a ruggedized field mountable fiber optic connector that allows the craftsman to customize the length of the drop cable for a particular network installation while maintaining the environmental protection of the telecommunication enclosure.

SUMMARY OF THE INVENTION

An optical fiber connector is described herein wherein the optical fiber connector is configured for external connection to a telecommunications enclosure. The optical fiber connector has an assembly base having a first end and a second end, an optical connection portion disposed partially within the first end of the assembly base and a strain relief assembly disposed on the second end of the assembly base. The optical fiber connector includes at least one latch element configured to secure the optical connector within a port of a telecommunication enclosure. The assembly base includes a body portion and a release portion which defines a release mechanism that causes the release portion to move relative to the body portion. The release portion includes at least one cam that is configured to release or disengage the at least one latch element when the release portion moves with respect to the body portion so that the optical fiber connector can be removed from the port of the telecommunication enclosure.

In an exemplary aspect, the release mechanism can be selected from one of a twist-to-push release mechanism, a twist-to-pull release mechanism, a push release mechanism and a pull release mechanism.

In another exemplary aspect, a modified optical coupling is disclosed having enhanced retention characteristics. The optical coupling has a first connector housing configured to accept a first optical fiber connector, a second connector housing configured to accept a second optical fiber connector; and an alignment sleeve extending between the first and second housings along a central axis of the optical coupling. At least one of the first connector housing and the second connector housing provides four interconnection points with at least one of the first optical fiber connector and the second optical fiber connector. The exemplary modified optical coupling is configured to be placed in the port of a telecommunications enclosure.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 6A-6C show three views of a second embodiment of an exemplary optical fiber connector according to an aspect of the present invention;

FIGS. 7A-7C show three detail views of the assembly base of the optical connector of FIGS. 6A-6C;

FIG. 10A shows the exemplary optical fiber connector of FIGS. 6A-6C installed in the port of a telecommunication enclosure;

FIGS. 14A-14C show three views of a fourth embodiment of an exemplary optical fiber connector according to an aspect of the present invention;

FIGS. 15A-15B show two views of an alternative strain relief assembly usable with the exemplary optical fiber connectors in accordance with an aspect of the invention;

FIGS. 16A-6C show three views of another modified coupling usable with an exemplary optical fiber connector according to an aspect of the present invention;

FIGS. 17A-17C show three views of a second embodiment of an exemplary optical fiber connector according to an aspect of the present invention.

Figure 1A:
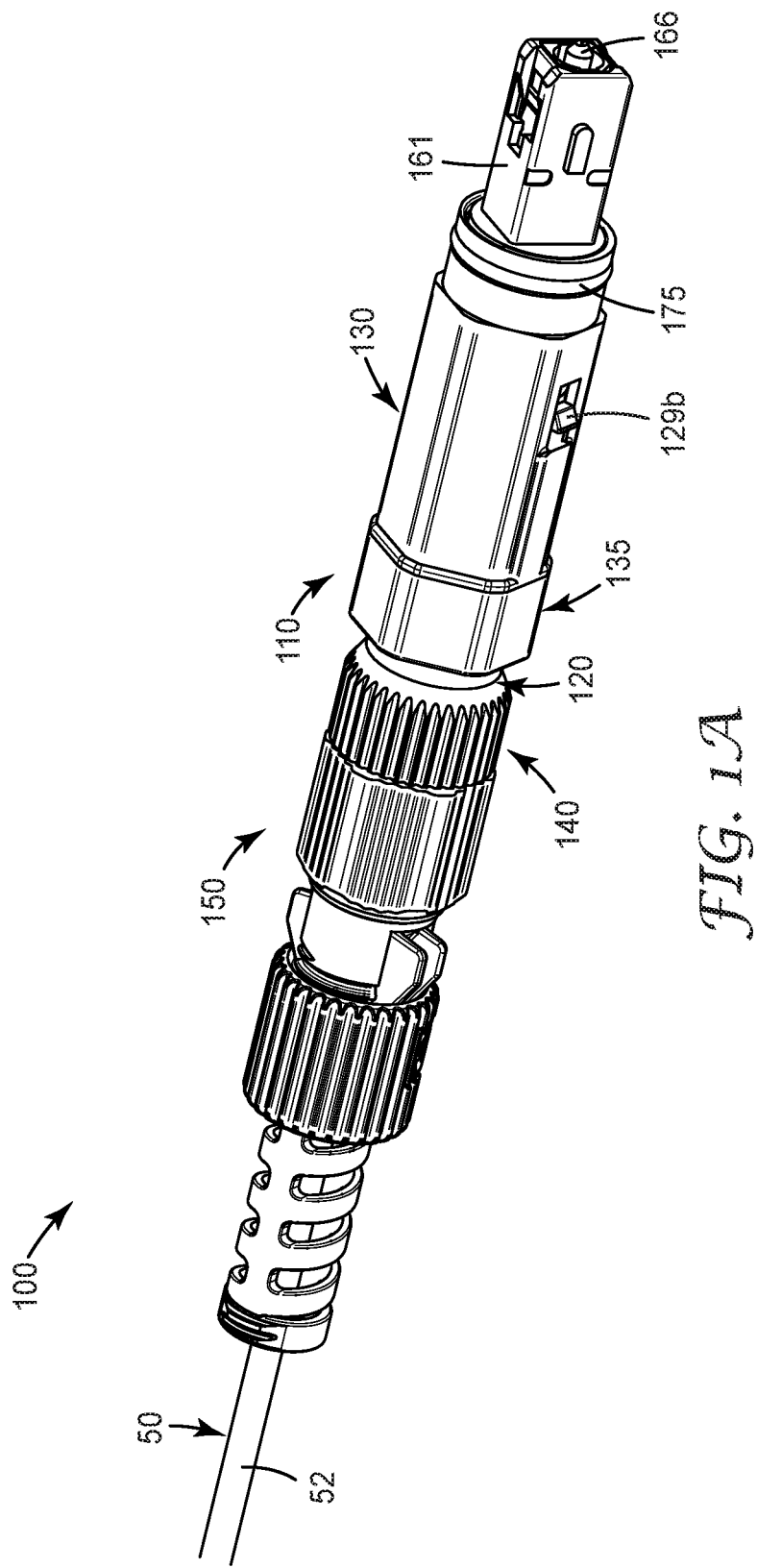
FIGS. 1A-1C show three views of a first embodiment of an exemplary optical fiber connector according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an optical fiber connector for use in telecommunication enclosures. Specifically, the exemplary optical fiber connector can be plugged into an optical connector adapter through a port of the telecommunication enclosure. Particular advantages of the design of the present optical fiber connector include a lower cost than conventional hardened connectors which require a specialized mating receptacle. In addition, the exemplary optical fiber connector, as described herein, can be either field installable or factory installable. The small size of the exemplary optical fiber connector allows more connections to be made in a similarly sized telecommunication enclosure as a result of a higher port density when compared to conventional ruggedized connector systems. In addition, the exemplary optical fiber connector can be easier to handle and faster to install into a telecommunication enclosure than some conventional ruggedized connectors which require that the connector be screwed into a specialized receptacle in the port of a telecommunication enclosure.

The exemplary fiber optic connector can be used in FTTx optical fiber networks. In one exemplary aspect, the exemplary optical fiber connector can be used to connect an end user to a remote fiber terminal in a fiber to the premise network. In another aspect of the invention, the exemplary fiber optic connector can be used to connect an antenna on a cellular tower or other installation to equipment in a base station located at the foot of the tower or an equipment cabinet, enclosure or closet.

In one embodiment, the exemplary optical fiber connector can be inserted from outside of the telecommunication enclosure to provide an optical connection interface proximate to the wall of the enclosure or within the port of the enclosure. Depending on the communication network architecture, the telecommunication enclosure may be a buried closure, an aerial closure or terminal, a fiber distribution hub or an optical network terminal in the outside plant or a wall mount communication box, a fiber distribution hub, a wall mount patch panel, or an optical network terminal in premise applications. The exemplary fiber optic connector can provide an environmental seal when installed in a port of a telecommunications enclosure. By providing an environmental seal, the inlet device can be designed to provide a watertight or water resistant seal and/or to prevent dust, bugs or any other foreign substance from entering the enclosure.

In one exemplary embodiment (see e.g. FIGS. 1A and 1B), the telecommunication cable can be a fiber optic cable 50. The fiber optic cable can include a semi-rigid outer sheath or jacket 52 surrounding at least one optical fiber 54 and can include one or more strength members (not shown). Each optical fiber has a polymeric coating 55 that surrounds and protects the glass fiber 56. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP) optical cable available from Shenzhen SDG Information Company, Ltd. (Shenzhen, China), SE*-LW*FTTH All Purpose Optical Drop Cables and SE-8 PureAccess™ Single Mode Optical Fiber each of which is available from Sumitomo Electric (Research Triangle Park, N.C.), Mini DP Flat Drop Cable available from OFS (Northcross, Ga.). The strength members may be either semi-rigid rods or a collection of loose fibers or floss, e.g. made of aramid fibers or glass.

In an alternative aspect, the telecommunication cable can be an electrical cable in which case the connection portion of the exemplary connector will be an appropriate style of electrical connector such as an RJ-style plug connector, a USB connector or a coaxial connector, for example. While in another aspect, the telecommunication cable can be a hybrid cable having both electrical and optical conductors in which case the connection portion of the exemplary connector will be an appropriate hybrid connector.

Figure 1B:
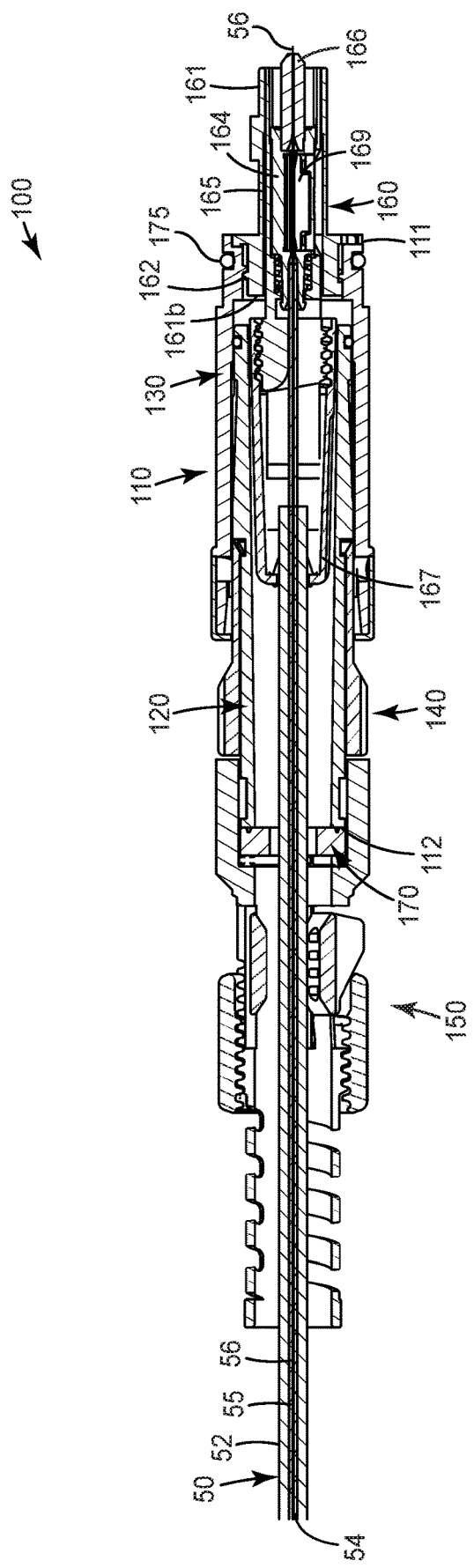
Figure 1C:
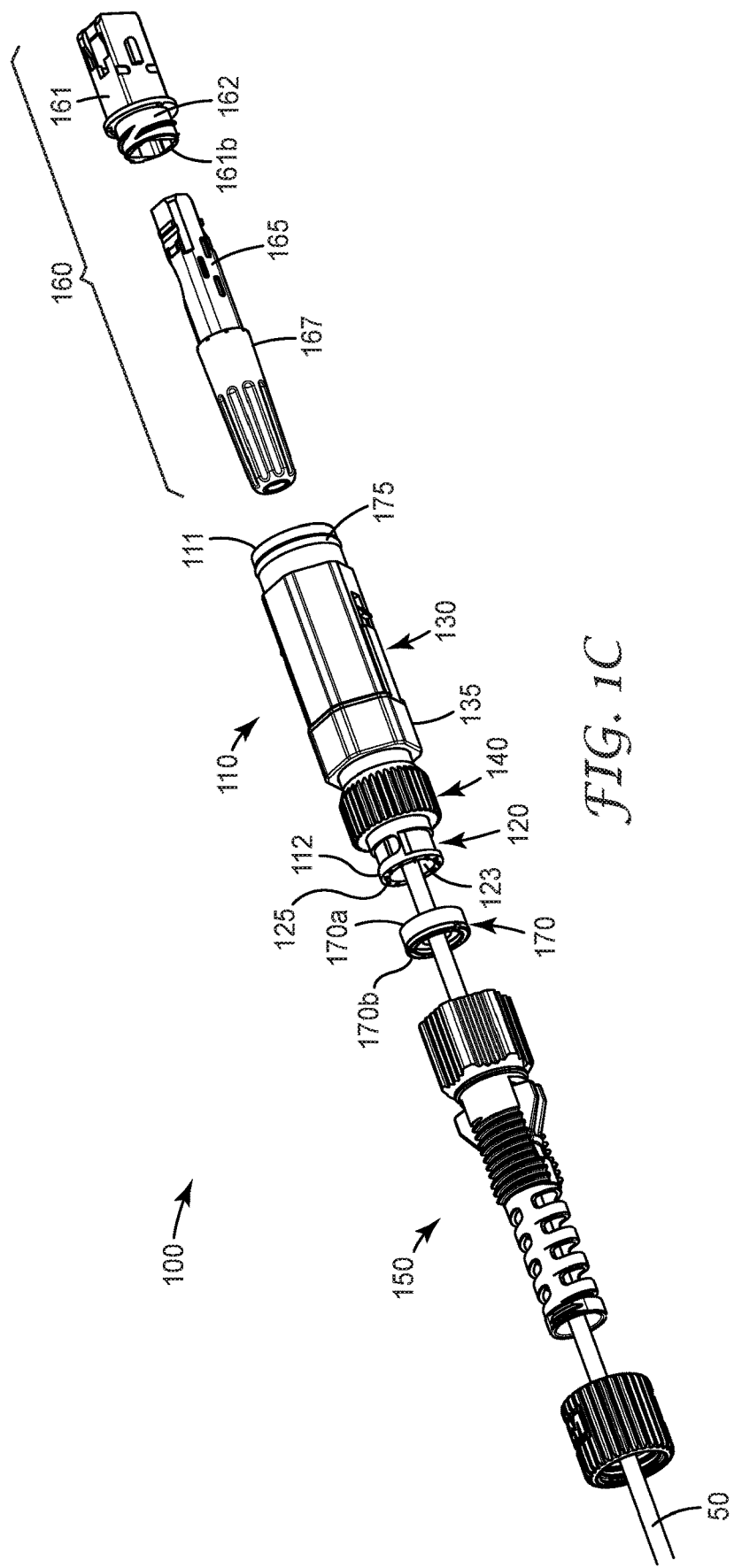

FIGS. 1A-1C show three views of an exemplary optical fiber connector 100. Optical fiber connector 100 includes an assembly base 110 having a first end 111 and a second end 112, a strain relief assembly 150 attachable to the second end of the assembly base and an optical connection portion 160 having a ferrule 166 disposed therein that defines an optical connection interface attachable to the first end of the assembly base. The strain relief assembly anchors an internal sealing member 170 between the strain relief assembly and the second end of the assembly base to provide an environmental seal between the optical fiber connector 100 and the telecommunications cable 50 to which it is connected. Optical fiber connector also includes at least one engagement feature to secure the optical fiber connector within a port of a telecommunication enclosure. Optical fiber connector 100 may be formed of plastic by conventional methods, for example by injection molding.

Figure 2A:
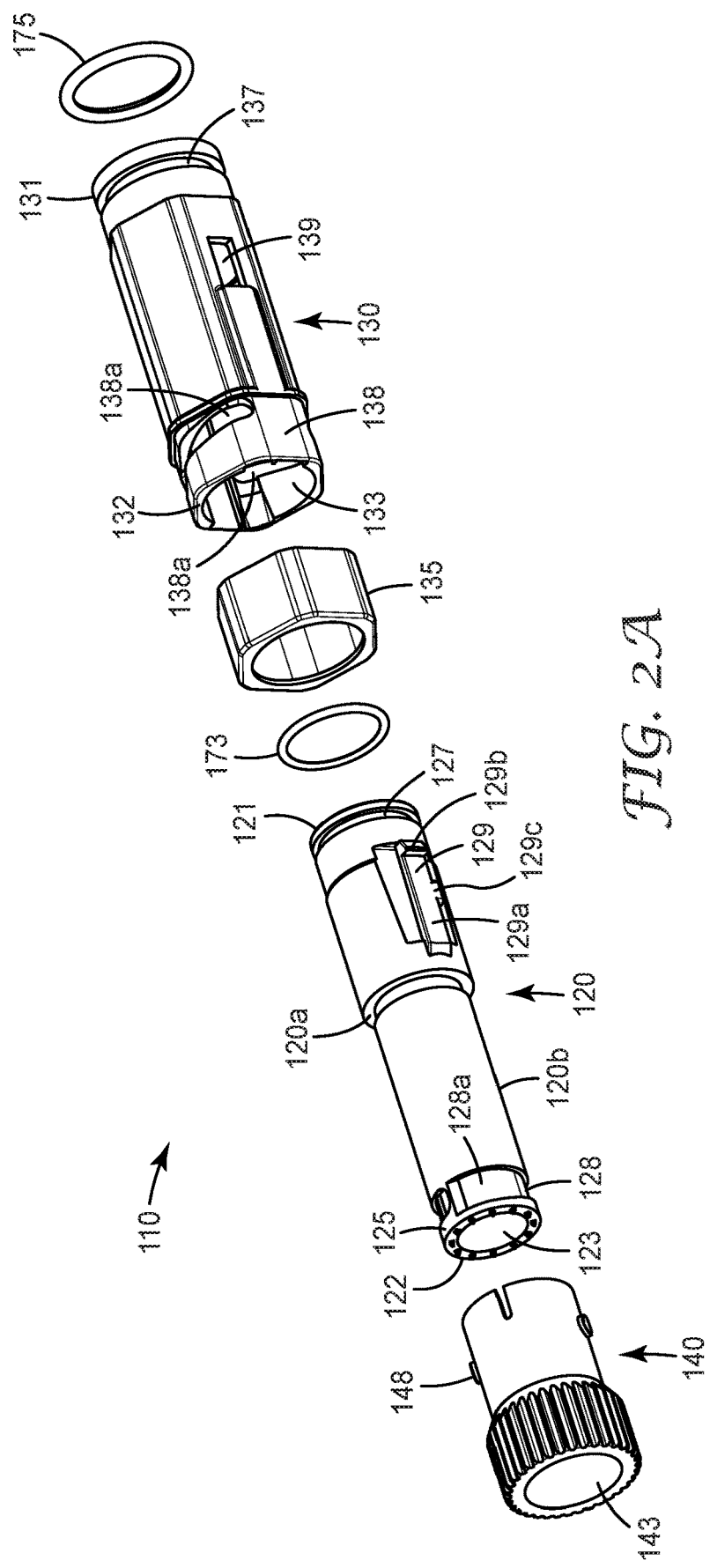
FIGS. 2A-2C show three detail views of an exemplary assembly base of the optical connector of FIGS. 1A-1C.
Figure 2B:
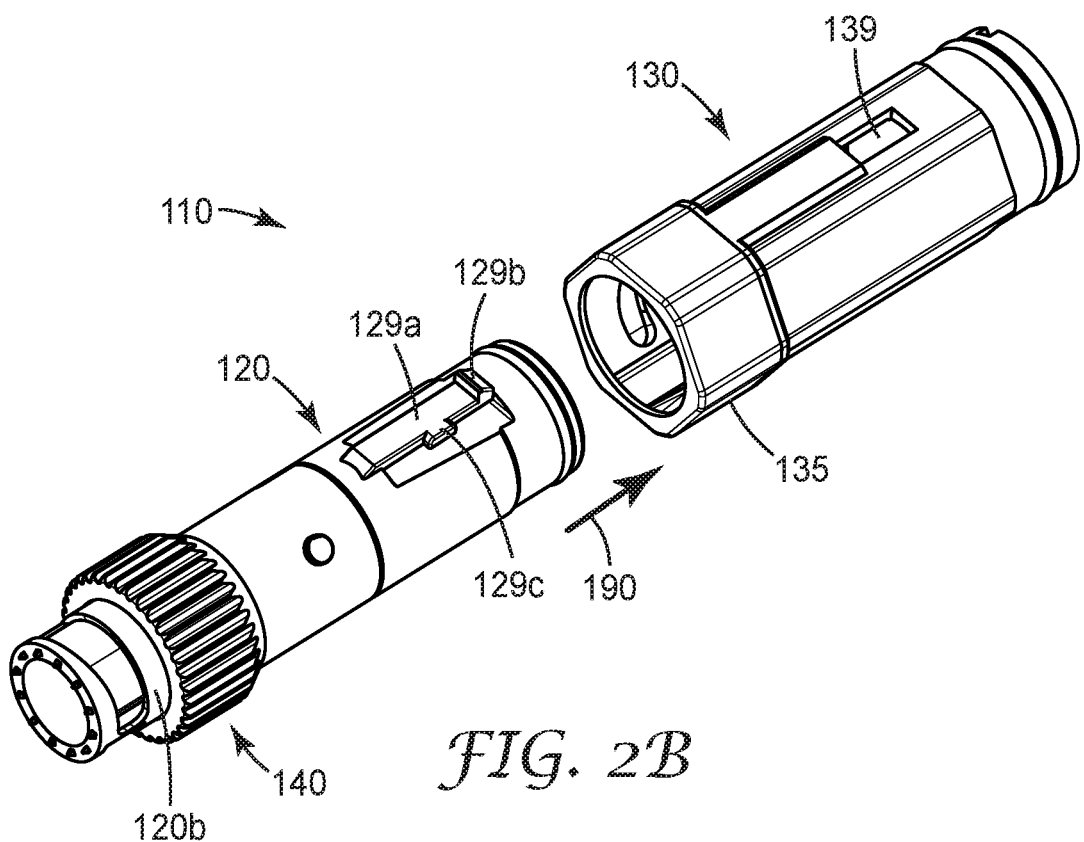
Figure 2C:
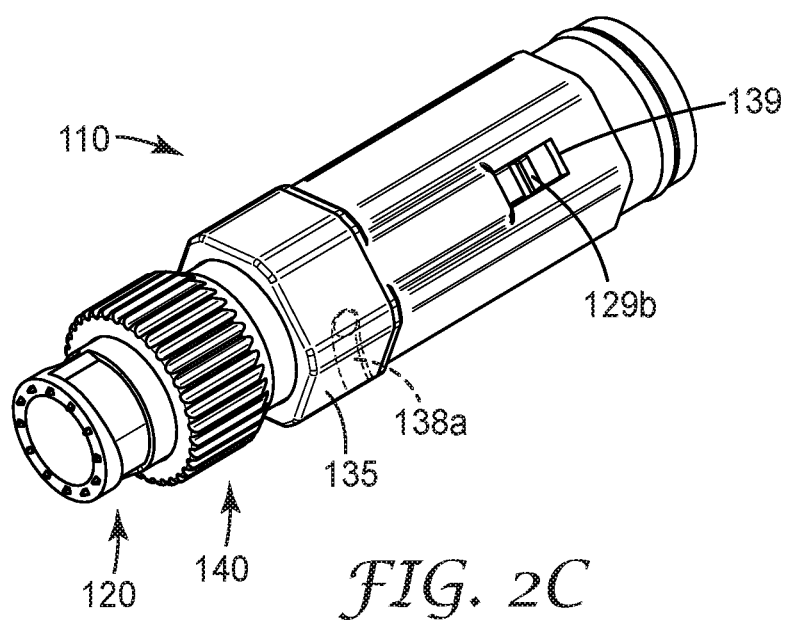

Referring to FIGS. 2A-2C, assembly base 110 includes a body portion 120 having a first end 121 and a second end 122, a release portion 130 disposed near the first end of the body portion and an activation portion 140 disposed near the second end of the body portion. The release portion defines a release mechanism which moves the release portion relative to the body portion to disengage at least one engagement feature of the optical fiber connector when the release portion moves with respect to the body portion so that the optical fiber connector can be removed from the port of the telecommunication enclosure. FIG. 2A shows an exploded view of assembly base 110. FIG. 2B is a partially assembled view of assembly base 110, and FIG. 2C is a fully assembled view of assembly base 110.

The body portion 120 may be generally cylindrical in shape and includes an interior passageway 123 that extends along the length of the body portion from the first end 121 to the second end 122 of the body portion. The body portion includes a passage entry at the first end of the interior passageway and a passage exit 125 at the second end of the interior passageway 123 that may be configured to accommodate certain categories of telecommunication cables including single fiber drop cables and/or multi-fiber cables.

The passage entry at the first end 121 of the interior passageway 123 is configured to accept and secure optical connection portion 160 to/in the first end 121 of the body portion 120. As such, the passage entry can be shaped to closely conform to an outer perimeter portion of the optical connection portion. In one aspect, the optical connection portion can be secured to the first end of the assembly base such that at least a portion of the optical connection portion is disposed within the interior passageway of the body portion.

The body portion 120 can have a groove 127 formed in the external surface of the body portion to receive an intermediate sealing member 173. In the exemplary aspect shown in FIG. 2A, groove 127 is formed near the first end 121 of body portion and configured to receive an intermediate sealing member, such as an o-ring. This intermediate sealing member can provide an environmental seal between the body portion and release portion 130 of assembly base 110.

The body portion 120 can have an external connection portion 128 adjacent to the second end 122 of the body portion. In the exemplary aspect shown in FIG. 2A, external connection portion 128 includes at least one bayonet channel 128a that cooperates with at least one internal peg 151e (shown in FIG. 3C) disposed within a first opening 151c at the first end 151a of strain relief assembly 150. In the exemplary embodiment of optical fiber connector 100, the body portion can include two bayonet channels disposed on opposite sides of the body portion and strain relief assembly 150 can have two internal pegs that are configured to engage with the bayonet channels formed in the body portion. Thus, the strain relief assembly (having the internal sealing member 170 disposed therein) can be slid over the second end of the body portion and rotated to secure the strain relief assembly to the body portion as the internal pegs in the strain relief assembly ride in the bayonet channels formed in the body portion. The internal sealing member is compressed longitudinally between the strain relief assembly and the second end of the body portion as shown in FIG. 1B.

Utilizing a bayonet style securing mechanism to attach the strain relief assembly to the assembly base can be advantageous in reducing torsional stresses applied to the telecommunication cable when the strain relief assembly is secured to the body portion of the exemplary optical fiber connector. In addition, the bayonet style securing mechanism offers the advantage of having a defined stop at the end of the engaging motion (i.e. the ends of bayonet channel 128a) as opposed to a threaded connection which does not have a defined stop and can be over or under tightened resulting potential inferior environmental protection between the cable and optical fiber connector 100.

In an alternative aspect, the external connection can comprise an external thread that engages with an internal thread in the strain relief assembly or can comprise mechanical interlocking structure that engage with corresponding features within the strain relief assembly such that the strain relief assembly is secured to the second end of the assembly base by an interference fit. In the case of a threaded connection mechanism it can be advantageous to add a stop so that the strain relief device cannot be over tightened onto the assembly base.

Body portion 120 can include a shoulder 120a formed in its external surface. The shoulder serves as a transition point from a first diameter at the first end 121 of the body portion to a second diameter at the second end 122 of the body portion. In the exemplary aspect shown in FIGS. 2A-2B, the first diameter at the first end is larger than the second diameter at the second end. The body portion having the smaller second diameter defines a reduced diameter section 120b between the second end and shoulder 120a. The activation portion 140 can be slid over the second end of body portion 120 such that the activation portion is disposed over reduced diameter section 120b as shown in FIG. 2B such that the outer surface of the activation portion and the body portion between the shoulder and the first end are substantially coplanar. The reduced diameter section can be slightly smaller than the internal diameter of the bore 143 through the activation portion such that the activation portion is free to move (i.e. rotate) relative to the reduced diameter section and shoulder 120a serves as a stop to limit the travel range of the activation portion. The external surface of reduced diameter section and the internal surface of the bore through the activation portion can be smooth so that the activation portion can slip over the reduced diameter section of the body portion to actuate the release portion 130. In an alternative aspect, the external surface of reduced diameter section and the internal surface of the bore through the activation portion can be threaded so that the activation portion can be rotated in a helical manner to actuate the release portion. While in another exemplary aspect, the external surface of reduced diameter section and the internal surface of the bore through the activation portion can be textured to provide an audible clicking as the activation portion is turned during activation of the release portion.

Figure 4A:
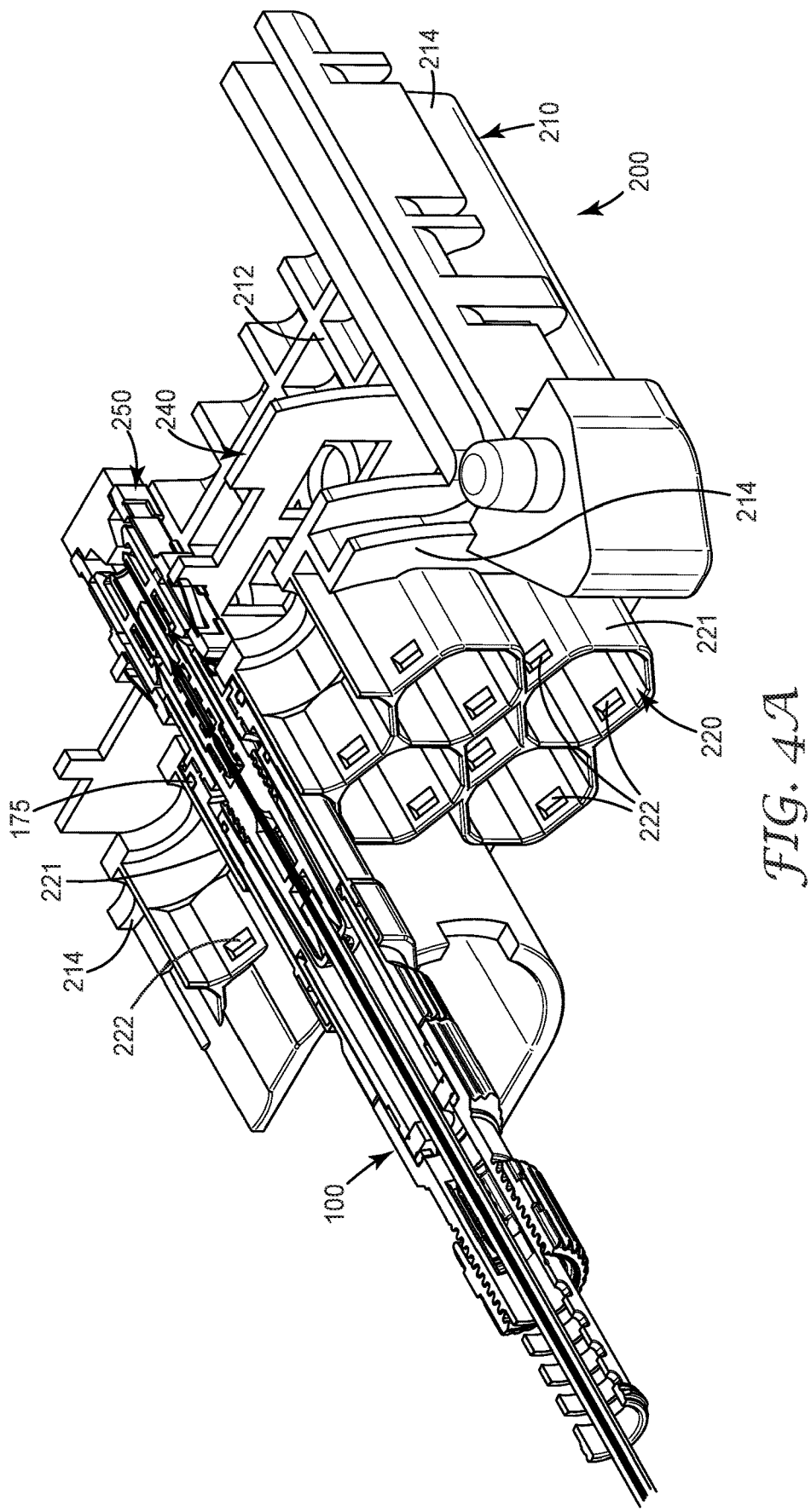
FIG. 4A shows the exemplary optical fiber connector of FIGS. 1A-1C installed in the port of a telecommunication enclosure.
Figure 4B:
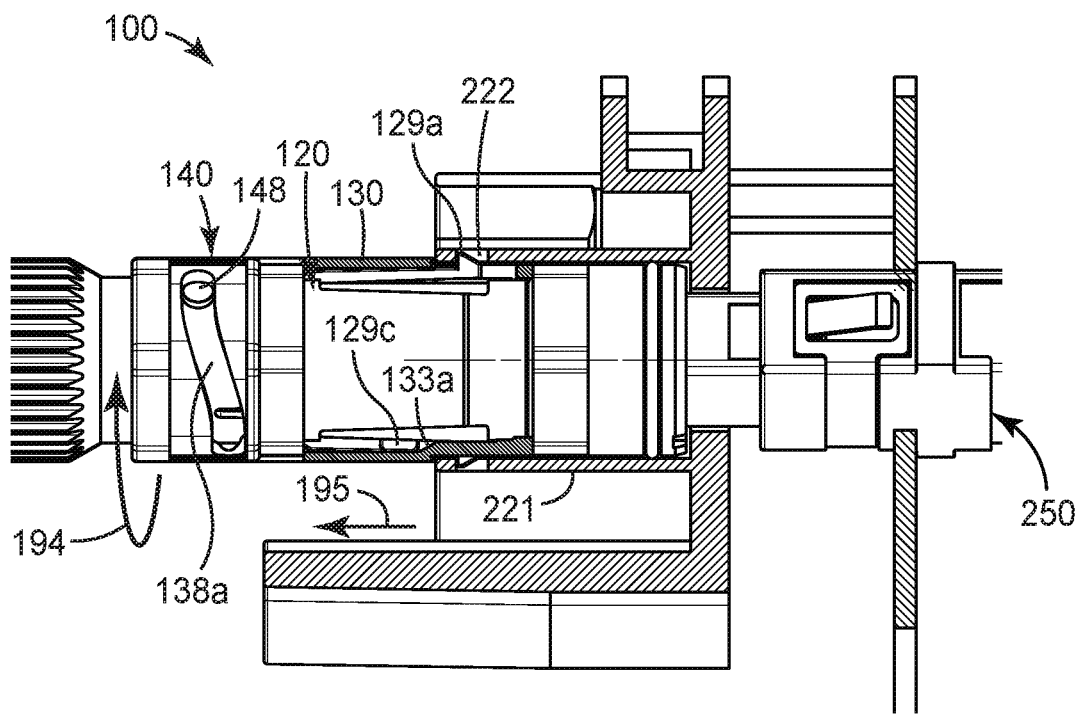
FIGS. 4B-4C illustrate a release mechanism of the exemplary optical fiber connector of FIGS. 1A-1C from the port of a telecommunication enclosure.

Body portion 120 can further include one or more engagement features 129 formed on and extending from the outer surface of the body portion between groove 127 and connection portion 128. The engagement features can help ensure the proper positioning of the body portion within the release portion while allowing the release portion a degree of movement, for example linear movement, relative to the body portion. The engagement features can also be used to secure optical fiber connector 100 within the port of a telecommunication enclosure. In the exemplary aspect shown in FIGS. 2A-2C, the engagement features 129 are in the form of cantilevered arms 129a that have a barb or projection 129b adjacent to the free ends of the cantilevered arms and a deflection tab 129c extending from a side of the cantilevered arm. The cantilevered arms can be deflected toward the body portion as the body portion is inserted into the release portion 130 to allow the projection on the end of the cantilevered arm to slide through the internal bore 133. The arm will return to its original configuration when projection 129b engages with window 139 in the release portion and when the deflection tab clears internal cam 133a (FIG. 4B) formed on the interior surface of the internal bore through the release portion. In an exemplary aspect, window 139 can be slightly wider than the width of the cantilevered arm and the projection on the end of the arm so that a portion of the cantilevered arm can extend through the window beyond the surface of the release portion to engage with an exterior section 421 of a telecommunication port 420 (FIG. 4B). Moving the body portion of the assembly base with respect to the release portion can change the distance that the cantilevered arm extends beyond the surface of the release portion and can thus be used to disengage optical connector 100 from a port of a telecommunication enclosure as is described in additional detail with respect to FIGS. 4A-4C.

As previously mentioned, release portion 130 includes an internal bore 133 that extends from a front edge 131 to a rear edge 132 of the release portion. The release portion is configured to be close fitting with the port of a telecommunication enclosure into which the exemplary connector 100 will be inserted. The release portion 130 can have a groove 137 formed in the external surface of the release portion to receive an external sealing member 175. In the exemplary aspect shown in FIG. 2A, groove 137 is formed near the front edge 131 of release portion to receive an external sealing member 175, such as an o-ring. This external sealing member can provide an environmental seal between the assembly base of the exemplary optical fiber connector and the port of a telecommunication enclosure into which the exemplary connector is inserted. Specifically, the external sealing member forms an environmental seal between the interior wall of the exterior section 221 of the port 220 of a telecommunication enclosure (FIGS. 4A-4B). Thus, the environmental sealing of the port is simplified over the conventional connector/receptacle system due to the elimination of one environmental seals (i.e. the seal between the receptacle and the port of the telecommunication enclosure) required by the conventional system.

The release portion 130 can have a connection portion 138 adjacent to the rear edge 132 of the release portion. The connection portion 138 can include at least one bayonet channel 138a that cooperates with at least one external peg 148 disposed on an external surface of the activation portion 140. In the exemplary embodiment of optical fiber connector 100, the release portion can include two bayonet channels 138a disposed on opposite sides of the release portion and the activation portion can have two external pegs 148 that are configured to engage with the bayonet channels. Thus, the activation portion can be slid into the second end 132 of the release portion so that the external pegs are disposed in the two bayonet channels 138a.

When the exemplary optical fiber connector needs to be removed from the port of the telecommunication in which the connector is installed, activation portion 140 can be rotated such that the external pins slide in bayonet channels 138a causing the release portion to move back within the exterior section 221 of the port 220. The removal of exemplary connector 100 from the port of a telecommunication enclosure will be discussed in additional detail in reference to FIGS. 4B-4C.

A dust sleeve 135 can be fitted over the second end of release portion 130 to cover bayonet channels 138a as shown in FIG. 2C. The dust sleeve can prevent dust and grit from collecting in the bayonet channels that might prevent actuation of the release portion.

As previously mentioned, an internal sealing member 170 can be disposed between the strain relief assembly and the second end of the assembly base 110 to provide an environmental seal between the optical fiber connector 100 and the jacket of a telecommunications cable 50 installed therein. In one exemplary aspect, internal sealing member 170 can include an elastomeric ring portion 170a and a segmented rigid portion 170b as shown in FIG. 1C. The elastomeric ring portion provides the sealing and cable gripping capability to the optical fiber connector to a telecommunication cable passing through the sealing member, and the segmented rigid portion serves as skids to allow the strain relief assembly to rotate freely when the strain relief assembly is being secured to the second end of the body portion of the exemplary optical fiber connector 100. In an alternative aspect, the internal sealing member can be in the form of a conventional elastomeric grommet. Optionally, the internal sealing member can have a radial slit (not shown) to allow the telecommunication cable to be slipped into the internal sealing member from the edge of the sealing member. The internal sealing member can be formed by a two step molding process when the segmented rigid portion is formed of a rigid plastic material such as poly carbonate or polybutylene terephthalate, for example, or by an insert molding process when the rigid portion is formed of a rigid plastic material or metal.

In an exemplary aspect, the elastomeric portion of the internal sealing member can be formed from one of an ethylene propylene diene monomer (EPDM) rubber, a silicone rubber, a polyurethane elastomers or rubbers, natural rubber, a fluoroelastomer or other suitably soft resilient materials.

In an alternative aspect, the segmented rigid portion can be replaced by a slit ring made of either plastic or metal that can either be integrally formed with the internal sealing member or can be a separate piece which is positioned between the internal sealing member and the strain relief assembly during assembly of the exemplary connector.

Figure 3A:
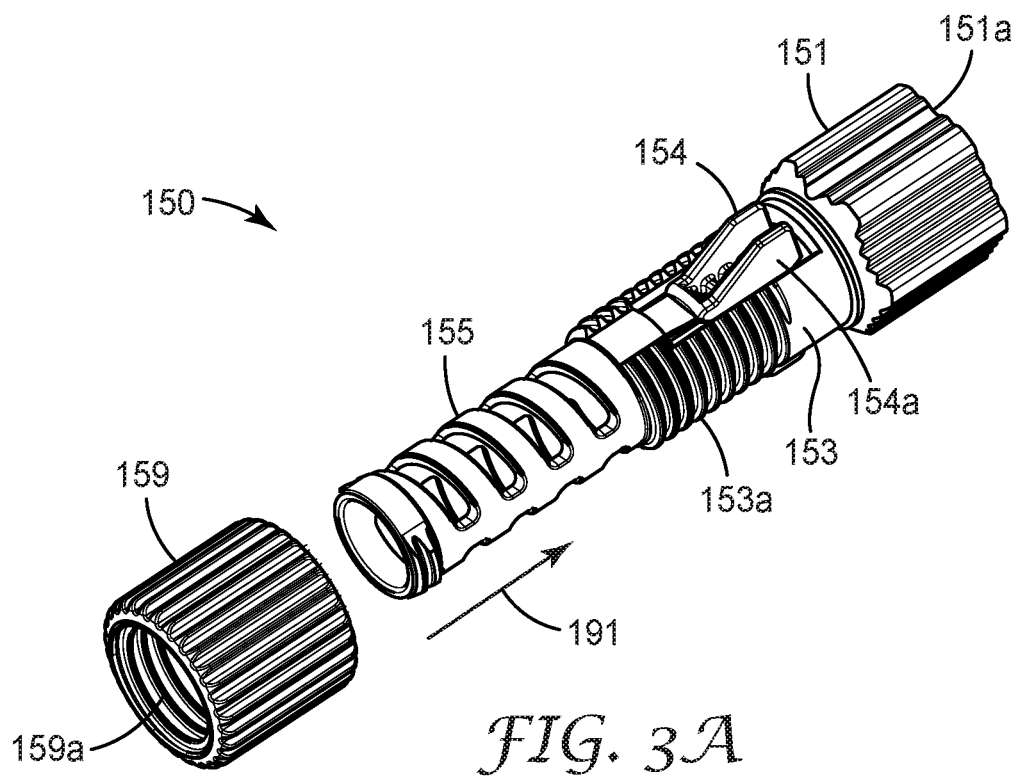
FIGS. 3A-3C show three detail views of an exemplary strain relief assembly of the optical connector of FIGS. 1A-1C.
Figure 3B:
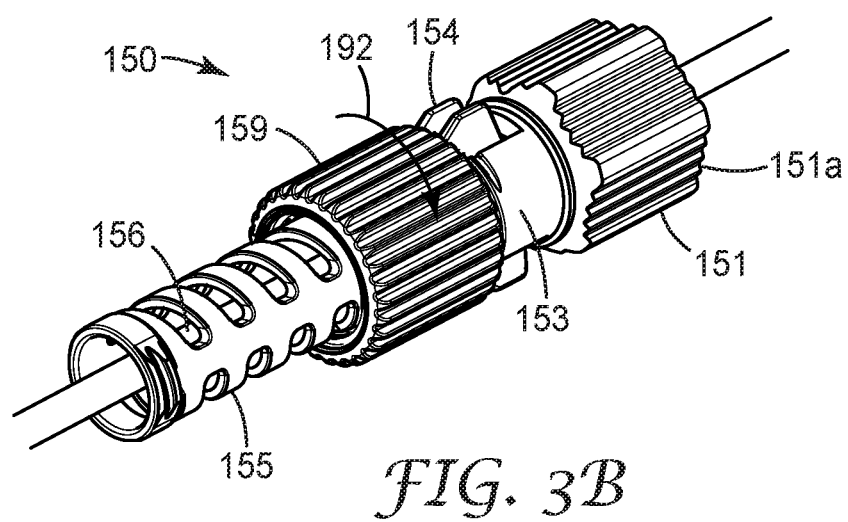
Figure 3C:
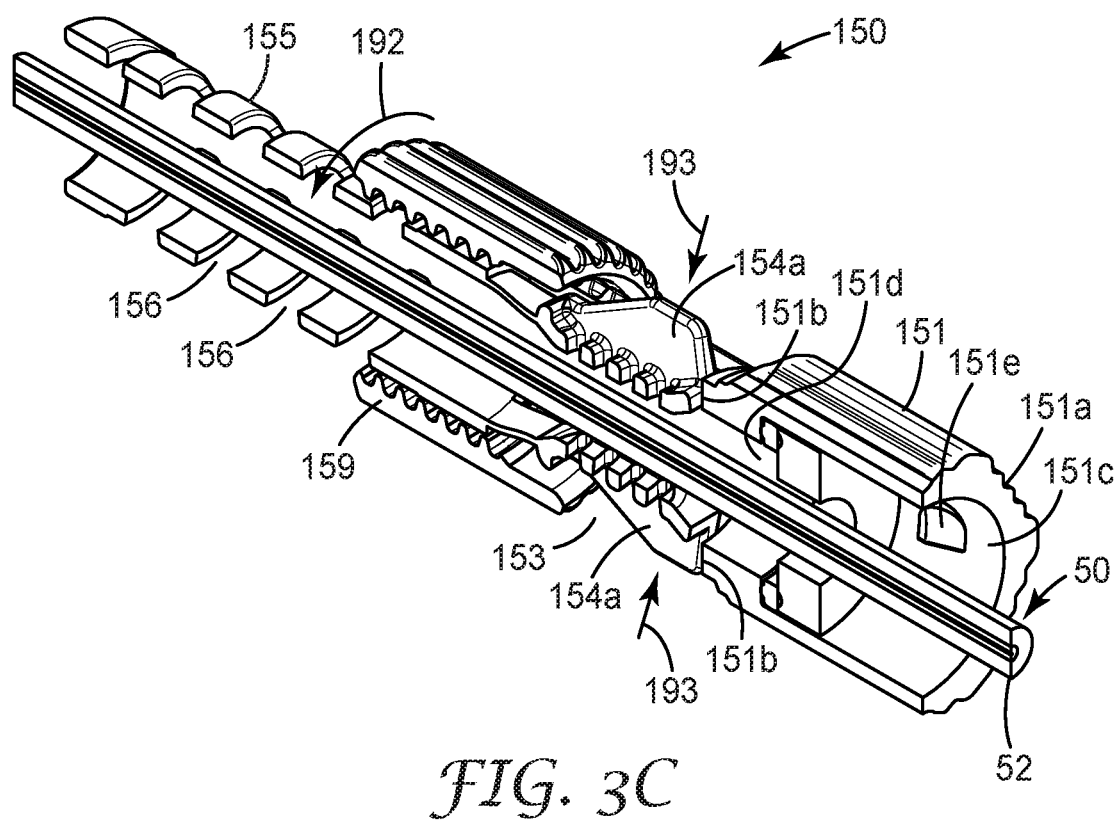

Strain relief assembly 150 can be seen in FIGS. 1A-1C in relation to the rest of the components of optical fiber connector 100 and in detail in FIGS. 3A-3C. Strain relief assembly 150 includes a connection portion 151 having a first opening 151c at a first end 151a thereof to accept the second end 122 of body portion 120 of the assembly base 110 and a smaller second opening 151d at the second end 151b of the connection portion to accommodate the passage of a telecommunication cable 50 therethrough. The strain relief assembly can further include at least one internal peg 151e (FIG. 3C) disposed within the connection portion that cooperates with the corresponding bayonet channel 128a on the body portion 120 (FIG. 2A) of the optical fiber connector to secure the strain relief assembly to the body portion and compress the internal sealing member therebetween.

Strain relief assembly 150 also includes a cable clamping portion 153 configured to clamp onto the jacket 52 of a telecommunication cable passing therethrough when the clamping collar 159 is secured over the clamping portion. The clamping portion includes one or more clamping elements 154 that can be actuated to grip the cable jacket 52 of a telecommunication cable when the clamping collar is disposed over the one or more clamping elements. In an exemplary aspect, the clamping elements 154 can be a pair of wedge shaped collet fingers 154a that are attached to the cable clamping portion 153 at the thin end of their wedge shape as shown in FIGS. 3B and 3C. The cable clamping portion 153 can further include an external thread 153a that is configured to mate with an internal thread 159a in the clamping collar 159. As the clamping collar is screwed onto the clamping portion in a direction indicated by directional arrow 192, the clamping collar squeezes the wedge shaped collet fingers inward (as indicated by directional arrow 193) to grip the jacket of the telecommunication cable between opposing collet fingers. In an exemplary aspect, the clamping elements can include one or more ridges or teeth to bite into the cable jacket when the clamping collar actuates the clamping elements.

Strain relief assembly 150 can further include an integral bend control boot 155 attached to the clamping portion of the strain relief assembly. The bend control boot prevents the telecommunication cable from exceeding its minimum bend radius which could result in degradation of the signal being carried by the telecommunication cable. The bend control boot can have a segmented form having a plurality of gaps 156 disposed along its length to improve the flexibility of the bend control boot. The size (i.e. the width and length) of the gaps can be modified to tailor the flexibility of the bend control boot. In one exemplary aspect, a plurality of uniform gaps can be dispersed uniformly along the length of the bend control boot. In an alternative aspect, thinner gaps can be disposed near clamping portion where minimal bending may be desirable and can gradually widen along the length of the bend control boot such that the flexibility of the bend control boot increases the further it gets from clamping portion. The gaps can be disposed perpendicular to the longitudinal axis of the bend control boot. In an alternative aspect the gaps are disposed at a skewed angle with respect to the longitudinal axis of the optical fiber connector such that the bend control boot has the appearance of a segmented coil. In an exemplary aspect, the connection portion 151, clamping portion 153 with clamping elements 154 and the bend control boot 155 of the strain relief assembly can be molded as a single integral part as shown in FIGS. 3A-3C.

Figure 15B:
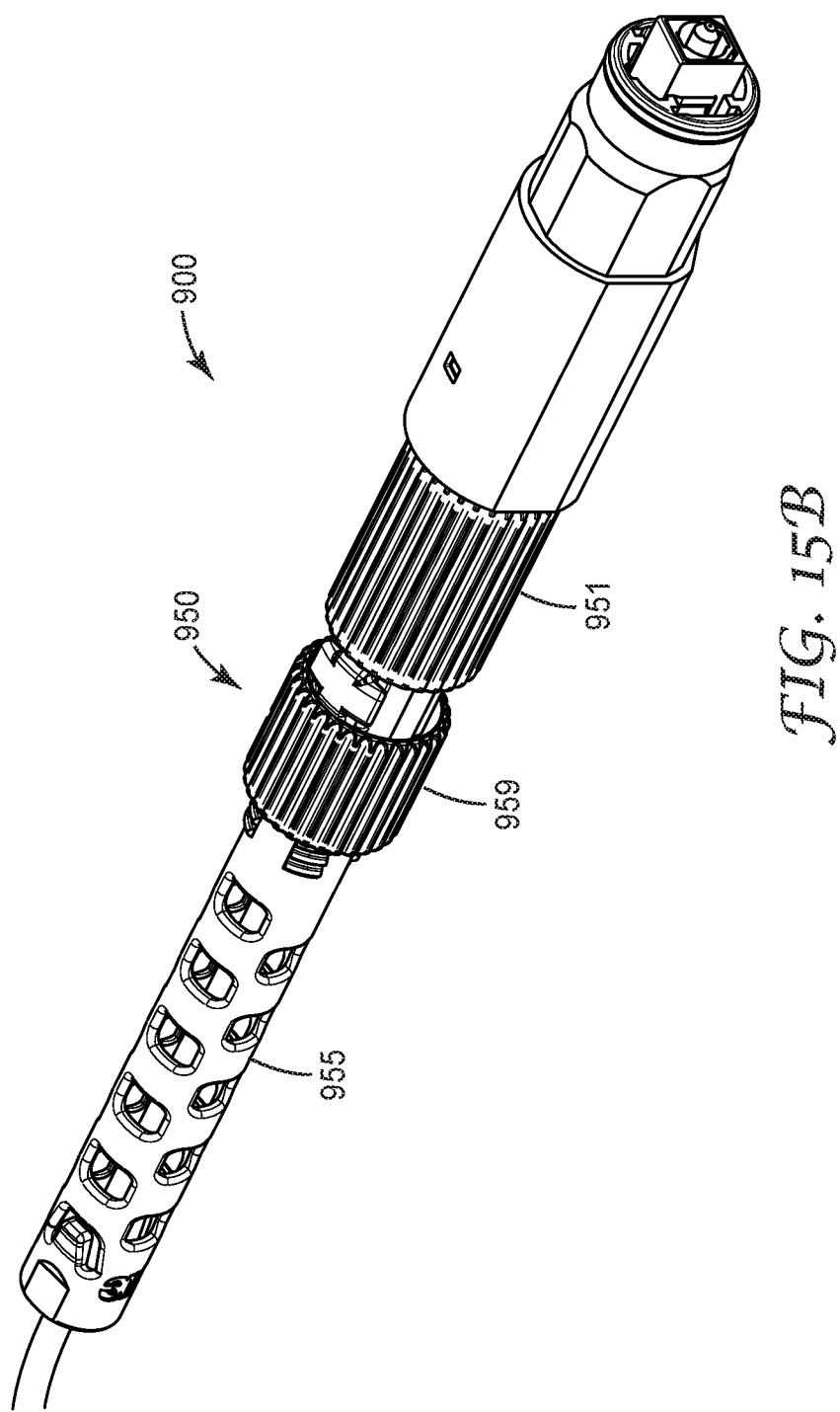

In an alternative embodiment of an exemplary strain relief assembly 950 shown in FIGS. 15A-15B, the connection portion 951 can be molded as a separate part from the clamping portion 953 and the bend control boot 955 which can be molded as a single unit. FIG. 15A is an exploded view of strain relief assembly 950, while FIG. 15B shows the exemplary strain relief assembly as part of optical connector 900. The advantage of strain relief assembly 950 is that the connection portion can be free to rotate with respect to the clamping portion, which can allow the connection portion to be tightened or loosened without exerting undue torsion on the telecommunication cable passing therethrough. In this embodiment (best illustrated in FIG. 15A), the clamping portion 953 can include a lip 953c on its first end 953b wherein the outer circumference of the lip is larger than the circumference of the opening 951c at the second end 951b of the connection portion 951 such that the clamping portion is anchored to the connection portion when the first end of the clamping portion is installed in the connection portion. Another variation in the strain relief assembly is shown in FIG. 15A where the clamping elements can also be molded as separate parts which can be fitted into retention slots 953d in the cable clamping portion 953. The cable clamping portion 953 can further include an external thread 953a that is configured to mate with an internal thread 959a in the clamping collar 959. As the clamping collar is screwed onto the clamping portion, the clamping collar will push the clamping elements inward to grip the jacket of the telecommunication cable between opposing clamping elements.

While in another exemplary aspect, the bend control portion can be connected directly to the second end of the connection portion in installations where additional strain relief is unnecessary or the bend control portion can have a lip having a circumference greater than the circumference of opening 951c at the second end 951b of the connection portion 951.

Referring again to FIGS. 3A and 3B, clamping collar 159 can be slid over the bend control boot 155 in a direction indicated by arrow 191 until the internal threads of the clamping collar engage with the external threads 153a of clamping portion 153. The clamping collar is then turned onto the clamping portion via the mating threads in a direction indicated by arrow 192 shown in FIG. 3C. As the collar is turned onto the threaded portion the clamping elements are pushed inward as indicated by directional arrow 193 (FIG. 3C) to grip the jacket 52 of the telecommunication cable 50 passing there through.

Referring again to FIGS. 1A-1C, optical connection portion 160 can include an outer housing 161 having an external connection portion with an external thread 162 adjacent to the second end 161b that is configured to attach the optical connection portion to assembly base 110. The outer housing is configured to hold the internal components of a standard optical fiber connector (e.g. the backbone 165, collar body 164, ferrule 166 and boot 167 as shown in FIGS. 1A and 1B) within the outer housing. The internal optical fiber connector components can be similar to the internal components of the field mountable fiber optic connector described in commonly owned U.S. Patent Publication No. 2011/0044588, incorporated herein by reference in its entirety. Alternatively, the internal optical fiber connector components can be similar to 3M™ No Polish Connectors, 3M™ Crimplok™ Fiber Optic Connectors available from 3M Company or other field mountable connector styles for field termination applications or conventional epoxy connectors for a factory termination applications.

The external thread 162 of outer housing 161 is configured to engage with an internal thread (not shown) disposed in the interior passageway 123 (FIG. 2A) that extends through the body portion 120 of assembly base 110 of optical connector 100. In the exemplary aspect shown, external thread 162 can be a course pitch thread that corresponds with the internal thread in the assembly base. After mounting the internal connector components onto the terminal end of an optical connector, the backbone is inserted into the outer housing until it snaps into place. Connection portion 160 is then inserted into the first end of the assembly base and secured in place via the course pitch threads which securely attaches the optical connection portion to the assembly base while minimizing the torsional effects on the cable within the exemplary optical fiber connector resulting from the attachment of the connection portion to the assembly base. In an exemplary aspect, the optical connection portion can be attached to the main body by engaging the threads and rotating the optical connection portion 120° with respect to the main body, although other degrees of rotation are a matter of design choice. In an alternative aspect, the connector portion can be attached to the assembly base by an adhesive, snap-fit or other mechanical connection mechanism.

In one aspect, optical connection portion 160 is configured with an SC format outer housing 161. However, as would be apparent to one of ordinary skill in the art given the present description, the optical connection portion and the outer housings could be configured to have other standard formats, such as MT, MPO, ST, FC, and LC connector formats as well as utilizing other connector styles such as factory mounted connectors.

Exemplary optical fiber connector 100 is assembled by first sliding the strain relief assembly 150 including clamping collar 159, the internal sealing member 170 and an optional boot 167 of the optical connection portion over the telecommunication cable 50 for later use.

For field termination, an optical connection portion having a mechanical gripping/splice element 169 can be used. The optical connection portion can be a remote grip connector such as 3M's Crimplok+Optical Connector or can be a fiber stub connector such as 3M's No-Polish Connectors. Telecommunication cable 50 is prepared by cutting away a portion of the cable jacket 52 and stripping off a coated portion of the optical fiber 54 near the terminal end of the optical fiber leaving a bare glass fiber portion. The exposed bare glass portion is cleaved (flat or angled) to the desired length.

The prepared end of the telecommunication cable 50 is inserted through the rear end of the backbone 165 of a partially pre-assembled optical connector that includes the collar body ix) 164 holding the mechanical gripping/splice element and ferrule secured within the backbone. In this manner, the prepared fiber end can be fed through the ferrule or spliced to the fiber stub with the mechanical gripping/splice element 169 within the collar body disposed in backbone 165. The boot 167, if present, is then pushed axially toward the backbone 165 and screwed onto the backbone mounting section to secure the boot in place completing the mounting of the partially pre-assemble optical connection portion onto optical fiber cable 50. The partially pre-assembled optical connection portion is then snapped into outer housing 161 to complete the assembly of connection portion 160.

Assembly base 110 is moved forward over the back end of the optical connection portion 160. The optical connection portion is rotated to secure of the optical connection portion 160 to the body portion 120 of the optical connector via threads 162 on outer housing 161.

The internal sealing member is pushed along telecommunication cable 50 and until it contacts with the second end 112 of the base assembly 110. Strain relief assembly 150 is slid forward and secured to the body portion by engaging the strain relief assembly with the second end 112 of the body portion 120. The tightening of the strain relief assembly 150 to the body portion compresses the internal sealing member. In an alternative embodiment, the internal sealing member can be fitted over the cable just prior to securing the strain relief assembly to the body portion by inserting the cable into the sealing member by through the radial slit in the internal sealing member.

Finally, the clamping collar 159 is slid over the bend control boot 155 of strain relief assembly 150 in a direction indicated by arrow 191 in FIG. 3A until the internal threads of the clamping collar engage with the external threads 153a of clamping portion 153. The clamping collar is then turned onto the clamping portion via the mating threads in a direction indicated by arrow 192 shown in FIG. 3B causing clamping element 154 to tighten against the jacket of the telecommunication cable, thus, completing the assembly of connector 100.

FIG. 4A shows the exemplary optical fiber connector 100 installed into a standard optical connector coupling 250 within a portion of a telecommunication enclosure 200 when the optical connector is inserted through a port of the enclosure. The telecommunication enclosure can be a terminal enclosure such as a BPEO S1 16 S7 (Stock number N501714A) available from 3M Company (St. Paul, Minn.).

The exemplary telecommunication enclosure 200 of FIG. 4A includes a base 210 and a cover or main body (not shown) removably securable to the base. The base of the telecommunication enclosure shown in the figures includes a bottom wall 212 and a plurality of side walls 214 extending approximately perpendicularly from the bottom wall and adjoined to one another at the corners of the enclosure. At least one of the side walls can include at least one port 220 for receiving an optical fiber connector of the present invention. The exemplary port can be a hexagonal port having an exterior section 221 disposed outside of the enclosure. The exemplary port can have other geometric configurations such as a generally cylindrical or tubular shape, a rectangular shape or other polygonal shape. The exterior section 221 of port 220 includes a pair of openings 222 disposed on opposing side of the exterior section that are configured to accept projections 129b (FIG. 1A) of optical fiber connector 100 when the optical fiber connector is fully engaged in the port of the telecommunication enclosure as shown in FIG. 4A.

When optical fiber connector 100 is fully inserted into the port 220, the engagement features 129 of optical fiber connector 100 engages with the opening 222 in the exterior section 221 of the port to secure the optical fiber connector in place. When the optical fiber connector is properly seated in the port of the telecommunication enclosure, the external sealing member 175 of the optical fiber connector provides a water tight seal between the internal circumference of the exterior section 221 of the port and the optical fiber connector.

A standard format optical coupling 250 can be inserted into openings in a patch panel 240 that can be anchored within the telecommunication enclosure 200 parallel to the sidewall having the ports 220 disposed therein and can be secured to the base of the telecommunication enclosure by mechanical fasteners (not shown) or other anchoring mechanism. The patch panel is disposed proximate to the side wall 214 with the ports 220. The standard format optical couplings are mounted in the patch panel such that they align with the ports of the enclosure allowing an optical connection to be made when optical fiber connector 100 is fully inserted into the port.

Figure 4C:
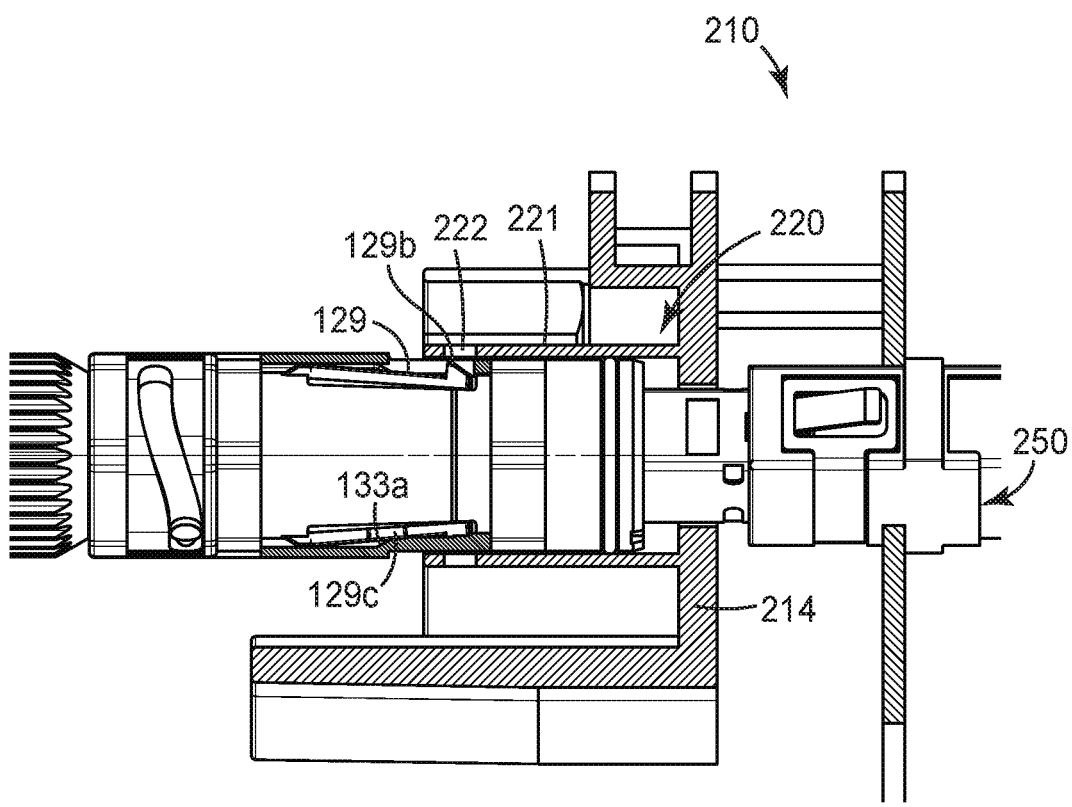

In order to extract optical fiber connector 100 from the port 220, the activation portion 140 is turned in the direction indicated by arrow 194 in FIG. 4B. The pegs 148 on the surface of the activation portion ride in the bayonet channels 138*a* formed in release portion 130 causing the body portion 120 with attached connection portion 160 of the optical fiber connector to be moved in the direction indicated by arrow 195 in FIG. 4B. As the release portion moves away from the sidewall 214 of the base 210 of the telecommunication enclosure 200, the engagement features 129 formed on the body portion 120 of the optical fiber connector 100 contact the cam 133*a* formed within the release portion and are deflected toward the outer surface of the body portion until the projections 129*b* on the free end of the engagement features disengage from the openings 222 in the exterior section 221 of telecommunication closure port 220, as shown in FIG. 4C, allowing optical fiber connector 100 to be removed from the port by the application of an extraction force that is sufficient to overcome the holding force of the outer housing 161 of the optical fiber connector by optical connector coupling 250. Thus, connector 100 utilizes a twist-to-pull release mechanism to disengage the connector from the port of a telecommunication enclosure.

In alternative embodiments, an exemplary optical fiber connector can be mated with an optical coupling disposed at least partially within the port of a telecommunication enclosure, such that the optical interface between the two optical fiber connectors being mated by the optical coupling is located near the plane created by the sidewall of the telecommunication enclosure. The desire for higher pull-out strength as well as the desire for a high density of connections has resulted in modified optical coupling designs that are configured to accept the external (i.e. outside of the telecommunication enclosure) exemplary optical fiber connector of the present disclosure and a conventional format optical fiber connector on the interior of the telecommunication enclosure.

While the exemplary telecommunication enclosure described above includes a base and a separate cover, the telecommunication enclosure can be an in-line closure having a base and a cover that are attached together by a hinge, a dome style enclosure, a wall mount enclosure, an optical network terminal or other style of telecommunication enclosure so long as it has the port structure describe above (i.e. a port having an exterior section or sleeve extending outside of and around the port).

Figure 5A:
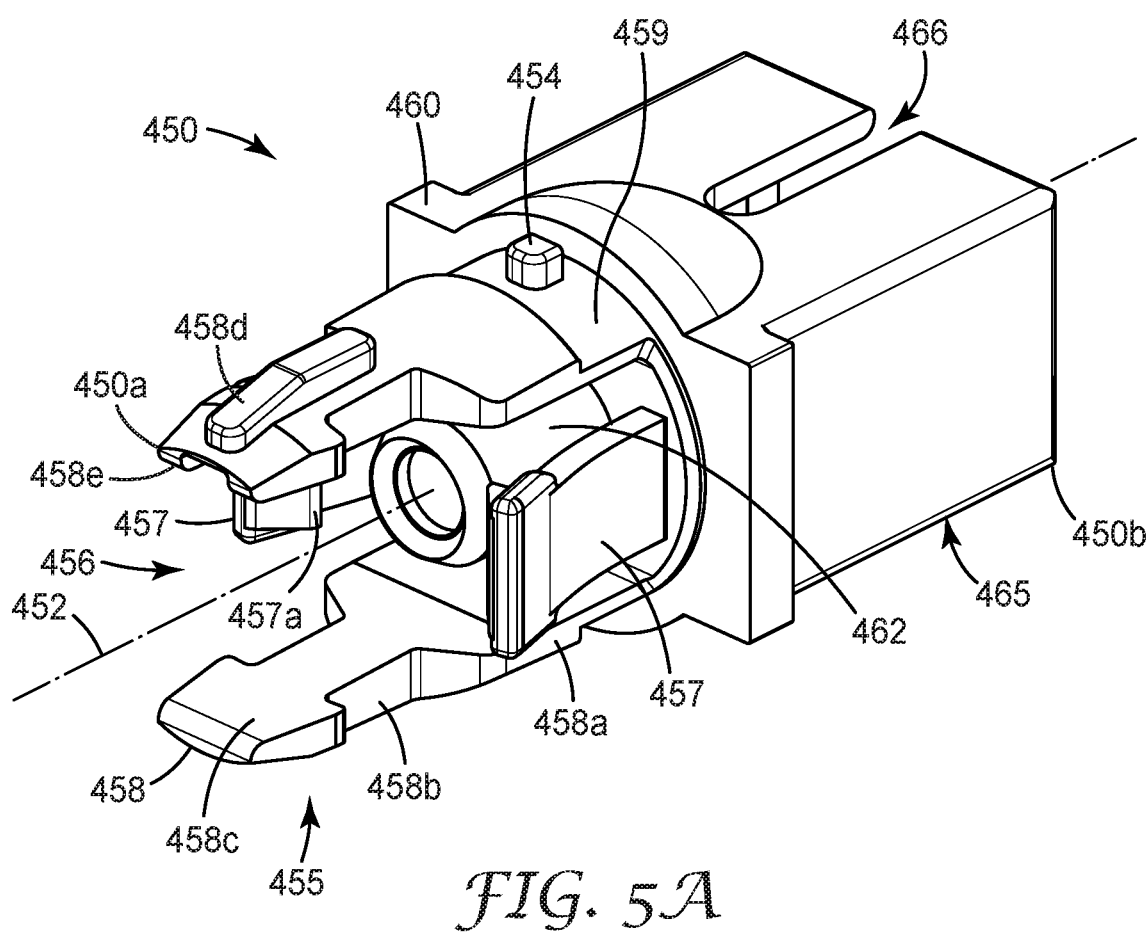
FIGS. 5A-5C show three views of a modified coupling usable with an exemplary optical fiber connector according to an aspect of the present invention.
Figure 5B:
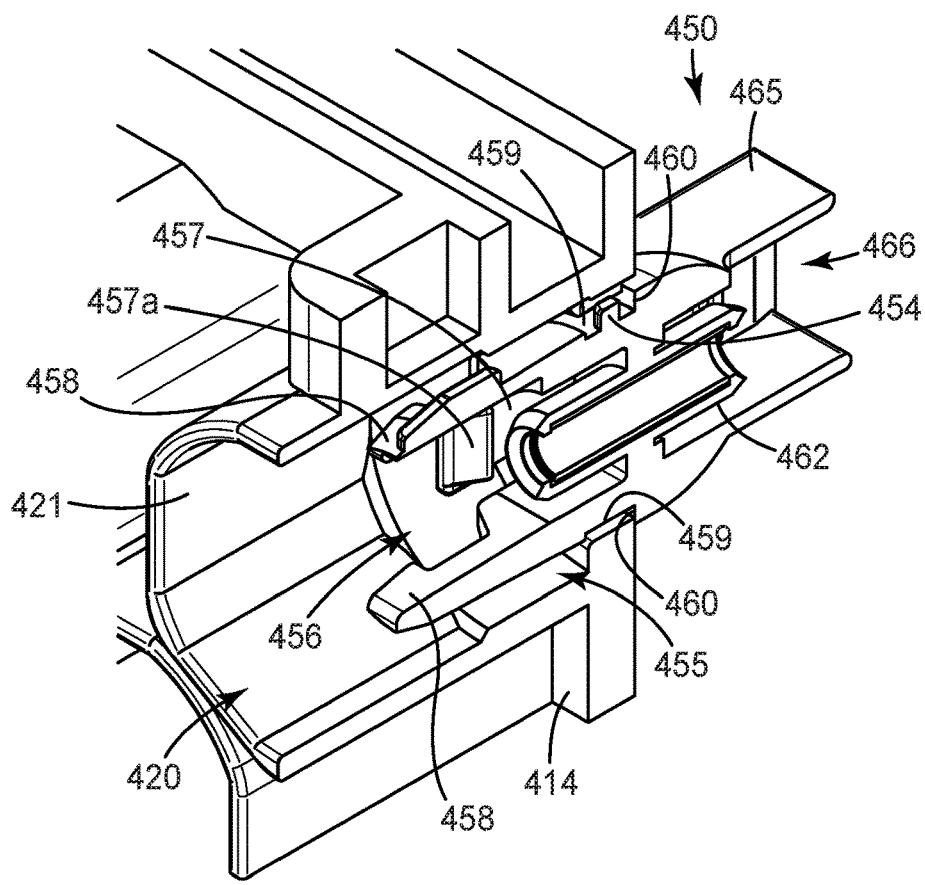
Figure 5C:
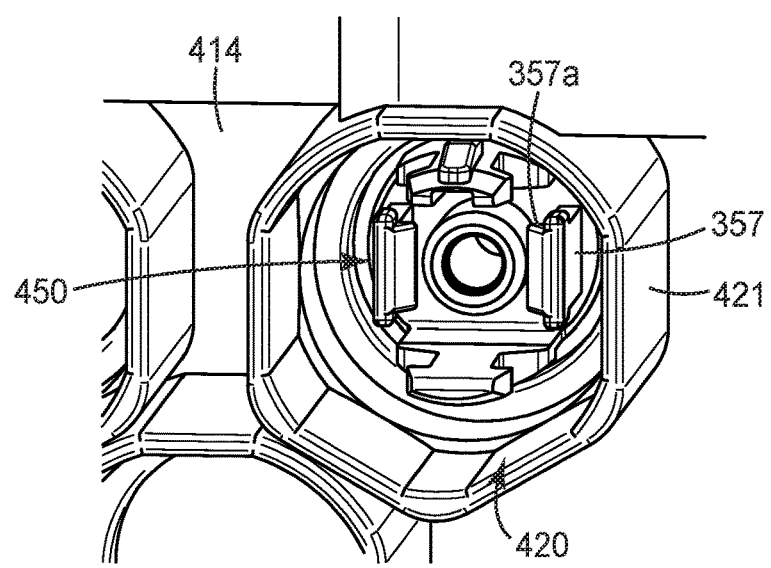

FIGS. 5A-5C show an exemplary modified optical coupling 450 that can be partially inserted into the port 420 of a telecommunication enclosure from the interior of the enclosure. Optical coupling 450 has been modified for higher density applications than can be satisfied by the more conventional box shaped optical couplings, such as optical coupling 250 shown in FIG. 4A-4C. In addition, optical coupling 450 has two additional attachment points than are present in a conventional optical coupling designs, thus enabling a higher pull out strength of the exemplary optical fiber connectors described herein and improving the reliability of the optical connection interface when forces are exerted on the telecommunication cable on which the exemplary optical fiber connector is mounted.

Optical coupling 450 can have a first side 450*a* and a second side 450*b* disposed on either side of a flange 460 and includes first optical fiber connector housing 455 disposed on a first side of the flange, a second connector housing 465 on a second side of the flange 460 and a ferrule alignment sleeve 462 disposed along the central axis 452 of the optical coupling and extending through the flange into each of the first and second connector housings. Flange 460 is configured to abut against the interior surface sidewall of the telecommunication enclosure adjacent to the port in which the optical coupling is inserted and to retain the optical coupling within the port when an external force is exerted on the telecommunication cable or the optical fiber connector mounted on the telecommunication cable that is inserted to the optical coupling from outside of the telecommunication enclosure. In an exemplary aspect, optical coupling 450 can be at least partially disposed within the port (i.e. the first connector housing can disposed within the exterior section 421 of the port 420 and the second connector housing disposed within the interior of the telecommunication enclosure as shown in FIGS. 5B-5C). Thus, the connection point between the optical coupling and an optical connector installed therein is protected by the external section of the port.

Each of the connector housings 455, 465 includes a connector port 456, 466 respectively, that is configured to receive a corresponding optical fiber connector and align the connector ferrules to one another.

Figure 6B:
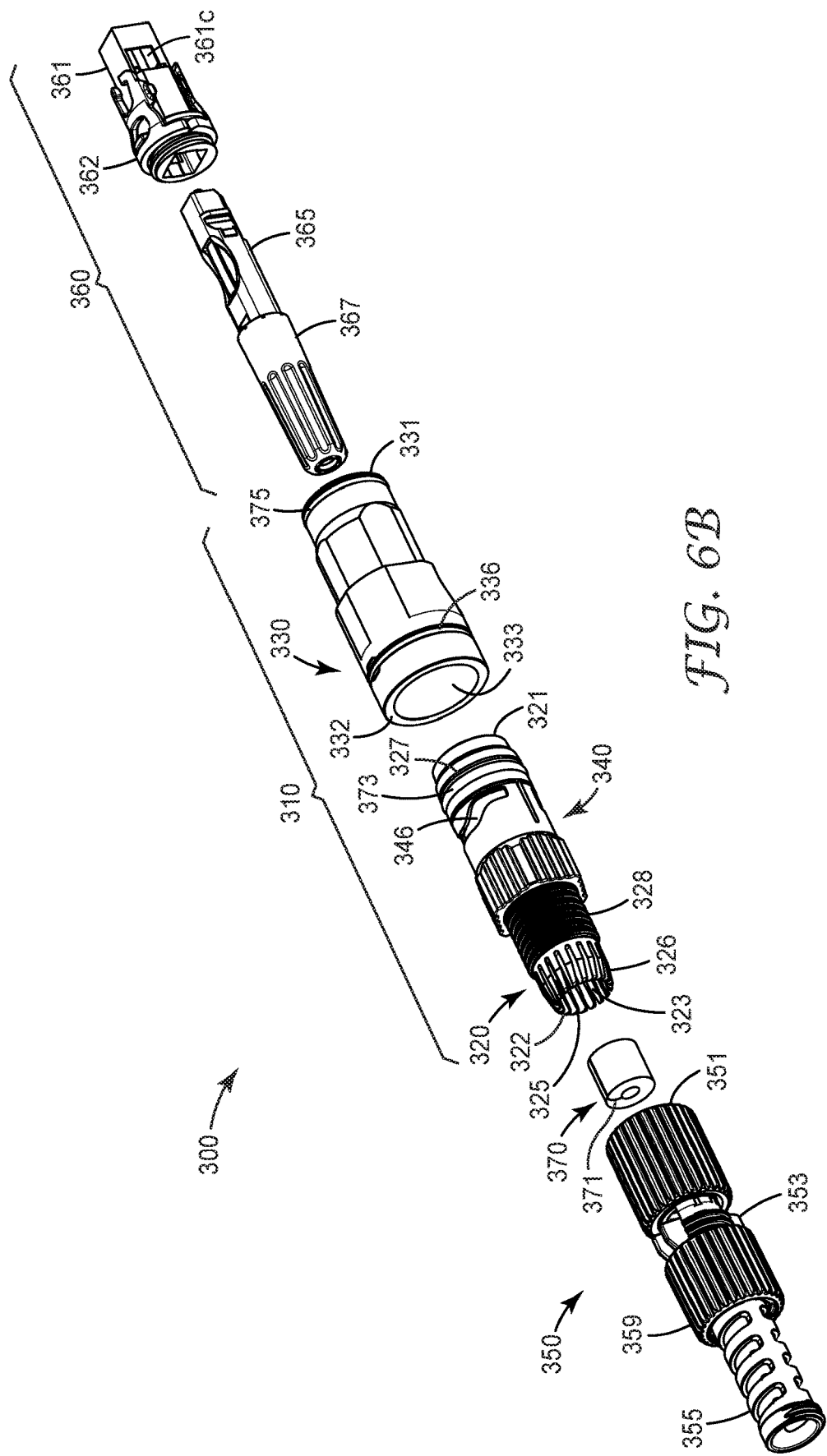
Figure 6C:
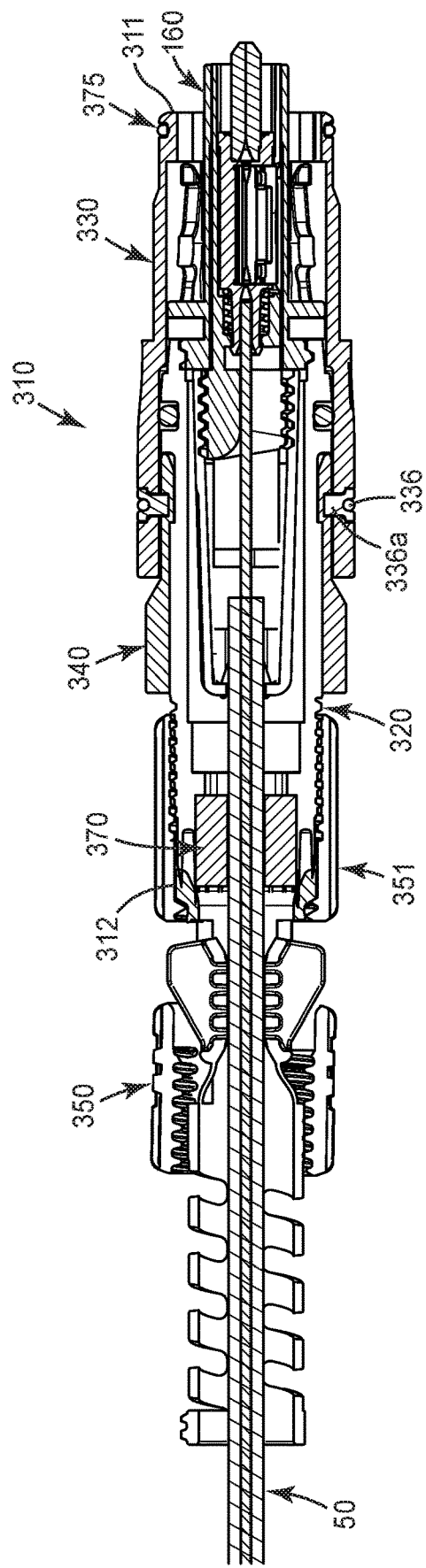

In an exemplary aspect, first connector housing 455 can be configured to accept exemplary optical fiber connector 300 shown in FIGS. 6A-6C or a conventional standard format connector such as an SC-format connector. This feature can allow the connection of test equipment that includes a conventional optical fiber connector to be inserted and secured into the coupling, which is not possible with receptacles that mate with conventional ruggedized connectors.

The second connector housing 465 can be configured to accept a mating connector disposed in the interior of the telecommunication enclosure. The mating connector can have any standard connector format, such as MT, MPO, SC, ST, FC, or LC connector format. The second connector housing 465 will have a corresponding format, for example an SC-format. The second connector housing can include catch mechanism (not shown) similar to that found in conventional optical couplings to secure the mating connector to optical coupling 450.

First connector housing 455 can be configured to accept the outer housing 361 of the connection portion 360 of exemplary optical fiber connector 300. The first connector housing includes a pair of latches 457 and a pair of latch arms that mate with engagement features in the outer housing of the optical connection portion of the exemplary optical fiber connector. Latches 457 have a hooked portion 457*a* on the free end thereof, the hooked portions are configured to be received by receiving windows 361*c* (FIGS. 9A-9B) formed in the outer housing of optical fiber connector 300 and constitute the first two connection points between optical fiber connector 300 and optical coupling 450. In addition, the first connector housing also includes a pair of latch arms 458 that enable two additional connection points between optical fiber connector 300 and optical coupling 450 that are not available in conventional optical couplings.

In the exemplary aspect shown in FIGS. 5A-5B, each latch arm 458 can have a base portion 458*a* adjacent to flange 460, a terminal portion 458*c*, and a waist portion 458*b* disposed between the terminal portion and the base portion. The terminal portion is wider than the waist portion such that the terminal portion can be retained in C-shaped catch 364a (FIG. 9B) of the optical fiber connector's optical connection portion which will be described in additional detail below. In addition, the terminal portion of at least one of latch arms 458 can include a rib 458d formed on its outer surface. Rib 458d can be inserted in a slot 333e (FIG. 7C) to ensure proper alignment of optical fiber connector with optical coupling 450 when the connector is inserted into the coupling. An optional alignment slot 458e can be formed on the inside surface of terminal portion 458c to provide keying when a standard format optical connector is inserted into first housing 455 of optical coupling 450.

Referring to FIGS. 5A and 5B, the base portions 458a of the latch arms 458 have a recessed channel 459 formed adjacent to the flange 460 which is configured to closely fit the opening through the side wall 414 that defines the port in the telecommunication enclosure. When installed in the port, the side wall of the enclosure resides between the walls on either side of the recessed channel 459 to ensure proper positioning of the optical coupling and securely fix the optical coupling in the port. Latch arms 458 can flex inward to allow the first end of the optical coupling to pass through the opening in the side wall of the telecommunication enclosure until the sidewall is positioned in the recessed channel adjacent to flange 460 releasing the pressure on the latch arms and allowing them to return to their original position, thus locking optical coupling 450 in the port of the telecommunication enclosure. When an optical connector is inserted into the first housing 455 of optical 450, the optical connector advantageously pushes latch arms 458 apart to ensure that the coupling cannot be removed from the port when an optical coupling is inserted into the first side of the optical coupling.

In an exemplary aspect, optical coupling 450 can include a keying nub 454 to allow insertion of optical coupling into the port having a corresponding notch formed in the port opening, so that the optical coupling is inserted into the port in a known orientation, which can be advantageous when the first housing of the optical coupling resides within an exterior sleeve or section 421 of the port 420 which can limit visual verification that the optical coupling was properly installed in the port.

Referring to FIGS. 6A-6C, optical fiber connector 300 includes an assembly base 310 having a first end 311 and a second end 312, a strain relief assembly 350 attachable to the second end of the assembly base and an optical connection portion 360 having a ferrule 366 disposed therein that defines an optical connection interface, wherein the optical connection interface can be attached to the first end of the assembly base. The strain relief assembly applies a radial force to the second end of the assembly base compressing an internal sealing member 370 to provide an environmental seal between the optical fiber connector 300 and the telecommunications cable to which it is connected. In addition, optical connector 300 includes at least one engagement feature that is configured to secure the optical fiber connector within a port of a telecommunication enclosure.

Figure 7B:
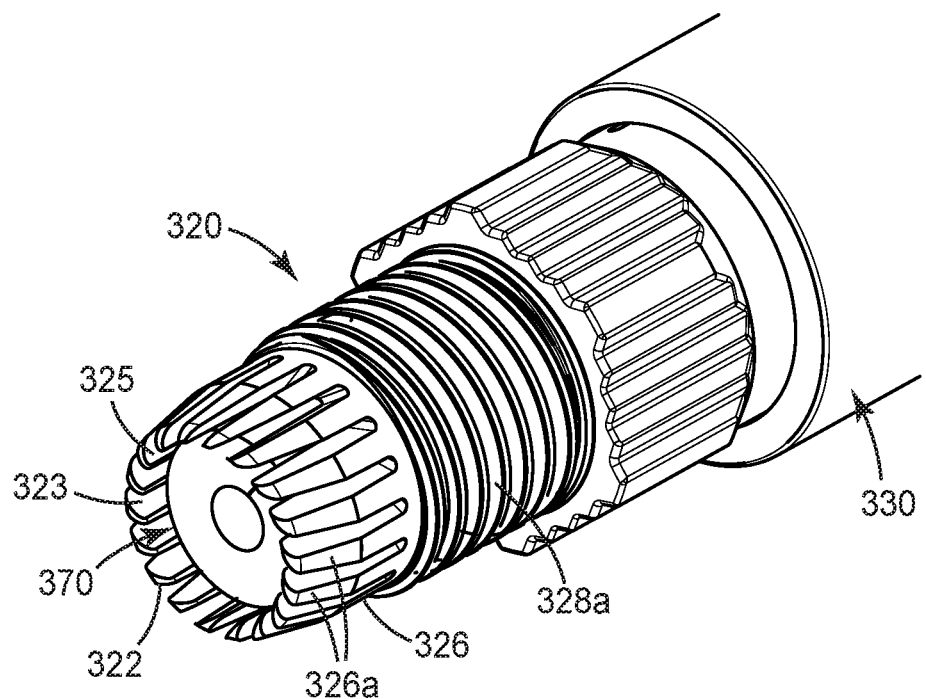
Figure 7C:
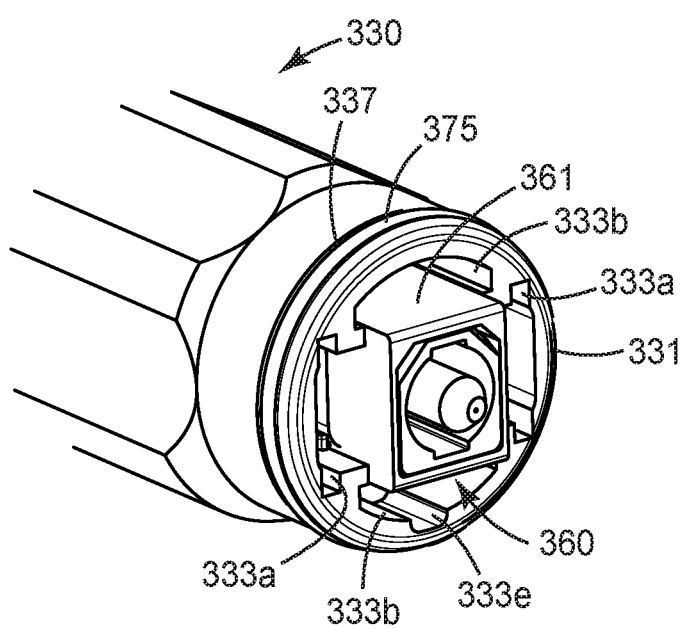

Assembly base 310 includes a body portion 320 having a first end 321 and a second end 322, a release portion 330 around and near the first end of the body portion and an activation portion 340 disposed over the body portion and in contact with the release portion. The release portion defines a release mechanism which moves the release portion relative to the body portion to disengage the at least one engagement feature when the release portion moves with respect to the body portion so that the optical fiber connector can be removed from the port of the telecommunication enclosure. FIG. 7A is an exploded view of the assembly base. FIG. 7B is a detail view of the second end 322 of body portion 320 and FIG. 7C is a detail view of the first end 321 of the body portion of the exemplary optical fiber connector.

The body portion 320 can have a generally tubular shape and includes an interior passageway 323 that extends along the length of the body portion from the first end 321 to the second end 322 of the body portion. The body portion includes a passage entry (not shown) at the first end 321 of the interior passageway and a passage exit 325 at the second end 322 of the interior passageway 323 that can be configured to accommodate the internal sealing member 370 disposed around certain categories of telecommunication cables including single fiber drop cables and/or multi-fiber cables.

The passage entry of the interior passageway 323 is configured to accept and secure optical connection portion 360 to/in the first end 321 of the body portion 320. As such, the passage entry can be shaped to closely conform to an outer perimeter portion of the optical connection portion or can provide a connection means for securing the optical connection portion such a thread, mechanical catches, bayonet connections, etc.

The body portion 320 can have a groove 327 formed in the external surface of the body portion to receive an intermediate sealing member 373. In the exemplary aspect shown in FIG. 7A, a groove is formed near the first end 321 of body portion 320 to receive an intermediate sealing member 373 such as an o-ring. This intermediate sealing member can provide an environmental seal between the body portion and release portion 330 of assembly base 310.

Body portion 320 can include a shoulder 320a formed in its external surface. The shoulder serves to properly position activation portion 340. The activation portion 340 can be slid over the second end of body portion 320 such that the activation portion is disposed against the shoulder. In one aspect, at least a portion of the external surface of body portion 320 and the internal surface of the bore through the activation portion can be smooth so that the activation portion can turn relative to the body portion to actuate the release portion 330 to enable release of optical fiber connector from the latches and latch arms of the modified optical coupling, while in another aspect, the external surface of body portion and the internal surface of the bore through the activation portion can be textured to provide a degree of resistance to the motion of the activation portion or to provide an audible confirmatory sound when the activation portion is turned. In an alternative aspect, at least a portion of the external surface of the body portion and the internal surface of the bore through the activation portion can be threaded so that the activation portion can be rotated in a helical manner to actuate the release portion.

Referring to FIGS. 7A and 7B, body portion 320 can have an external connection portion 328 adjacent to the second end 322 of the body portion. The external connection portion 328 includes external thread that cooperates with an internal thread disposed within a first end 351 of strain relief assembly 350 to cause a compressible portion 326 formed at the second end of the body portion to conform to an outer surface of the telecommunication cable or an internal sealing member 370 fitted within the optical fiber connector. The compressible portion 322 may be reduced in size (diameter) when an external radial force is exerted on it by the tightening of the strain relief assembly. The compressible portion can have a plurality of spaced apart fingers 326a extending from the main body near the second end thereof to facilitate compression of the compressible portion around the internal sealing member disposed within the body portion. In an exemplary aspect, the compressible portion can gave a generally truncated conical shape with the interior of the connection portion of the strain relief assembly having a corresponding shape to cause the spaced apart fingers to be squeezed together such that they exert a compressive force around the cable and/or internal sealing member seated in the interior passageway of the compression portion of body portion 320 when the strain relief assembly is secured on to the second end of the body portion.

Referring to FIGS. 6B, 7A-7C, and 8, release portion 330 includes a tubular shell having an internal bore 333 that extends from a front edge 331 to a rear edge 332 of the release portion. The release portion is configured to be close fitting with the port of a telecommunication enclosure into which the exemplary optical fiber connector will be inserted. The release portion 330 can have a groove 337 formed in the external surface of the release portion to receive an external sealing member 375. In the exemplary aspect shown in FIG. 8, groove 337 is formed near the front edge 331 of release portion 330 and is configured to receive an external sealing member 375 such as an o-ring. This external sealing member can provide an environmental seal between the assembly base of the exemplary optical fiber connector and the port of a telecommunication enclosure into which the exemplary optical fiber connector is inserted. Specifically, the external sealing member forms an environmental seal between the interior wall of the exterior section 221 of the port 220 of a telecommunication enclosure (FIGS. 4A-4B).

Figure 8:
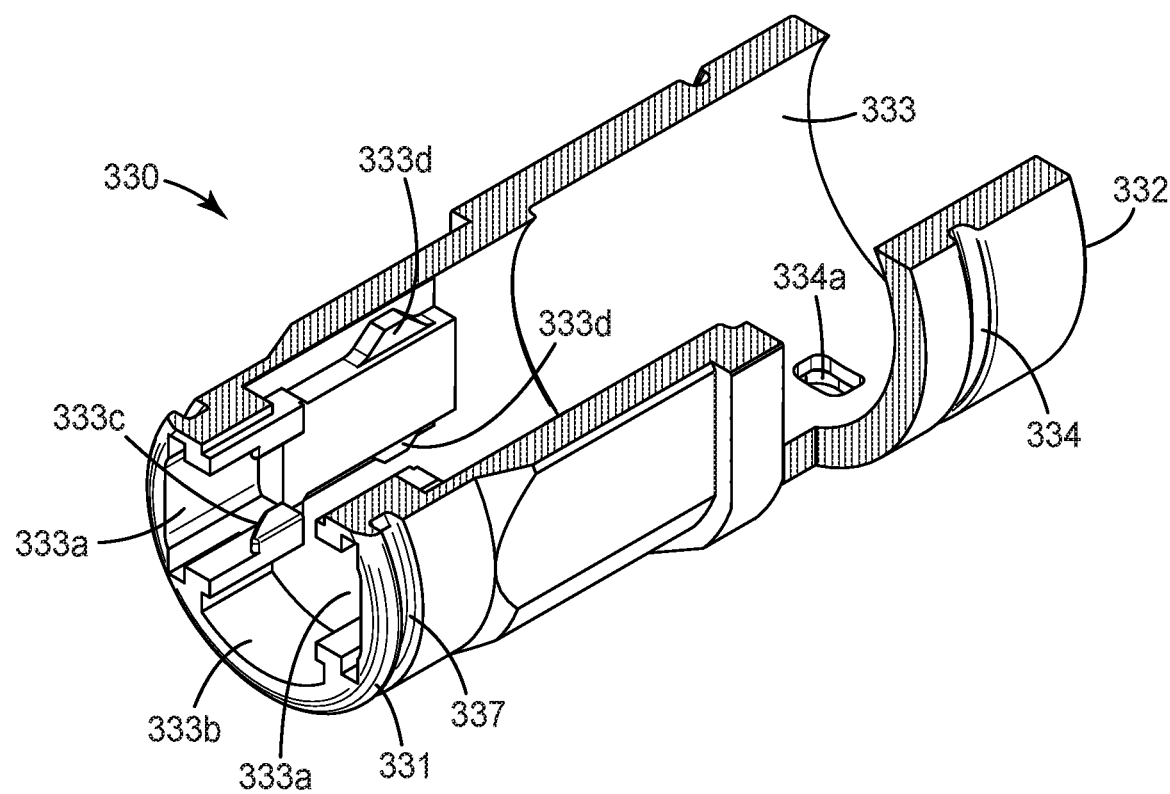
FIG. 8 is a sectional isometric view of the release portion of the optical connector of FIGS. 6A-6C.

Release portion 330 can include one or more alignment channels and/or release cams disposed within the interior passageway 333 shown in FIGS. 7C and 8. The alignment channels can guide any latches 457 and/or latch arms 458 of the mating optical coupling 450 (FIG. 5A) into proper position when the exemplary optical fiber connector 300 is inserted into the optical coupling. For example, alignment channels 333a can be configured to accept latches 457 of the optical coupling while alignment channels 333b can be configured to accept latch arms 458.

Release cams 333c, 333d can aid in disengaging the engagement features of the exemplary optical fiber connector from the latches and/or latch arms of the optical coupling when the release portion is activated as will be described in additional detail below. In an exemplary aspect, the one or more alignment channels and/or release cams can be integrally formed with the release portion by an injection molding process.

The release portion 330 includes a fastening ring 336 configured to movably join the release portion to the activation portion. The fastening ring includes a pair of bayonet pegs 336a attached on opposite sides of the fastening ring configured to mate with the bayonet channel(s) 346 formed adjacent to the first end 341 of the activation portion 340 (FIG. 7A). The fastening ring fits into a channel 334 formed in the outer surface of the release portion which includes two peg openings 334a for insertion of the bayonet pegs that are mounted on the fastening ring. In the assembled connector, the bayonet pegs fit into the bayonet channel(s) 346 of the activation portion 340. When the activation portion is rotated, the bayonet pegs travel in the bayonet channel and cause the release portion to move in a longitudinal direction. Thus, when the activation portion is rotated, the release portion is pushed toward the optical coupling to release the latches of the modified optical coupling from the engagement features of the optical connector, thus allowing the removal of optical fiber connector 300 from the port of a telecommunication enclosure. The removal of exemplary optical fiber connector 300 from the port of a telecommunication enclosure will be discussed in additional detail in reference to FIGS. 10B and 10C.

In one exemplary aspect, internal sealing member 370 can be an elastomeric grommet. Additionally, internal sealing member 370 may have a radial slit 371 to allow the telecommunication cable to be slipped into the internal sealing member from the edge of the sealing member. In an exemplary aspect, the elastomeric portion of the internal sealing member can be formed from one of an ethylene propylene diene monomer (EPDM) rubber, a silicone rubber, a polyurethane elastomers or rubbers, natural rubber, a fluoroelastomer or other suitably soft resilient materials.

Strain relief assembly 350 can be similar to strain relief member 150 or 950 with the exception of the truncated conical shape of the interior cavity in connection portion as mentioned above.

Figure 9A:
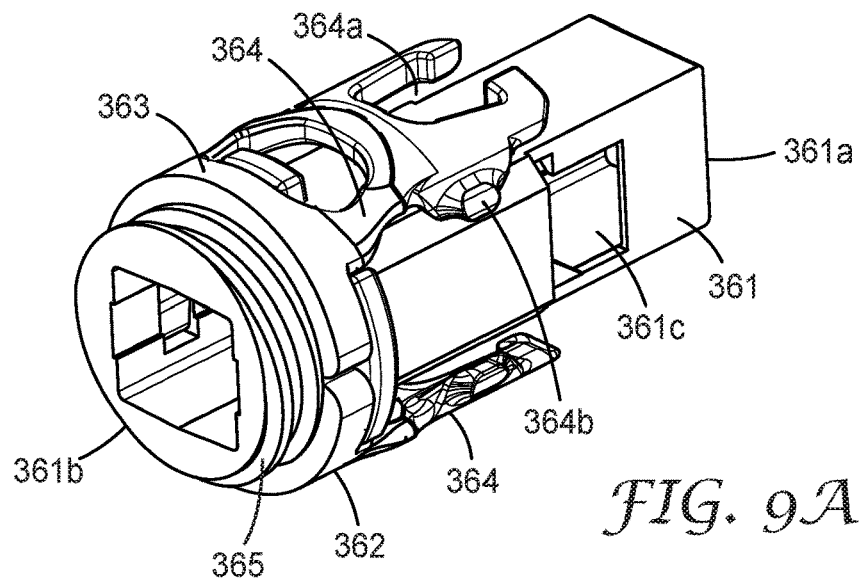
FIGS. 9A-9B show two views of an exemplary outer housing of the optical connector of FIGS. 6A-6C.
Figure 9B:
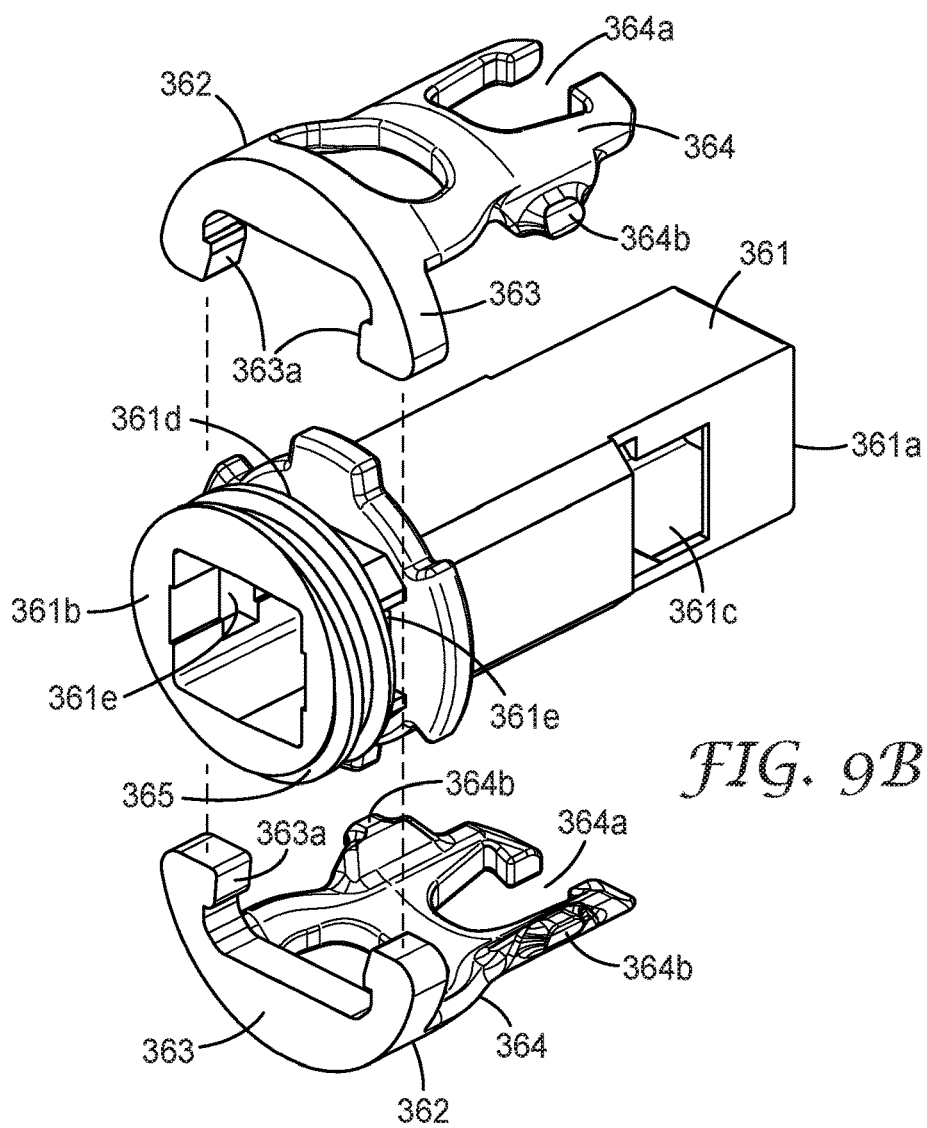

Referring to FIGS. 6B, 9A and 9B, optical connection portion 360 can include an outer housing 361 configured to mate with the backbone a standard optical fiber connector and the engagement features configured to secure exemplary connector 300 within the port of a telecommunication enclosure. Specifically, the engagement features engage with the latches and latch arms of optical coupling 450 which are disposed at least partially within the port of the telecommunication enclosure as described above. The outer housing includes a retention clip 362 having two engagement features which configured to provide two points of connection with a novel optical coupling, for example optical coupling 450 shown in FIG. 5A. The outer housing includes also includes a two additional engagement features in the form of a pair of windows 361c disposed on two opposite sidewalls of the outer housing that are configured to mate with a first pair of latches 457 in an exemplary optical fiber connector adapter 450 and provide two additional connection points with optical coupling 450. The four connection points between optical connector 300 and optical coupling provide a stronger connection that the two connection points available in conventional optical couplings.

In an exemplary aspect, the outer housing can include a groove 361d adjacent to the second end of the outer housing that is configured to accept and hold one or more retention clips 362.

Each retention clip 362 includes a base portion 363 that is configured to fit within groove 361d in the outer housing 361 and an extension portion 364 that are configured to extend along the two other opposing sides of the outer housing that do not have windows 361c formed therein. In an exemplary aspect, the base portion can be generally crescent shaped and can have a hook 363a on each end. The hooks are configured to snap into depressions or openings 361e within groove 361d to secure the clip to the outer housing of the connection portion. Alternatively, the structure of the retention clips can be molded into the outer surface of the outer housing to reduce the number of parts that need to be handled in the field. Alternatively, clips 362 can be preassembled onto the outer housing at the factory also reducing the number of separate parts that need to be handled in the field.

Each extension portion 364 includes an engagement feature (i.e. C-shaped catch 364a) at the end the clip opposite base portion 363 and disengaging knob 364b extending from at least one edge of the extension portion. Each of the C-shaped catches is configured to mate with the terminal portion 458c of a latch arm 458 of optical coupling 450. In the exemplary aspect shown in FIGS. 9A and 9b, extension portion 364 has two disengaging knobs 364b extending from the edges of the extension portion near the base of the C-shaped catch. The disengaging knobs interact with release cams 333d within the interior passageway of the release portion 330 to lift the free end of the extension portion freeing the terminal portion of a latch arm 458 from the C-shaped catch to allow removal of exemplary connector from optical coupling 450 disposed in the port of a telecommunication enclosure.

Optical fiber connector 300 can be assembled by a process that is analogous to that described previously for connector 100.

FIG. 10A shows a sectional view of exemplary optical fiber connector 300 installed into a modified optical coupling 450 inserted partially into a port 420 of a telecommunication enclosure 400. Telecommunication enclosure 400 includes a base 410 and a cover or main body (not shown) removably securable to the base. The base includes a bottom wall 412 and a plurality of side walls 414 (only a portion of one side wall is shown in the figure) extending approximately perpendicularly from the bottom wall and adjoined to one another at the corners (not shown) of the enclosure. At least one of the side walls can include at least one port 420 for receiving a fiber optic connector of the present invention. The exemplary port can be a hexagonal port having an exterior section 421 disposed outside of the enclosure. When optical fiber connector 300 is fully inserted into the port 420, the external sealing member 375 of the optical fiber connector provides a water tight seal between the internal circumference of the exterior section 421 of the port and the optical fiber connector.

Figure 10B:
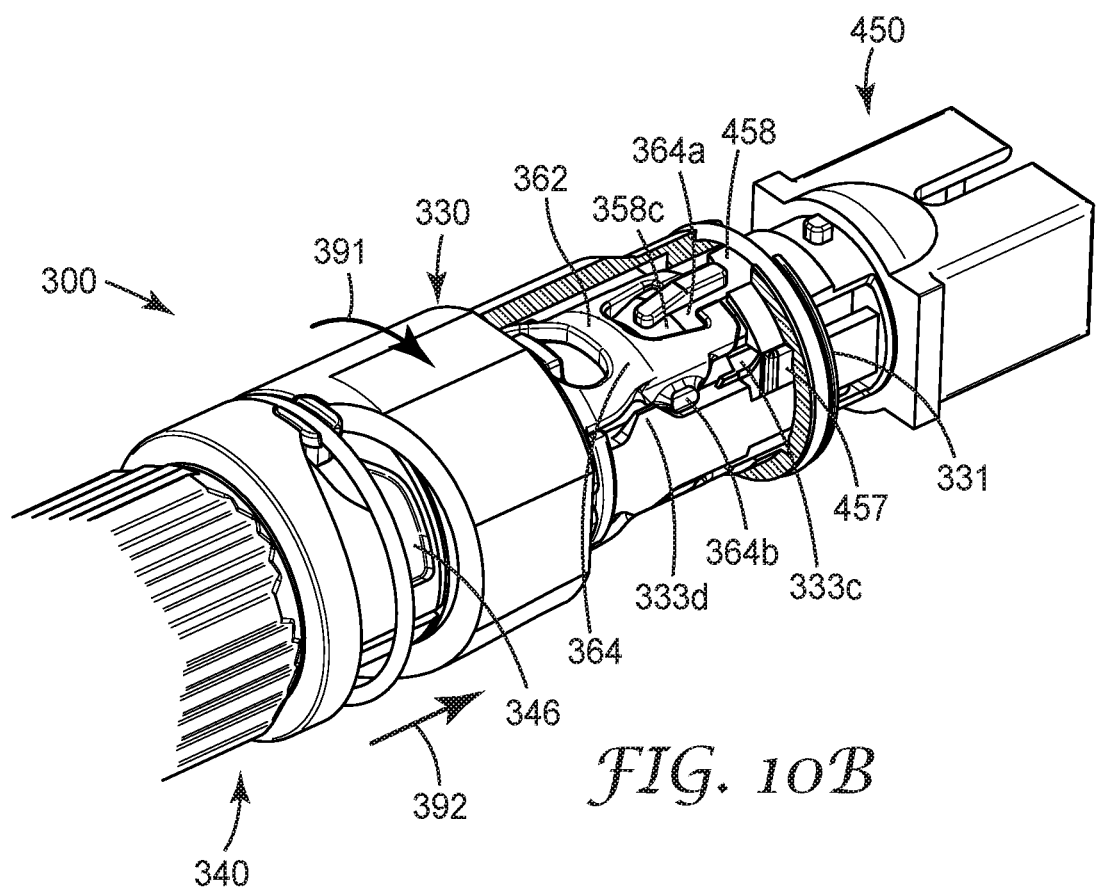
FIGS. 10B-10C illustrate a release mechanism of the exemplary optical fiber connector of FIGS. 6A-6C from the port of a telecommunication enclosure.
Figure 10C:
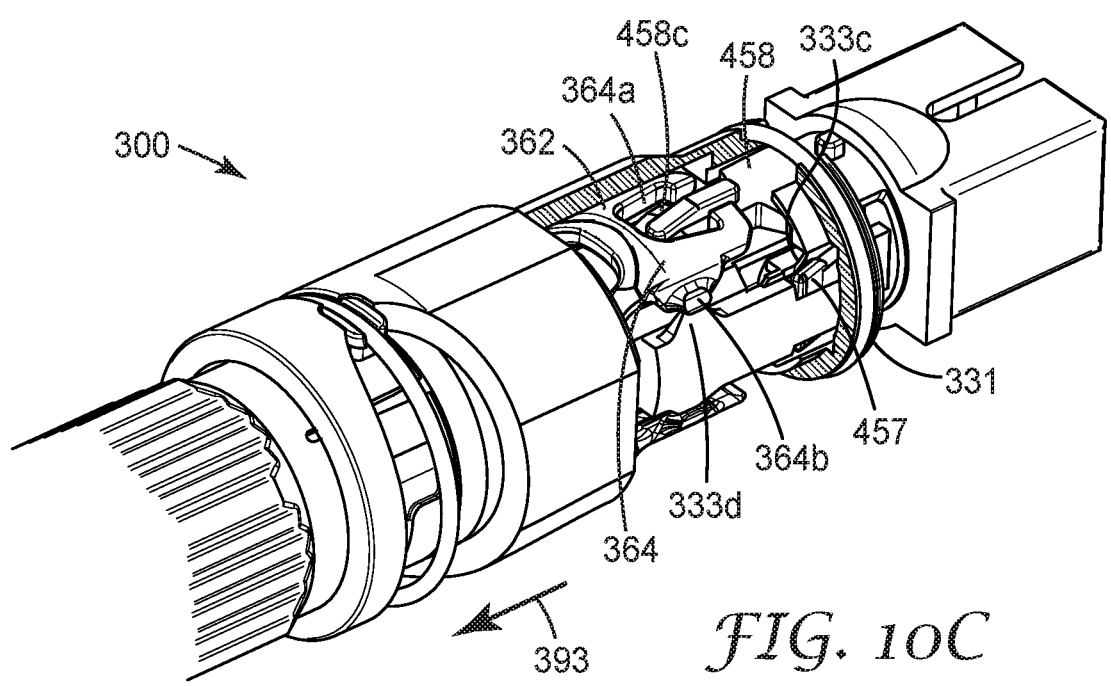

FIGS. 10B and 10C illustrate the disengagement of optical fiber connector 300 from the modified optical coupling 450. Note that the telecommunication enclosure as well as a portion of the connector (i.e. a section of the wall of the release portion) has been removed from FIGS. 10A and 10B to show how the cams within the release portion of the exemplary optical fiber connector disengage the latches and latch arms of optical coupling 450 so that optical connector 300 can be removed from the port of the telecommunication enclosure.

FIG. 10B shows optical fiber connector 300 secured in optical coupling 450. The terminal portion 458c of latch arm 458 is secured in the C-shaped catch 364a of retention clip 362 and latch 457 is engaged with the window (not shown) formed in the outer housing of the connection portion of exemplary optical fiber connector 300. To disengage the connector from optical coupling 450, activation portion is rotated in a direction indicated by arrow 391. The bayonet pegs disposed through the release portion 330 slide in the bayonet channel(s) 346 of the activation portion causing the release portion to move forward toward the optical coupling and the connection interface as indicated by arrow 392.

As release portion slides forward, latches 457 of the optical coupling engage with cams 333c inside of the release portion to disengage the projection on the latches from the windows in the outer housing of the connection portion and simultaneously, disengaging knobs 364b on the sides of the extension portion of the clips 362 that ride up the side of cams 333d within the release portion and lift the extension portion 364 to disengage the terminal portion 458c of latch arm 458 as shown in FIG. 10C. Once both the latches and latch arms have been disengaged, optical fiber connector 300 can be removed from optical coupling 450 (and the port of the telecommunication enclosure) by the application of a moderate removal force applied in a direction indicated by arrow 393. Thus, connector 300 utilizes a twist-to-push release mechanism to disengage the exemplary connector from the port of a telecommunication enclosure. Advantageously, no torsional forces are applied to the optical fiber cable during this removal process.

While the description above described the simultaneous opening of the latches and latch arms, the sequential opening of the latches and latch arms is also contemplated and should be considered to fall within the scope of the current disclosure.

Figure 11A:
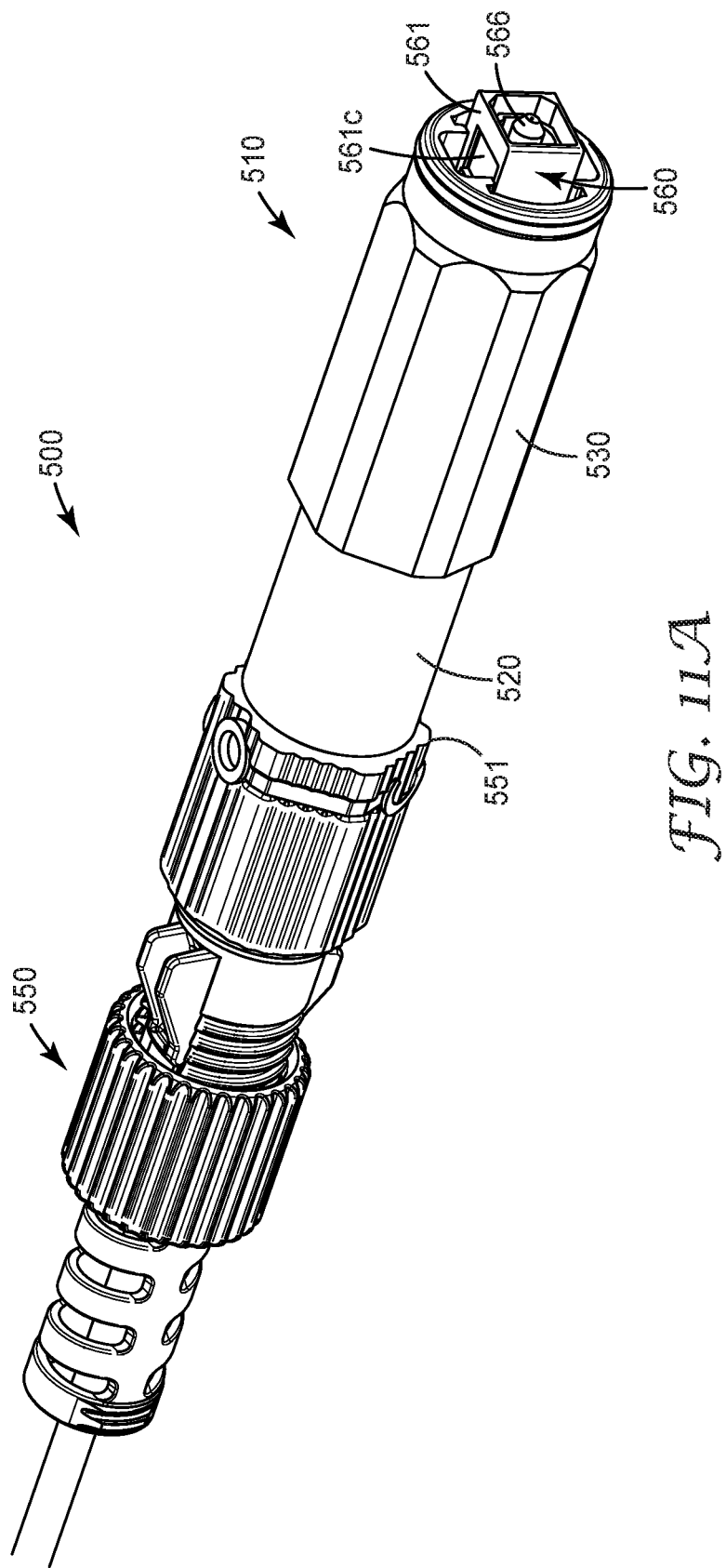
FIGS. 11A-11C show three views of a third embodiment of an exemplary optical fiber connector according to an aspect of the present invention.
Figure 11B:
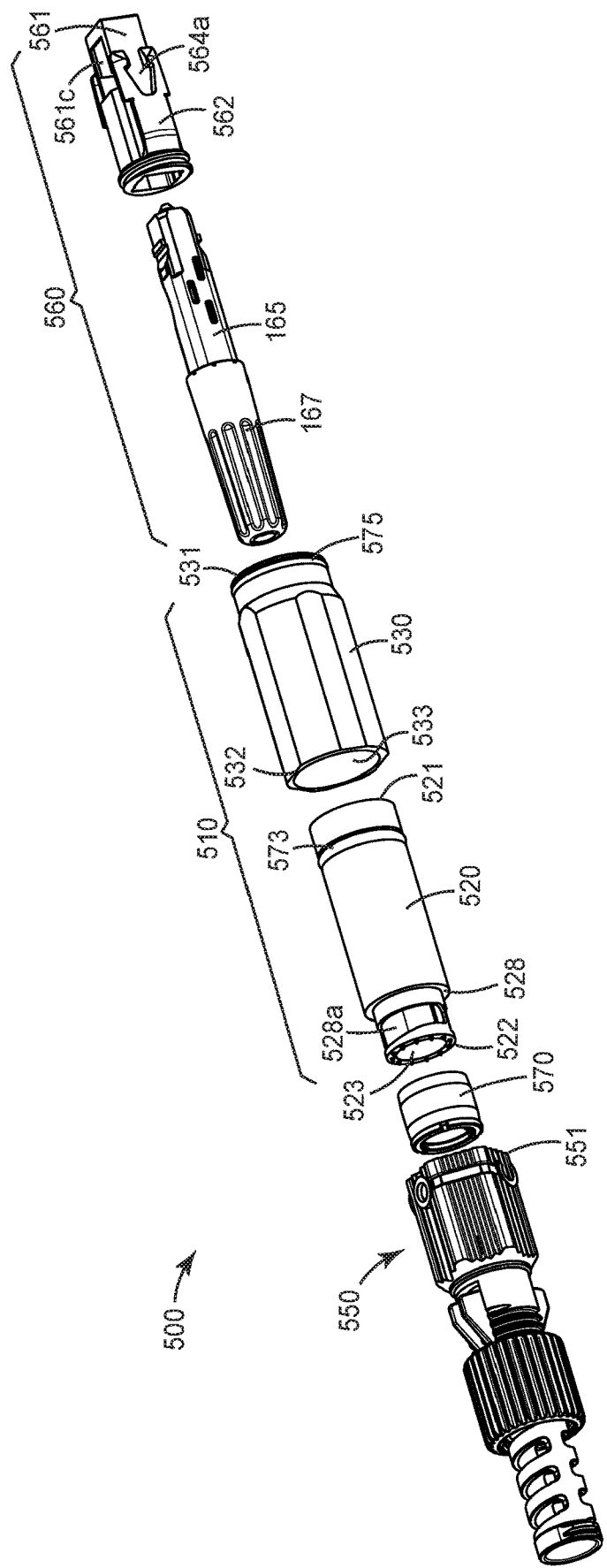
Figure 11C:
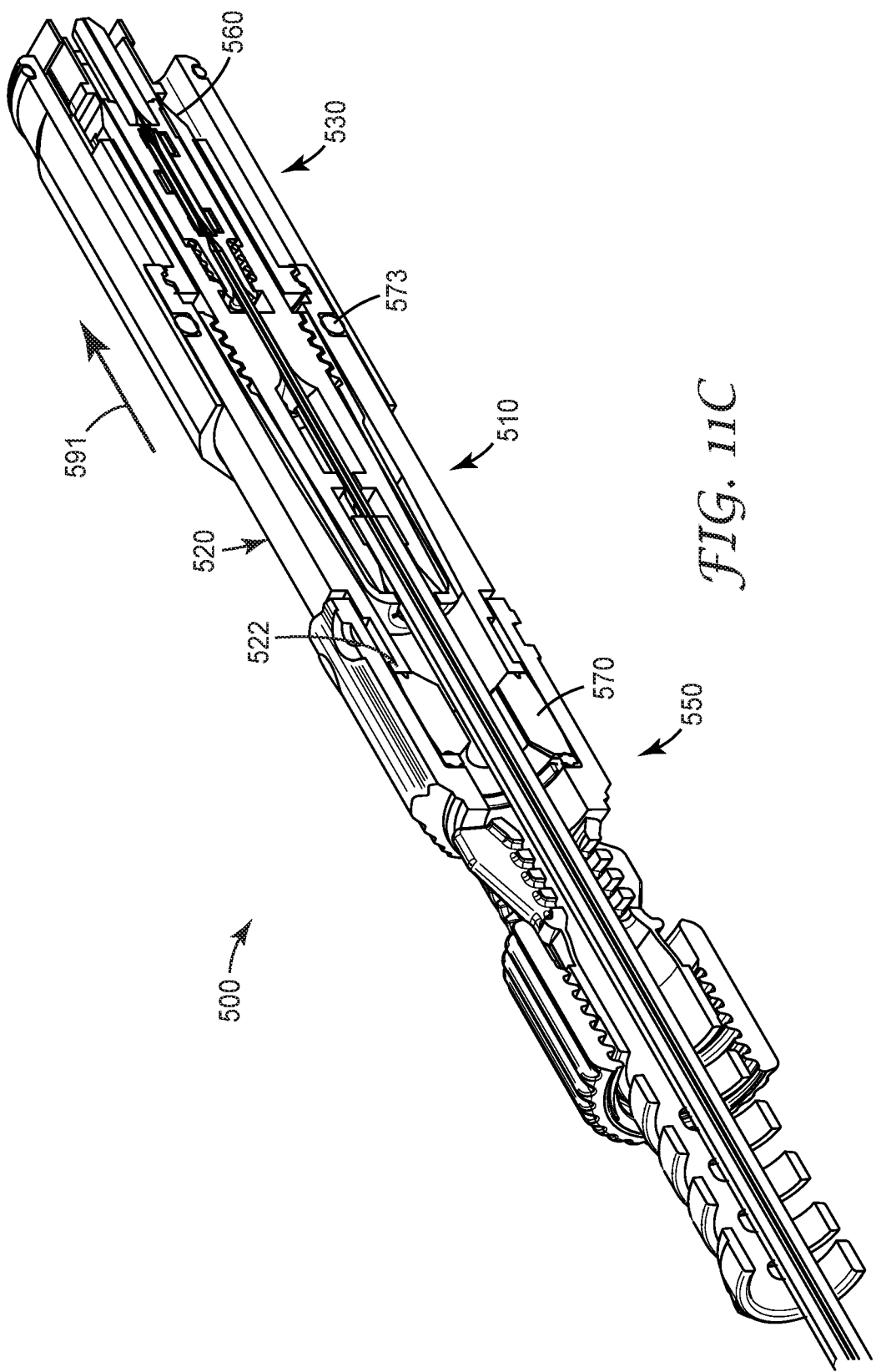

Referring to FIGS. 11A-11C, optical fiber connector 500 is similar in many respects to optical fiber connector 300 shown in FIGS. 6A-6C except with regards to the mechanism for disengaging the optical fiber connector from the optical coupling. Where the rotation of activation portion was responsible for pushing the release portion forward in optical fiber connector 300, optical fiber connector 500 allows the craftsman to move the release portion forward directly (as indicated by directional arrow 591 in FIG. 11C) to disengage exemplary optical fiber connector. Thus, optical fiber connector 500 has fewer parts than the optical fiber connector 300.

Optical fiber connector 500 includes an assembly base 510, a strain relief assembly 550 attachable to the second end of the assembly base and an optical connection portion 560 having a ferrule 566 disposed therein that defines an optical connection interface, wherein the optical connection portion is attachable to the first end of the assembly base. An internal sealing member is compressed between the second end of the assembly base and the strain relief assembly when the strain relief assembly is secured to the assembly base to provide an environmental seal between the optical fiber connector and the telecommunications cable to which it is connected. In addition, optical connector 500 includes at least one engagement feature that is configured to secure the optical fiber connector within a port of a telecommunication enclosure.

Optical fiber connector 500 is configured to mate with optical coupling 450 shown in FIGS. 5A-5C and as such includes similar engagement features as described with respect to optical fiber connector 300. Specifically, optical fiber connector includes windows 561c formed in the outer housing of the optical connection portion as well as C-shaped catches 564a that are configured to mate with latch arm 458 of optical coupling 450.

Assembly base 510 includes a body portion 520 having a first end 521 and a second end 522 and a release portion 530 disposed around and near the first end of the body portion. The release portion defines a release mechanism which moves the release portion relative to the body portion to disengage the at least one engagement feature when the release portion moves with respect to the body portion so that the optical fiber connector can be removed from the port of the telecommunication enclosure. The body portion 520 can have a generally tubular shape and includes an interior passageway 523 that extends along the length of the body portion. The first end of the interior passageway is configured to accept and secure optical connection portion 560 to/in the first end of the body portion via a thread connection, an interference fit, a bayonet connection, etc.

The body portion 520 can have a groove formed in the external surface of the body portion to receive an intermediate sealing member 573. The intermediate sealing member can provide an environmental seal between the body portion and release portion 530 of assembly base 510.

In addition, body portion 520 can have an external connection portion 528 adjacent to the second end 522 of the body portion. In the exemplary aspect shown in FIG. 11B, external connection portion 528 includes at least one bayonet channel 528a that cooperates with at least one internal peg (not shown) disposed within the first end 551 of strain relief assembly 550. In the exemplary embodiment of optical fiber connector 500, the body portion can include two bayonet channels disposed on opposite sides of the body portion and the strain relief assembly can have two corresponding internal pegs that are configured to engage with the bayonet channels. Thus, the strain relief assembly can be slid over the second end of the body portion and rotated to secure the strain relief assembly to the body portion as the internal pegs in the strain relief assembly ride in the bayonet channels in the body portion. The internal sealing member is compressed longitudinally between the strain relief assembly and the second end of the body portion as shown in FIG. 11C. Utilizing a bayonet style securing mechanism as described above may be advantageous. The bayonet connection mechanism has the advantage that it has two well defined end stops where the internal grommet is either compressed or not compressed. The end stops can remove a degree of uncertainty as to what is the proper amount of tightening needed to compress the internal grommet in order to achieve the desired degree of environmental protection.

Release portion 530 includes a tubular shell having an internal bore 533 that extends from a front edge 531 to a rear edge 532 of the release portion. The release portion is configured to be close fitting with the port of a telecommunication enclosure into which the exemplary optical fiber connector will be inserted. The release portion can have a groove formed in the external surface of the release portion to receive an external sealing member 575, such as an o-ring. This external sealing member can provide an environmental seal between the assembly base of the exemplary optical fiber connector and the port of a telecommunication enclosure into which the exemplary optical fiber connector is inserted.

Release portion 530 can include one or more alignment channels and/or release cams which are analogous to those described with respect to release portion 330 (FIG. 6B) in optical fiber connector 300. The alignment channels can guide any latches 457 and/or latch arms 458 of the mating optical coupling 450 (FIG. 5A) into proper position when the exemplary optical fiber connector 500 is inserted into the optical coupling. The release cams aid in removal of the exemplary optical fiber connector from the latches and/or latch arms of the optical coupling when the release portion is moved toward optical coupling 450.

Strain relief assembly 550 is analogous to strain relief member 150 as described previously.

Similarly, optical connection portion 560 is analogous to optical connection portion 360 described previously except that the features of clip 362 of optical connector 300 are integrally molded with the outer housing 561 in optical connector 500. The disengaging mechanism is also the same as described other than for the means of moving the release portion toward the coupling. In exemplary optical fiber connector 500, the craftsman can simply push the release portion forward as indicated by directional arrow 591 causing latches 457 of optical coupling 450 to engage with cams inside the release portion to disengage the projection on the latches from the windows in the outer housing of the connection portion 560. Simultaneously, disengaging knobs on the retention clips 562 of the outer housing 561 can ride up the side of a second set of cams disposed within the release portion to lift the extension portion of the retentions clip in order to disengage latch arms 458 of optical coupling 450. Once both the latches and latch arms have been disengaged, optical fiber connector 500 can be removed from optical coupling 450 by the application of a moderate removal force. Thus, a push to release mechanism is used to disengage optical fiber connector 500 from optical coupling 450 and from the port of a telecommunication enclosure.

Figure 12A:
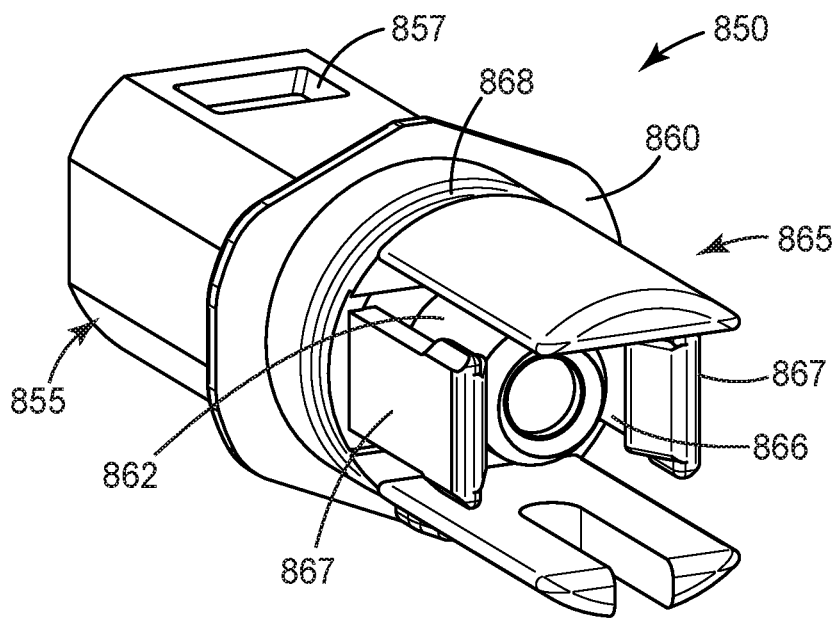
FIGS. 12A-12B show two views of another modified coupling usable with an exemplary optical fiber connector according to an aspect of the present invention.
Figure 12B:
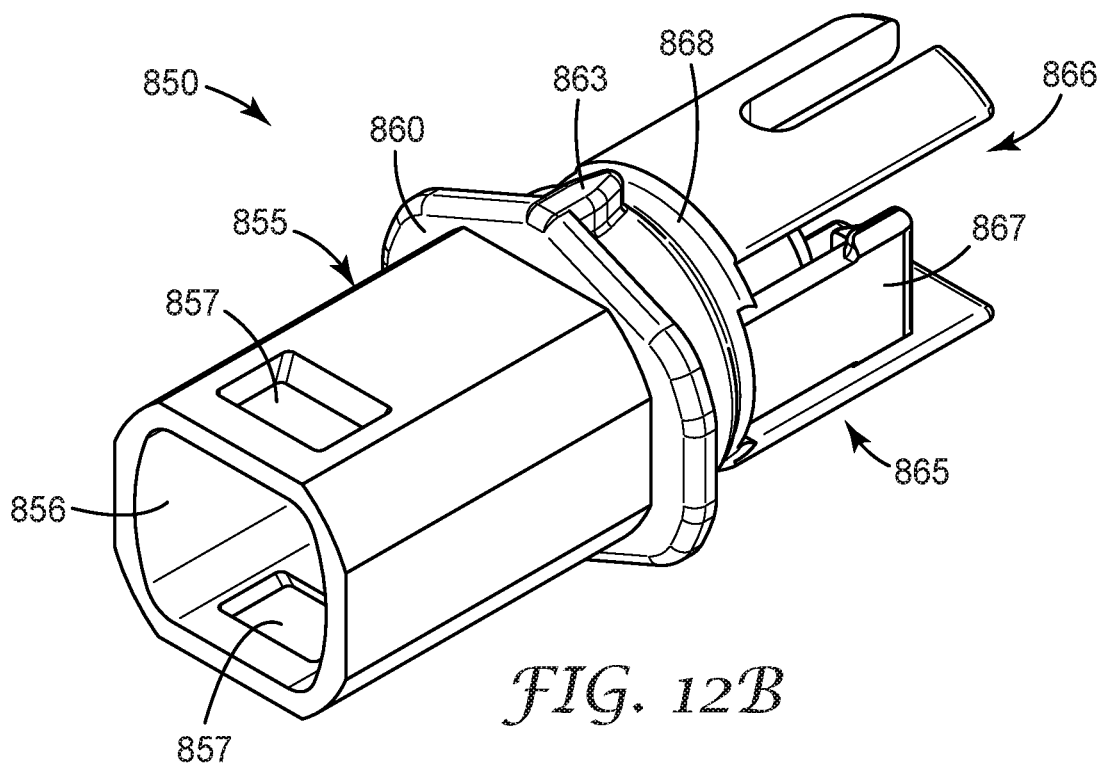
Figure 13A:
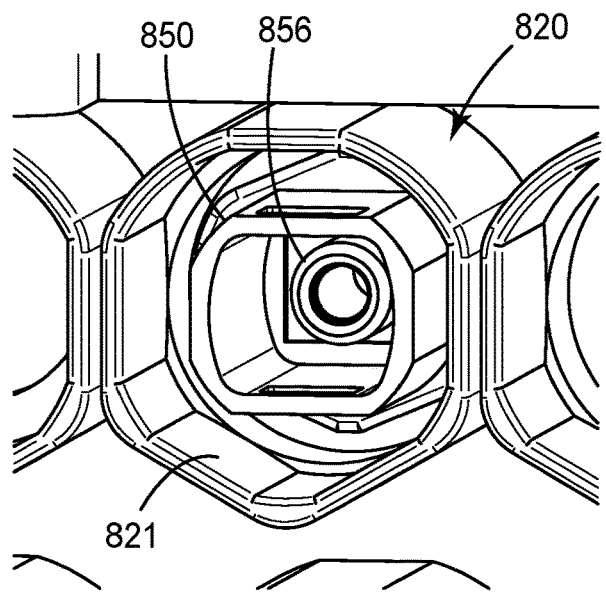
FIGS. 13A-13B show two views of the modified coupling of FIGS. 12A-12B disposed within a port of a telecommunication enclosure.
Figure 13B:
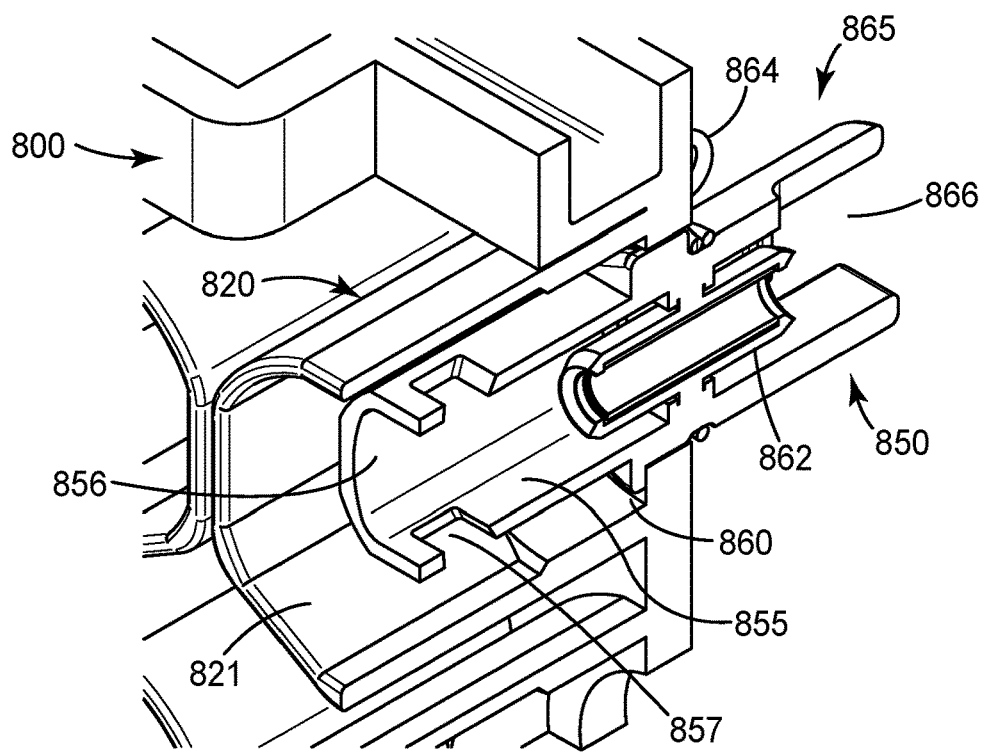
Figure 14B:
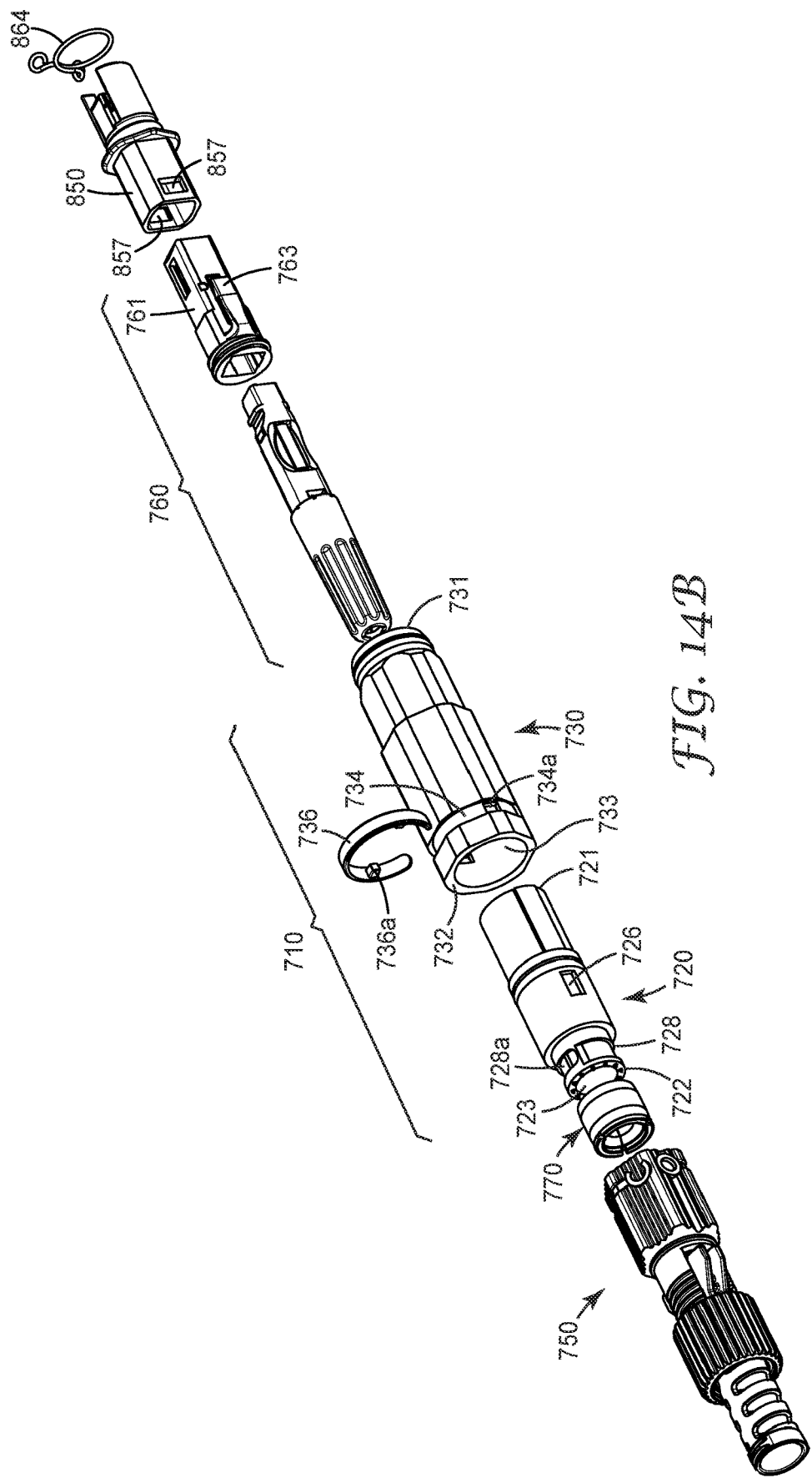
Figure 14C:
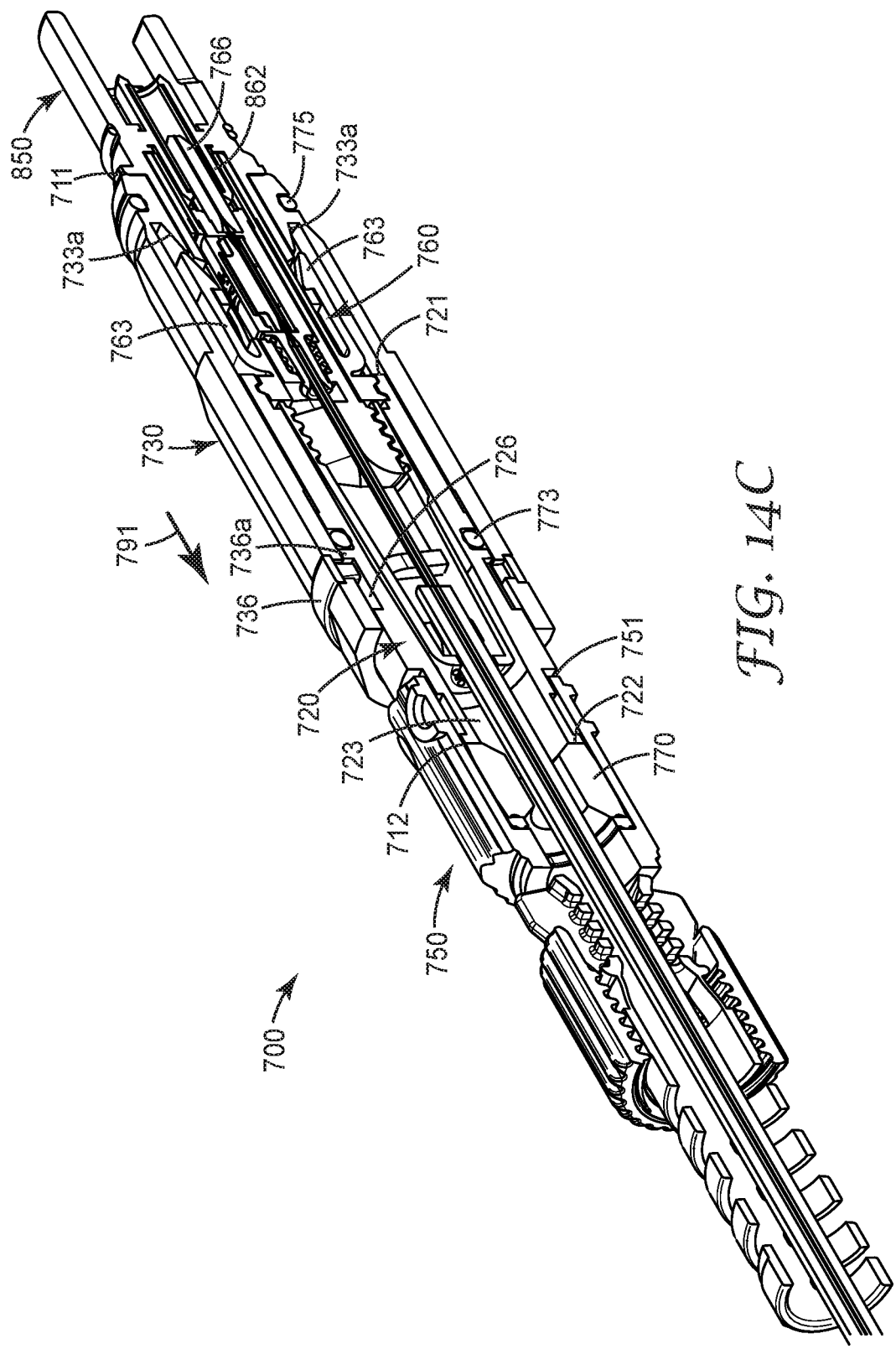

FIGS. 12A-12B and 13A-13B show another modified optical coupling 850 configured for use with an exemplary optical fiber connector 700 shown in FIGS. 14A-14C. Optical coupling 850 includes first and second connector housings 855, 865 disposed on opposing sides of an adapter flange 860 and a ferrule alignment sleeve 862 disposed along the central axis of the optical coupling between and extending into the first and second connector housings. Each of the connector housings includes a connector port 856, 866, respectively, that is configured to receive a corresponding optical fiber connector and align the connector ferrules to one another. Each connector port can provide a smooth, snug fit for the incoming connector.

Optical coupling 850 can be disposed in a port 820 of a telecommunication enclosure 800 as shown in FIGS. 13A-13B. Port 820 includes a hexagonal port structure having an exterior section 821 surrounding port opening through the external wall. Alternatively, the exterior section of the port structure can have other geometric configurations such as a cylinder, a rectangular prism or other polygonal prism. Optical coupling 850 can be inserted through the exterior section of the port 820 until the flange abuts the exterior wall of the closure such that the first connector housing is disposed within the exterior section and the second connector housing extends into the interior of the telecommunication enclosure. The optical coupling can be locked in the place by a spring clip 864 disposed in a groove 868 in the second connector housing such that the connector adapter cannot be removed from port 820.

In an exemplary aspect, optical coupling 850 can be at least partially disposed within the port (i.e. the first connector housing can disposed within the exterior section 821 of the port 820 and the second connector housing disposed within the interior of the telecommunication enclosure as shown in FIGS. 13A-13B). Thus, the connection point between the optical coupling and an optical connector installed therein is protected by the external section of the port.

In an exemplary aspect, first connector housing 855 can be configured to accept exemplary connector 700 in accordance with the present disclosure. For example, the first connector housing can be configured to accept the outer housing 761 of the connection portion 760. In particular, first connector housing 855 can include two windows 857 formed on opposite sides of the first connector housing that can be engaged by forward facing latches 763 to the connector in the first connector housing of optical coupling 850.

Second connector housing 865 can be configured to accept a mating connector (not shown) disposed in the interior of the telecommunication enclosure. The mating connector can have any standard connector formats, such as MT, MPO, SC, ST, FC, and LC connector formats and the second connector housing will have a corresponding format, for example an SC-format. The second connector housing can include catch mechanism (not shown) similar to that found in conventional connector adapters to secure the mating connector in optical coupling 850.

Ferrule alignment sleeve 862 of optical coupling 850 receives the ferrule 766 of connector portion 760 of exemplary connector 700 in a first side thereof (as shown in FIG. 14C) and the ferrule of the mating connector (not shown) in a second side thereof. In one aspect, the ferrule alignment sleeve can be a split ceramic sleeve retained in a bore formed in the first and second connector housings that provides for smooth passage and alignment of the ferrules.

In the exemplary aspects shown herein, optical fiber connector coupling 850 is configured to couple two SC format connector interfaces. However, as would be apparent to one of ordinary skill in the art given the present description, the optical fiber connector coupling 850, and components thereof, can be modified to receive optical fiber connectors having other standard formats, such as ST, FC, and LC connector formats. In a further alternative aspect, the couplings described herein can be configured to accept two different connector formats. For example, the first connector housing of the coupling can be configured to receive an ST connector, while the second connector housing of the coupling can be configured to receive an SC connector. Other combinations of connector formats can be utilized, as would be apparent to one of skill in the art given the present description.

Referring to FIGS. 14A-14C, optical fiber connector 700 includes an assembly base 710 having a first end 711 and a second end 712, a strain relief assembly 750 attachable to the second end of the assembly base and an optical connection portion 760 having a ferrule disposed therein that defines an optical connection interface, wherein the optical connection portion is attachable to the first end of the assembly base. Securing the strain relief assembly to the second end of the assembly base compresses an internal sealing member 770 between the strain relief assembly and the assembly base to provide an environmental seal between the optical fiber connector and the telecommunications cable to which it is connected. In addition, optical connector 700 includes at least one engagement feature that is configured to secure the optical fiber connector within a port of a telecommunication enclosure.

Assembly base 710 includes a body portion 720 having a first end 721 and a second end 722, and a release portion 730 around and near the first end of the body portion. The release portion defines a release mechanism which moves the release portion relative to the body portion to disengage the at least one engagement feature when the release portion moves with respect to the body portion so that the optical fiber connector can be removed from the port of the telecommunication enclosure. The body portion 720 can have a generally tubular shape and includes an interior passageway 723 that extends along the length of the body portion from the first end 721 to the second end 722 of the body portion. The first end of the interior passageway 723 is configured to accept and secure optical connection portion 760. As such, the optical connection portion can include connection means for securing the optical connection portion to the assembly base wherein the connection means can be one of a threaded connection, mechanical catches, a bayonet connection, etc.

The body portion 720 can have a groove formed in its external surface to receive an intermediate sealing member 773. This intermediate sealing member can provide an environmental seal between the body portion and release portion 730 of assembly base 710.

Body portion 720 includes an external connection portion 728 adjacent to the second end 722 of the body portion. In the exemplary aspect shown in FIG. 14B, external connection portion 728 includes at least one bayonet channel 728a that cooperates with at least one internal peg (not shown) disposed within the first end 751 of strain relief assembly 750. In the exemplary embodiment of optical fiber connector 700, the body portion can include two bayonet channels disposed on opposite sides of the body portion and the strain relief assembly can have two corresponding internal pegs that are configured to engage with the bayonet channels. Thus, the strain relief assembly can be slid over the second end of the body portion and rotated to secure the strain relief assembly to the body portion as the internal pegs in the strain relief assembly ride in the bayonet channels in the body portion. The internal sealing member is compressed longitudinally between the strain relief assembly and the second end of the body portion as shown in FIG. 14C.

Optical connection portion 760 can include an outer housing 761 configured to mate with the backbone of a standard optical fiber connector, such as a 3M™ No Polish Connector and a 3M™ Crimplok™ Fiber Optic Connector available from 3M Company for field termination or a conventional epoxy connector for a factory termination, and a pair of engagement features. In the exemplary embodiment shown in FIGS. 14A-14C, the engagement features at in the form of a pair of forward facing latches 763 extending from the outer housing 761 that are configured to provide connection with a optical coupling 850 (FIG. 12B). The forward facing latch arms can include a barb to ensure reliable attachment of optical fiber connector 700 to the optical coupling.

Referring to FIGS. 14A-14C, release portion 730 includes a tubular shell having an internal bore 733 that extends from a front edge 731 to a rear edge 732 of the release portion. The release portion is configured to be close fitting with the port of a telecommunication enclosure into which the exemplary optical fiber connector will be inserted. The release portion 730 can have a groove formed in the external surface of the release portion to receive an external sealing member 775. This external sealing member can provide an environmental seal between the assembly base of the exemplary optical fiber connector and the port of a telecommunication enclosure into which the exemplary optical fiber connector is inserted.

Release portion 730 can include one or more release cams 733a disposed within the interior passageway 733 as shown in FIG. 14C. The release cams aide in disengaging exemplary optical fiber connector 700 from optical coupling 850 by disengaging the forward facing latch arms disposed on the outer shell of the connection portion from the windows 857 formed on opposite sides of the first connector housing of the optical coupling when the release portion is activated by exerting a longitudinal removal force on the release portion (represented by directional arrow 791 in FIG. 14C). Thus, optical fiber connector 700 incorporates a pull to release mechanism to disengage the connector from the port of a telecommunication enclosure. The first portion of the movement of the release portion will disengage forward facing latch arms from the windows in the optical coupling while continued application of the longitudinal removal force will allow optical fiber connector 700 to be completely removed from the coupling. In an exemplary aspect, the release cams can be integrally formed with the release portion by an injection molding process.

The release portion 730 includes a fastening ring 736 configured to movably join the release portion to the body portion. The fastening ring includes a pair of protrusions 736a attached on opposite sides of the fastening ring configured to engage with depressions 726 formed in the outer surface of body portion 720. The fastening ring fits into a channel 734 formed in the outer surface of the release portion which includes openings 734a for insertion of protrusions 736a therethrough. The protrusions are free to slide within the depressions in the body portion when a removal force is applied to the release portion of optical fiber connector 700. In addition, the sliding of the protrusions within the depressions controls the degree of movement of the release portion relative to the body portion to enable releasing forward facing latches on the outer housing prior to removing the optical fiber connector from the port of the telecommunication enclosure. This release mechanism has the advantage, that the connector can only be removed from the port of the telecommunication enclosure by selective application of the removal force to the release portion. An application of a force to the optical fiber cable, the strain relief assembly or the body portion of optical fiber connector will not dislodge the exemplary connector from the port of the telecommunication enclosure.

Strain relief assembly 750 can be similar to strain relief member 150 or 950 with the exception of the truncated conical shape of the interior cavity in connection portion as mentioned above.

Figure 16A:
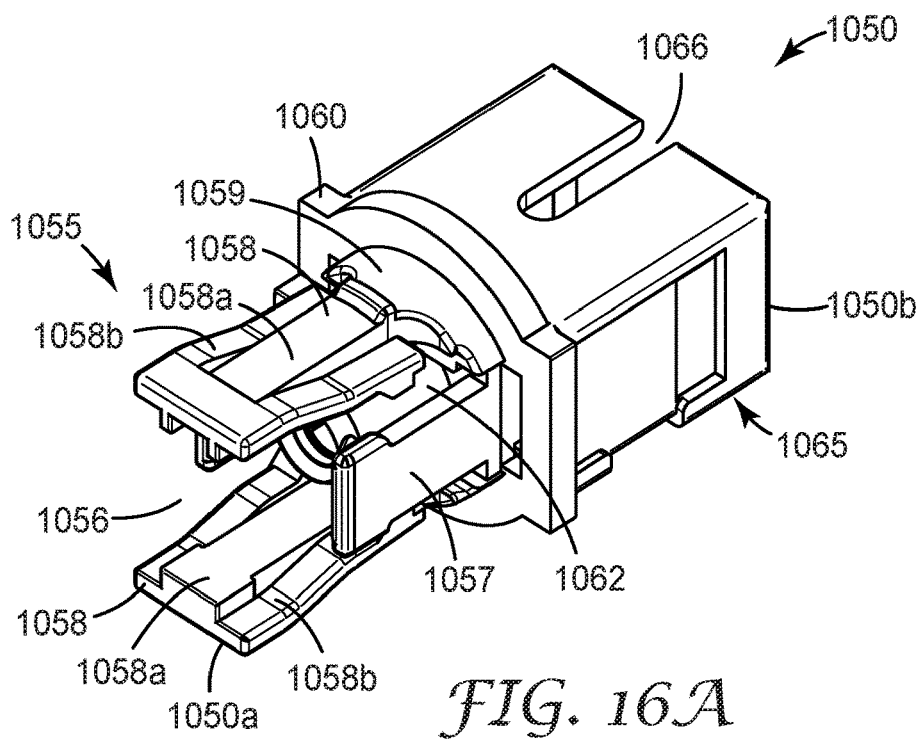
Figure 16B:
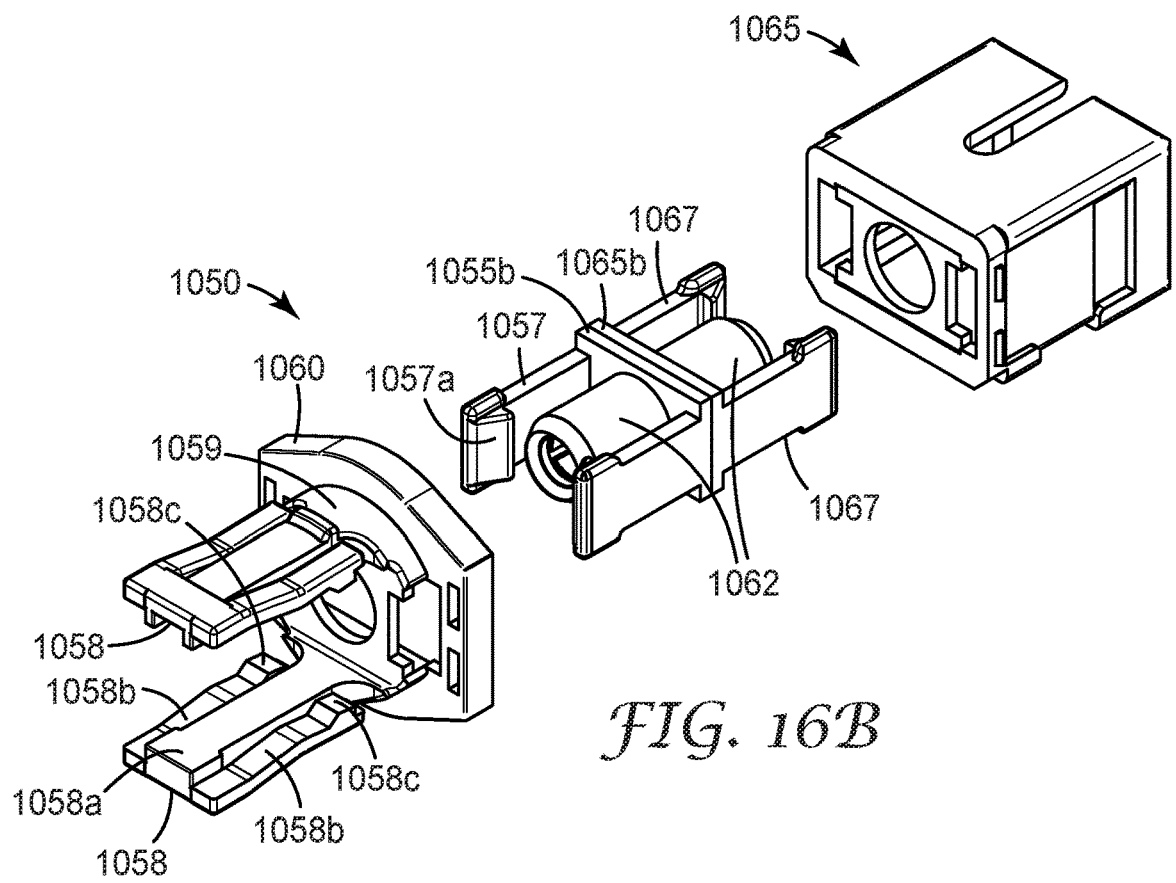
Figure 16C:
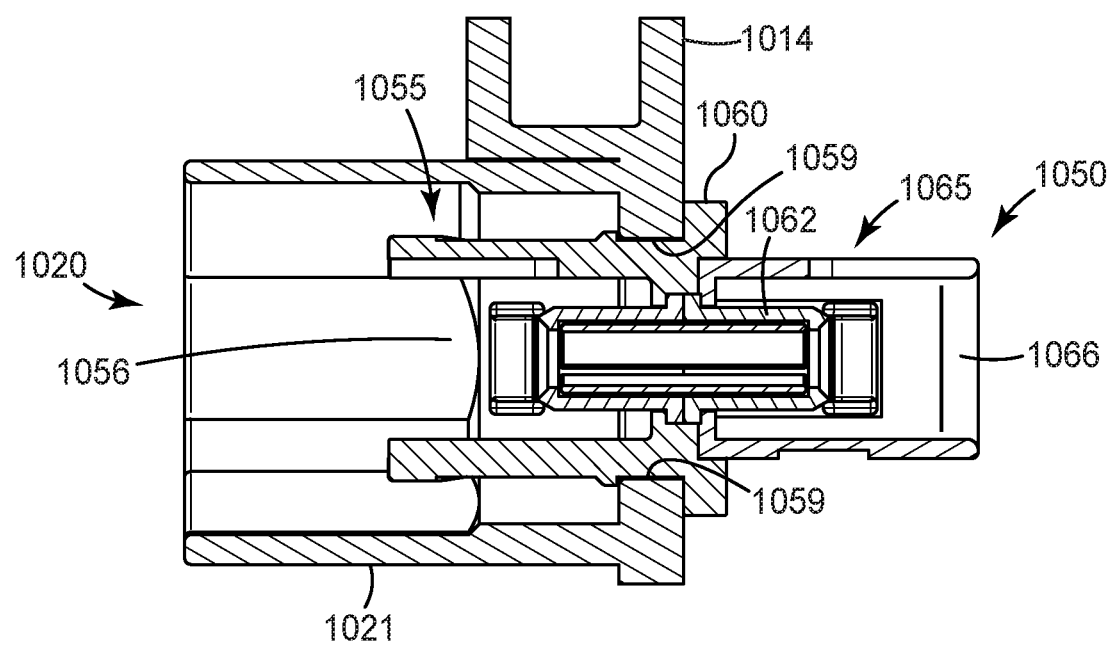

FIGS. 16A-16C show another modified optical coupling 1050 that can be partially inserted into the port 1020 of a telecommunication enclosure from the interior of the enclosure. Optical coupling 1050 has been modified for higher port density enclosures than can be satisfied by the more conventional box shaped optical couplings, such as optical coupling 250 shown in FIG. 4A-4C. Optical coupling 1050 has two additional attachment points than are present in a conventional optical coupling designs, thus enabling a higher pull out strength of the optical fiber connector and improving the reliability of the optical connection interface when forces are exerted onto the optical fiber cable on which the exemplary optical fiber connector is mounted.

Optical coupling 1050 can have a first side 1050a and a second side 1050b disposed on either side of a flange 1060 and includes first optical fiber connector housing 1055 disposed on a first side of the flange, a second connector housing 1065 on a second side of the flange 1060 and a ferrule alignment sleeve 1062 disposed along the central axis of the optical coupling and extending through the flange into each of the first and second connector housings. Each of the connector housings 1055, 1065 includes a connector port 1056, 1066 respectively, that is configured to receive a corresponding optical fiber connector and align the connector ferrules of the optical fiber connectors to one another within the ferrule alignment sleeve.

Figure 17B:
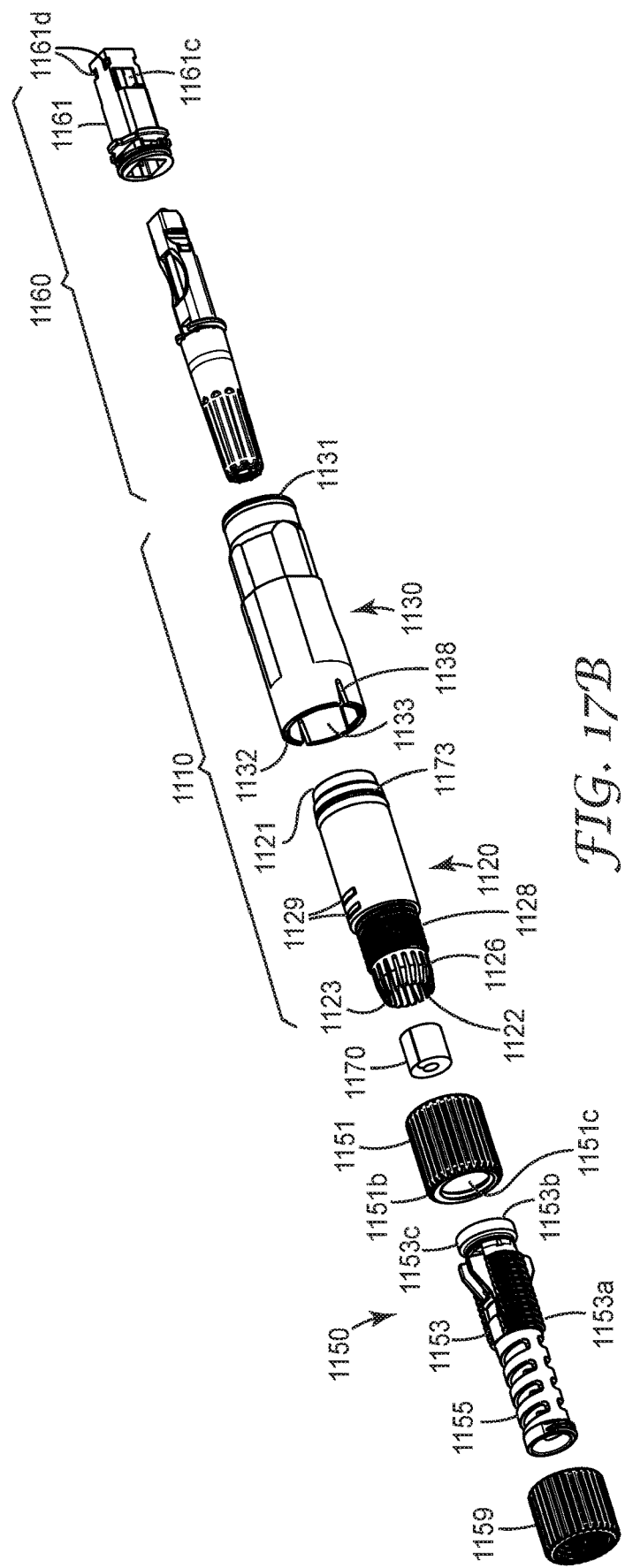

In an exemplary aspect, first connector housing 1055 can be configured to accept exemplary optical fiber connector 1100 shown in FIGS. 17A-17C. The second connector housing 1065 can be configured to accept a mating connector disposed in the interior of the telecommunication enclosure. The mating connector can have any standard connector formats, such as MT, MPO, SC, ST, FC, and LC connector formats and the second connector housing 1065 will have a corresponding format, for example an SC-format. The second connector housing can include catch mechanism 1067, shown in FIG. 16B, similar to that found in conventional connector adapters to secure the mating connector in optical coupling 1050.

In one exemplary aspect, ferrule alignment sleeve can be a split ceramic sleeve retained in a bore formed in the first and second connector housings or in a bore formed when two retention portions 1055b, 1065b are joined together such as by ultrasonic welding or an adhesive. Each retention portion can include a base portion having a cylindrical sleeve and a pair of clamping elements (e.g. catches 1067 and latches 1057) extending therefrom. Once the retention portions have been joined together, the housing portion of connector housings 1055, 1065, respectively, can be slipped over the clamping elements and the cylindrical sleeve until they abut against each other. The housing portions can then be joined together by ultrasonic welding or an adhesive to form optical coupling 1050. In an alternative embodiment, housing portions 1055, 1065 can be overmolded around the joined together retention portions to form the exemplary optical coupling.

First connector housing 1055 can be configured to accept the outer housing 1161 of the connection portion 1160 of exemplary optical fiber connector 1100 shown in FIGS. 17A-17C. The first connector housing includes a first pair of latches 1057 having a hooked portion 1057a on the free end thereof, the hooked portions are configured to be received by receiving windows 1161c (FIG. 17B) formed in the outer housing of optical fiber connector 1100 and constitute the first two connection points between optical fiber connector and optical coupling 1050. In addition, first connector housing also includes a pair of latch arms 1058 that enable two additional connection points between optical fiber connector 1100 and optical coupling 1050 that are not available in conventional optical couplings. Latch arms 1058 have a central extension member 1058a that extends from the base of housing portion 1055a and a pair of flexible cantilevered arms 1058b that are attached to the sides of the free end of the central extension member and extend back toward the base of the housing portion. Each of the flexible cantilevered arms 1058b has a protrusion 1058c extending from its inward facing surface as shown in FIG. 16B. Each protrusion 1058c is received in a depression 1161d formed in the outer housing 1161 of connection portion 1160 shown in FIG. 17B.

Each of the latch arms 1058 have a recessed channel formed adjacent to the flange 1060 which is configured to closely fit the opening through the side wall 1014 of the telecommunication enclosure that defines port 1020. When installed in the port, the side wall of the enclosure is securely held within recessed channel 1059. During insertion into the port of the telecommunication enclosure, latch arms 1058 can flex inward to allow the first end 1050a of the optical coupling to pass through the opening in the side wall of the telecommunication enclosure until flange 1060 abuts against the side wall of the enclosure releasing the pressure on the latch arms and allowing them to return to their original position, thus locking optical coupling 1050 in the port of the telecommunication enclosure.

In an exemplary aspect, optical coupling 1050 can be at least partially disposed within the port (i.e. the first connector housing can disposed within the exterior section 1021 of the port 1020 and the second connector housing disposed within the interior of the telecommunication enclosure as shown in FIG. 16C). Thus, the connection point between the optical coupling and an optical connector installed therein is protected by the external section of the port.

In an exemplary aspect, optical coupling 1050 can include a keying nub (not shown) to allow insertion of optical coupling into the port in a known orientation, which can be advantageous when the first housing of the optical coupling resides within an exterior sleeve or section 1021 the port 1020 which can limit visual verification that the optical coupling was properly installed in the port.

Referring to FIGS. 17A-17C, optical fiber connector 1100 is similar in many respects to optical fiber connector 500 shown in FIGS. 11A-11C in that connector 1100 utilizes a push to release mechanism for disengaging the optical fiber connector from optical coupling 1050 shown in FIGS. 16A-16C. Optical fiber connector 1100 is configured to mate with optical coupling 1050 shown in FIGS. 16A-16C. Optical fiber connector 1100 includes an assembly base 1110, a strain relief assembly 1150 attachable to the second end of the assembly base and an optical connection portion 1160 is attachable to the first end of the assembly base. The strain relief assembly applies a radial force to the second end of the assembly base compressing an internal sealing member 1170 to provide an environmental seal between the optical fiber connector 1100 and the telecommunications cable to which it is connected. In addition, optical connector 1100 includes at least one engagement feature that is configured to secure the optical fiber connector within a port of a telecommunication enclosure.

Strain relief assembly 1150 includes a connection portion 1151 and a combined clamping portion 1153 and bend control boot 1155 that are molded as a single unit, best shown in FIG. 17B. One advantage of strain relief assembly 1150 (and also strain relief assembly 950 shown in FIGS. 15A-15C) is that the connection portion is free to rotate with respect to the clamping portion allowing the connection portion to be tightened or loosened without exerting and undue torsion on an optical fiber cable passing therethrough. In addition, using a strain relied device where the connection portion is free to rotate with respect to the clamping portion may be useful when working with oval cables or cables having at least one flat portion because the clamping portion can be aligned with the appropriate side of the cable prior to tightening the connection portion onto the body portion of the connector. In this embodiment (best illustrated in FIGS. 17B and 17C), the clamping portion 1153 can include a lip 1153c on its first end 1153b wherein the outer circumference of the lip is larger than the circumference of the opening 1151c at the second end 1151b of the connection portion 1151. The cable clamping portion 1153 can further include an external thread 1153a that is configured to mate with an internal thread 1159a in the clamping collar 1159. As the clamping collar is screwed onto the clamping portion, the clamping collar will push the clamping elements 1154 inward to grip the jacket of the telecommunication cable between the opposing clamping elements.

Assembly base 1110 includes a body portion 1120 having a first end 1121 and a second end 1122 and a release portion 1130 disposed around and near the first end of the body portion. The release portion defines a release mechanism which moves the release portion relative to the body portion to disengage the at least one engagement feature when the release portion moves with respect to the body portion so that the optical fiber connector can be removed from the port of the telecommunication enclosure. The body portion 1120 can have a generally tubular shape and includes an interior passageway 1123 that extends along the length of the body portion. The first end of the interior passageway is configured to accept and secure optical connection portion 1160 to/in the first end of the body portion via a thread connection, an interference fit, a bayonet connection, etc.

The body portion 1120 can have a groove formed in the external surface of the body portion to receive an intermediate sealing member 1173. The intermediate sealing member can provide an environmental seal between the body portion and release portion 1130 of assembly base 1110.

In addition, body portion 1120 can have an external connection portion 1128 adjacent to the second end 1122 of the body portion. In the exemplary aspect shown in FIGS. 17A-17C, external connection portion 1128 includes an external thread that cooperates with an internal thread (not shown) disposed within the connection portion 1151 of strain relief assembly 1150. Tightening of the strain relief assembly onto the second end of the body portion causes a compressible portion 1126 of the body portion to conform to an outer surface of the telecommunication cable or an internal sealing member 1170 fitted in the optical fiber connector. The compressible portion is formed at the second end of the body portion. The compressible portion can be reduced in size (diameter) when an external radial force is exerted on it such as by application of strain relief assembly. The compressible portion can have a plurality of spaced apart fingers extending from the main body near the second end thereof. In an exemplary aspect, the compressible portion can gave a generally truncated conical shape with the interior of the connection portion of the strain relief assembly having a corresponding shape to cause the spaced apart fingers to be squeezed together such that they exert a compressive force around the cable and/or internal sealing member seated in the interior passageway of the compression portion of body portion.

In addition, the body portion 1120 includes at least one stop 1129 configured to control the degree of movement of the release portion 1130 during the disengaging of optical fiber connector from optical coupling 1050. Specifically, stop 1129 is configured to ride in a slot 1139 within the interior passageway of release portion 1130 to limit the degree of longitudinal travel of the release portion relative to the body portion of optical connector 1100.

Release portion 1130 includes a tubular shell having an internal bore 1133 that extends from a front edge 1131 to a rear end 1132 of the release portion. The release portion is configured to be close fitting with the port of a telecommunication enclosure into which the exemplary optical fiber connector will be inserted. The release portion can have a groove formed in the external surface of the release portion to receive an external sealing member 1175, such as an o-ring. This external sealing member can provide an environmental seal between the assembly base of the exemplary optical fiber connector and the port of a telecommunication enclosure into which the exemplary optical fiber connector is inserted.

Figure 18:
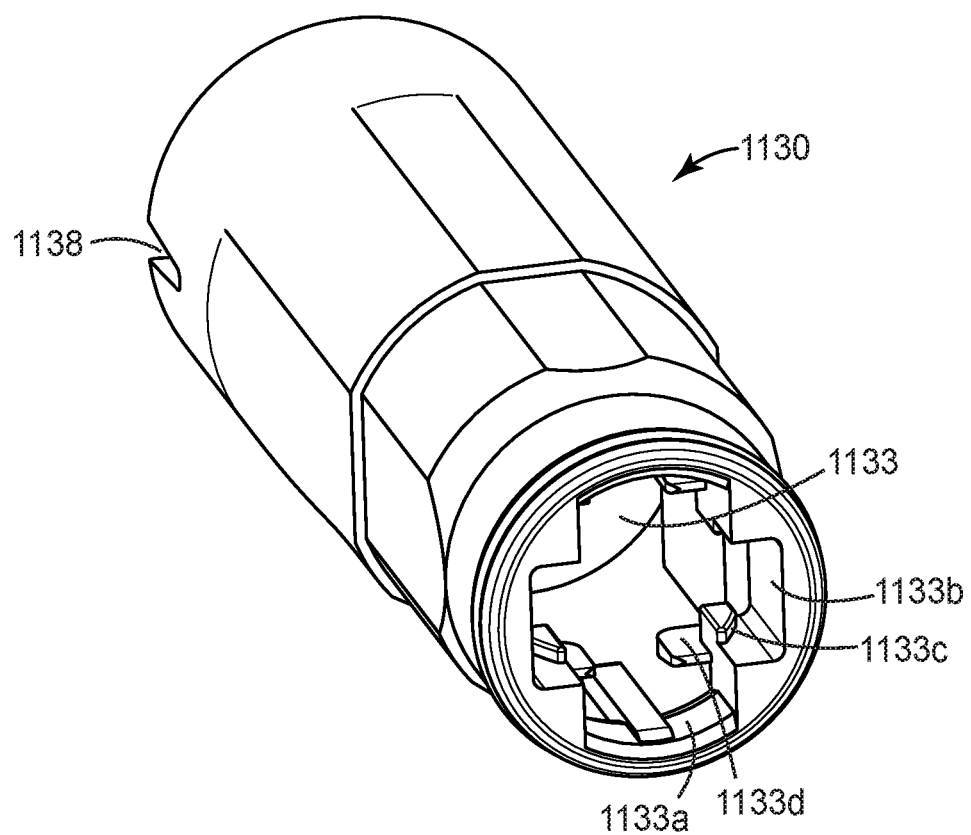
FIG. 18 is an isometric end view of the release portion of the optical connector of FIGS. 17A-17C.

Release portion 1130 can include one or more alignment channels 1133a, 1133b and/or release cams 1133c, 1133d as shown in FIG. 18. The alignment channels can guide any latches 1057 and/or latch arms 1058 of the mating optical coupling 1050 (FIG. 16A) into proper position when the exemplary optical fiber connector 1100 is inserted into the optical coupling. The release cams aid in removal of the exemplary optical fiber connector from the latches and/or latch arms of the optical coupling when the release portion is moved toward optical coupling 1050.

Optical connection portion 1160 includes an outer housing configured to mate with the backbone of a standard optical fiber connector. The outer housing includes a plurality of engagement features formed therein, such as windows 1161c and depression 1161d that are configured to engage with latches 1057 and latch arms 1058 of optical coupling 1050, respectively.

In exemplary optical fiber connector 1100, the craftsman can simply push the release portion forward by hand or using a tool such as a screwdriver inserted into notch 1138 formed in the second end of the release portion. As the release portion moves forward as indicated by directional arrow 1191 causing latches 1057 of optical coupling 1050 to engage with cams 1133c inside the release portion to disengage the projection on the latches from the windows 1161c in the outer housing 161 of the connection portion 1160. Simultaneously, flexible cantilevered arms 1058b of latch arms 1058 engage with cams 1133d to disengage the projections on the ends of the cantilevered arms from the detent or depression 1161d formed in the outer housing 1161 of connection portion 1160 in order to disengage the latch of optical coupling 1050. Once both the latches and latch arms have been disengaged, optical fiber connector 1100 can be removed from optical coupling 1050 by the application of a moderate removal force.

The exemplary fiber optic connectors, described herein, illustrate several advantages over conventional hardened connectors. In each of the embodiments described above, the optical fiber/cable is securely held within the body portion and/or by the strain relief assembly and is not disturbed by activation of any of the release mechanisms described herein. So even though there is relative motion between the body portion and the release portion of the assemble base to initiate disengaging the optical fiber connector from the port of a telecommunication cable, the fiber/cable does not move relative to the body portion of the connector. In one aspect the exemplary optical fiber connector can be field terminated by utilizing a suitable field mountable optical connection portion. In another aspect, the exemplary optical fiber connector can be factory mounted utilizing a factory mounted connection portion. In addition, the exemplary optical fiber connector can be assembled on the end of a pre-terminated cable by incorporating the pre-terminated optical connection structure into the exemplary optical fiber connector disclosed herein.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

We claim:

1. An optical fiber connector configured for external connection to a telecommunication enclosure, the optical fiber connector comprising:
   an assembly base comprising a body portion having an interior passageway extending from a first end to a second end, a release portion disposed near the first end of the body portion and movable with respect to the body portion;
   an optical connection portion disposed partially within the first end of the assembly base, the optical connection portion comprises a ferrule that defines an optical connection interface exposed at a front end of the optical fiber connector;
   an outer housing attached to the first end of the body portion over the optical connection portion, wherein the outer housing has a pair of windows disposed on two opposite sidewalls of the outer housing enabling engagement of latches of a coupling with the optical connection portion; and
   at least one additional engagement feature configured to secure the optical fiber connector within a port of the telecommunication enclosure, wherein the release portion includes at least one cam that is configured to disengage the at least one additional engagement feature when the release portion moves with respect to the body portion so that the optical fiber connector can be removed from the port of the telecommunication enclosure.

2. The optical fiber connector of claim 1, further comprising an activation portion moveably disposed near the second end of the body portion, wherein movement of the activation portion moves the release portion in a direction parallel to the interior passageway through the body portion.

3. The optical fiber connector of claim 2, wherein rotation of the activation portion pushes the release portion forward toward the optical connection interface to disengage the at least one additional engagement feature.

4. The optical fiber connector of claim 2, wherein rotation of the activation portion pulls the release portion back away from the optical connection interface to disengage the at least one additional engagement feature.

5. The optical fiber connector of claim 1, wherein the at least one additional engagement feature comprises a pair of forward facing latches formed on the outer housing, wherein the forward-facing latches engage with windows formed on opposite sides of the optical coupling.

6. The optical fiber connector of claim 1, further comprising a strain relief assembly attached to the second end of the body portion.

7. The optical fiber connector of claim 6, wherein the strain relief assembly comprises a connection portion, a clamping portion and an integral bend control boot.

8. The optical fiber connector of claim 1, wherein the at least one additional engagement feature comprises a retention clip attached over the outer housing.

9. The optical fiber connector of claim 1, wherein the at least one additional engagement feature comprises a pair of retention clips attached over opposite sides of the outer housing.

10. The optical fiber connector of claim 9, wherein each pair of retention clips comprise C-shaped catches that are configured to receive terminal portions of a pair latch arms of the optical coupling and disengaging knobs disposed on either side of the C-shaped catch.

11. The optical fiber connector of claim 10, wherein the disengaging knobs interact with cams formed on the on an inside surface of the release portion when the release portion moves with respect to the body portion to lift a portion of the retention clips to release the terminal portion of the latch arms.

12. The optical fiber connector of claim 2, wherein the activation portion comprises a bayonet channel and the release portion comprises at least one bayonet peg that fits into the bayonet channel in the activation portion such that when the activation portion is rotated, the at least one bayonet peg travels in the bayonet channel and cause the release portion to move in a longitudinal direction along the body portion of the optical fiber connector.

13. The optical fiber connector of claim 2, wherein the activation portion comprises external pegs and the release portion comprises a bayonet channel such that when the activation portion is fitted into or slid into a second end of the release portion, the external pegs are disposed in two bayonet channels in the release portion.

14. The optical fiber connector of claim 13, wherein rotation of the activation portion causes the external pegs to slide in the bayonet channel and resulting in the release portion moving longitudinally along the body portion of the optical fiber connector.

15. The optical fiber connector of claim 1, further comprising an intermediate sealing member disposed between the body portion and the release portion of the assembly base to provide an environmental seal between the body portion and the release portion.

16. The optical fiber connector of claim 1, further comprising an internal sealing member within the optical fiber connector to provide an environmental seal between the body portion and an optical fiber cable that is terminated with the optical fiber connector.

17. The optical fiber connector of claim 1, further comprising an external sealing member to provide an environmental seal between the optical fiber connector and the port of the telecommunication enclosure.

* * * * *